US010546343B2

(12) United States Patent
Napper

(10) Patent No.: US 10,546,343 B2
(45) Date of Patent: Jan. 28, 2020

(54) ORDER PROCESSING FOR REMOTELY ORDERED GOODS

(71) Applicant: Expose Retail Strategies, Inc., St. Catharines (CA)

(72) Inventor: David Napper, St. Catharines (CA)

(73) Assignee: Exposé Retail Strategies, Inc., St. Catharines (CA)

( * ) Notice: Subject to any disclaimer, the term of this patent is extended or adjusted under 35 U.S.C. 154(b) by 0 days.

(21) Appl. No.: 15/926,810

(22) Filed: Mar. 20, 2018

(65) Prior Publication Data

US 2018/0211306 A1  Jul. 26, 2018

Related U.S. Application Data

(63) Continuation of application No. 15/078,932, filed on Mar. 23, 2016, now abandoned, which is a
(Continued)

(30) Foreign Application Priority Data

Jan. 24, 2012 (CA) .................................. 2765619
Jul. 9, 2012 (WO) ................. PCT/CA2012/000644
Jul. 17, 2012 (EP) .................................... 12176785

(51) Int. Cl.
*G06Q 30/06* (2012.01)
*G06Q 10/06* (2012.01)
(Continued)

(52) U.S. Cl.
CPC .......... *G06Q 30/0635* (2013.01); *B25B 11/00* (2013.01); *G06Q 10/06* (2013.01);
(Continued)

(58) Field of Classification Search
CPC ......... G06Q 30/0635; G06Q 10/06316; G06Q 20/3224
See application file for complete search history.

(56) References Cited

U.S. PATENT DOCUMENTS 5,648,770 A    7/1997 Ross
6,026,375 A    2/2000 Hall et al.
(Continued)

FOREIGN PATENT DOCUMENTS

CA    2820432 A1 * 12/2014 ............. G06Q 10/08
WO    2004017611 A2    2/2004
(Continued)

OTHER PUBLICATIONS

Muhammed Fatih Bulut et al., "LineKing: Crowdsourced Line Wait-Time Estimation Using Smartphones," 2012, University at Buffalo SUNY, pp. 1-20 (Year: 2012).*
(Continued)

*Primary Examiner* — Amanda Gurski
(74) *Attorney, Agent, or Firm* — Jonathan M. D'Silva; MMI Intellectual Property

(57) ABSTRACT

A method for fulfilling a plurality of orders for goods at a provider location comprises obtaining an arrival sequence estimate for each of a plurality of users indicating the sequence in which the users are expected to arrive, and organizing completed orders according to the arrival sequence estimate. The arrival sequence estimate may be obtained by ordering users according to their respective radial distances from a target, and may also be used to schedule processing of the orders. Alternatively, arrival estimates for when each of the users is expected to arrive may be used to schedule processing of the orders. A dynamic arrival estimate may be obtained based on an expected travel path toward the destination during a first trip portion comprising travel within a constrained travel path network, and based on radial distance from the destination during a second trip portion subsequent to the first trip portion.

8 Claims, 43 Drawing Sheets

Related U.S. Application Data continuation of application No. 13/746,109, filed on Jan. 21, 2013, now abandoned, which is a continuation-in-part of application No. 13/355,132, filed on Jan. 20, 2012, now Pat. No. 8,732,028.

(60) Provisional application No. 61/511,965, filed on Jul. 26, 2011.

(51) Int. Cl.
| | |
|---|---|
| *G06Q 20/32* | (2012.01) |
| *H04W 4/50* | (2018.01) |
| *G06Q 10/08* | (2012.01) |
| *G06Q 20/12* | (2012.01) |
| *H04W 4/021* | (2018.01) |
| *B25B 11/00* | (2006.01) |
| *G06Q 50/12* | (2012.01) |
| *B27B 21/00* | (2006.01) |

(52) U.S. Cl.
CPC ... *G06Q 10/0631* (2013.01); *G06Q 10/06316* (2013.01); *G06Q 10/08* (2013.01); *G06Q 20/12* (2013.01); *G06Q 20/3224* (2013.01); *G06Q 30/06* (2013.01); *G06Q 50/12* (2013.01); *H04W 4/021* (2013.01); *H04W 4/50* (2018.02); *B27B 21/00* (2013.01)

(56) References Cited

U.S. PATENT DOCUMENTS

| | | | |
|---|---|---|---|
| 7,974,873 | B2 | 7/2011 | Simmons et al. |
| 2002/0128850 | A1 | 9/2002 | Chen et al. |
| 2004/0177008 | A1* | 9/2004 | Yang ............... G06Q 10/08 705/26.1 |
| 2006/0010037 | A1 | 1/2006 | Angert et al. |
| 2006/0155591 | A1 | 7/2006 | Altaf et al. |
| 2008/0082424 | A1 | 4/2008 | Walton |
| 2011/0028132 | A1* | 2/2011 | Bos ............... H04M 3/42348 455/414.2 |
| 2011/0112759 | A1* | 5/2011 | Bast ............... G01C 21/3423 701/533 |
| 2018/0025298 | A1* | 1/2018 | Baggott ............... G06Q 10/047 705/332 |

FOREIGN PATENT DOCUMENTS

| | | |
|---|---|---|
| WO | 2004095173 A8 | 12/2005 |
| WO | 2007041672 A2 | 4/2007 |
| WO | 2008157677 A1 | 12/2008 |

OTHER PUBLICATIONS

PCT Notification of Transmittal of the International Search Report and the Written Opinion of the International Searching Authority, or the Declaration; dated Sep. 12, 2012; International Appln No. PCT/CA2012/000644.

European Search Report, dated Dec. 3, 2012; Appln No. EP12176785.

\* cited by examiner

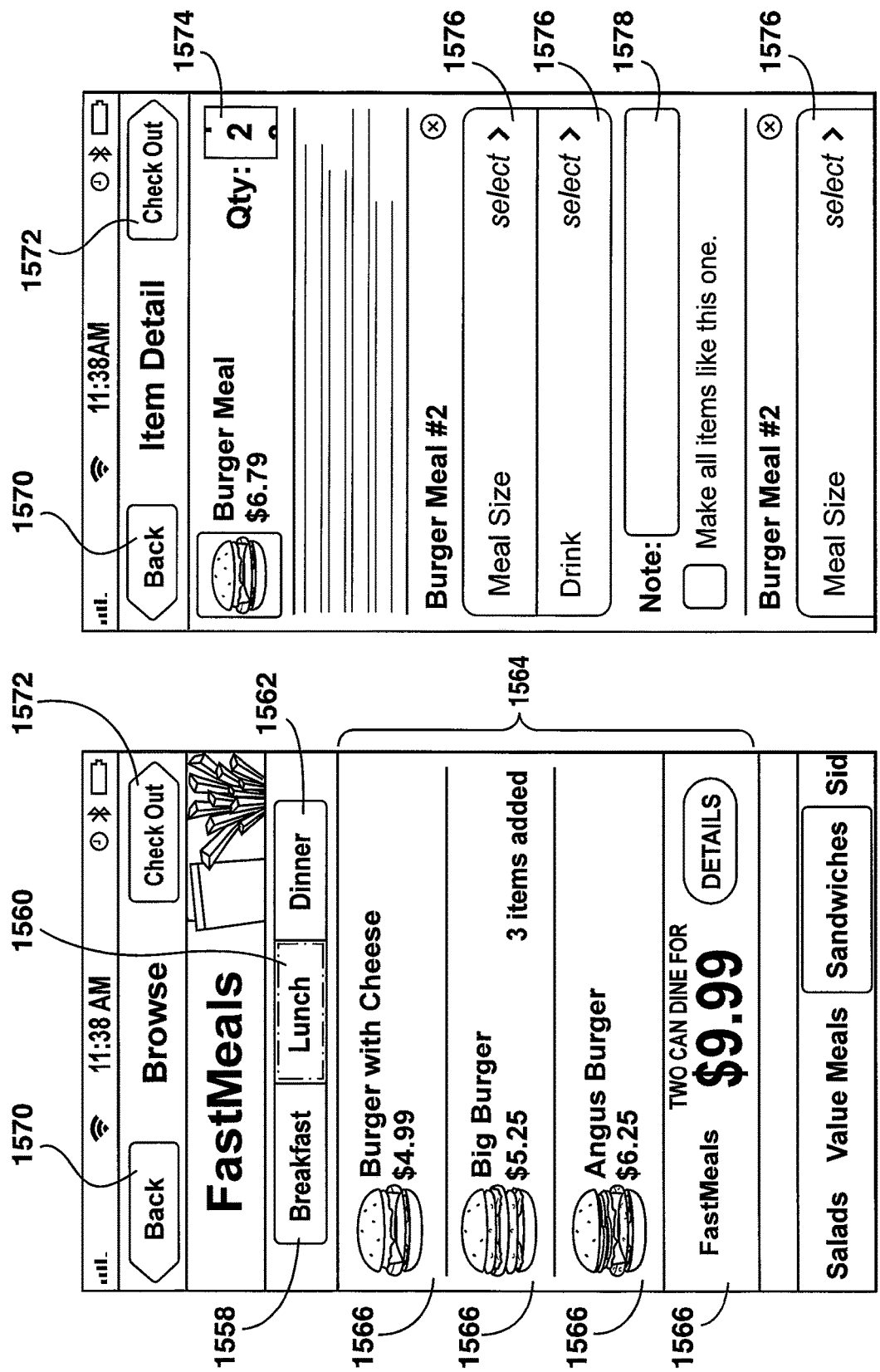

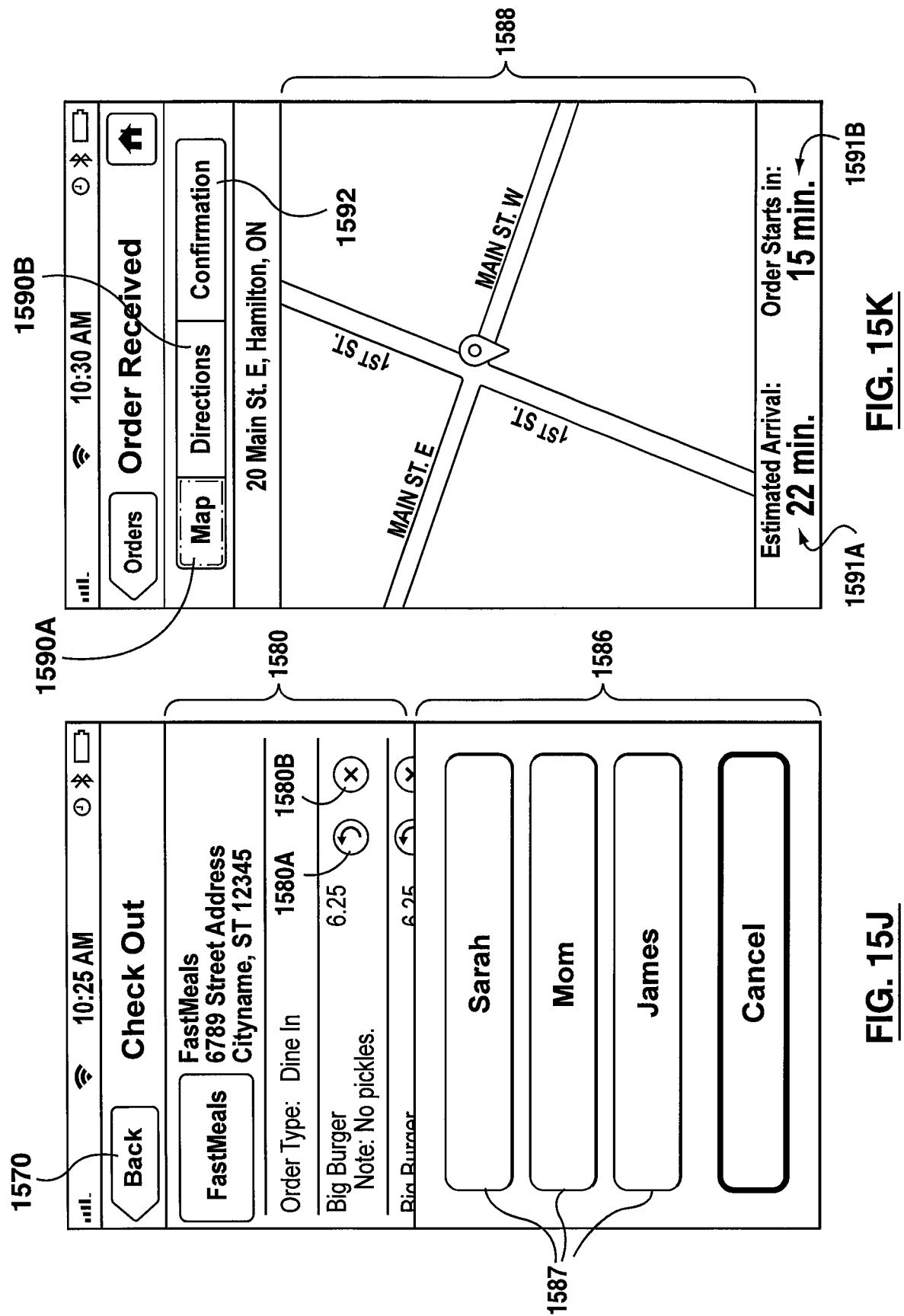

4:20 PM

New Orders

🔍 Search New Orders ⊗

| 9 min. | #101-120730-00025 *First Lastname* 4 items — 1616 |
| 14 min. | #101-120730-00024 *First Lastname* 3 items — 1616 |
| 5 min. | #101-120730-00023 First Lastname 2 items — 1616 |
| 12 min. | #101-120730-00022 First Lastname 6 items |
| 8 min. | #101-120730-00021 First Lastname 1 items |

1616

○○○ 4 — 1652
Pending 1654

⭐ 5
New 1656

▦
Prep 1658

⟳ 5
Incoming 1660

✓
Complete

⚙

Order #101-12730-00022

Order placed: 11/07/2012  12:45 p.m.
Name: Jeremy Johnston
Credit Card: Visa ****5678
Order Type: PICK UP
Number of Items: 3

Classic Americano  2.99
  Large
  Note: cream and sugar, please.

Blueberry Muffin  1.79

Caramel Coffee Smoothie  3.25
  Medium
  --------
Special Deals Savings  -.50
Subtotal  7.53
Sales Tax  .48
Total  8.01

[ Print ] — 1638    1 of 3 Items

Complete Orders — 4:20 PM

Order #101-12730-00024

| | |
|---|---|
| Order placed: | 11/07/2012  12:45 p.m. |
| Order completed: | 11/07/2012  3:27 p.m. |
| Name: | Jeremy Johnston |
| Credit Card: | Visa ****5678 |
| Order Type: | PICK UP |
| Number of Items: | 3 |

| | |
|---|---|
| Classic Americano | 2.99 |
| Large | |
| Note: cream and sugar, please. | |
| Blueberry Muffin | 1.79 |
| Caramel Coffee Smoothie | 3.25 |
| Medium | |
| Special Deals Savings | -.50 |
| Subtotal | 7.53 |
| Sales Tax | .48 |
| Total | 8.01 |

[Refund] — 1648

1646, 1642

Sidebar — Complete Orders (search)

- #101-120730-00025 — First Lastname — 4 items — 1644 — 4:03 pm
- #101-120730-00024 — First Lastname — 3 items — 1644 — 3:48 pm
- #101-120730-00023 — First Lastname — 3 items — 1644 — 3:45 pm
- #101-120730-00022 — First Lastname — 3 items — 1644 — 3:31 pm
- #101-120730-00025 — First Lastname — 3 items — 1644 — 3:27 pm
- #101-120730-00024 — First Lastname — 3 items — 1644 — 3:15 pm
- #101-120730-00023 — First Lastname — 3 items — 1644 — 3:09 pm
- #101-120730-00022

Navigation tabs

- 1652 — Pending (4)
- 1654 — New (5)
- 1656 — Prep
- 1658 — Incoming (5)
- 1660 — Complete

1650

ORDER PROCESSING FOR REMOTELY ORDERED GOODS

CROSS-REFERENCE TO RELATED APPLICATIONS

This application is a continuation of U.S. patent application Ser. No. 13/746,109 filed on Jan. 21, 2013, which is a continuation-in-part of U.S. patent application Ser. No. 13/355,132 filed on Jan. 20, 2012, which claims priority to U.S. Provisional Application No. 61/511,965 filed on Jul. 26, 2011. This application also claims priority to Canadian Patent Application No. 2,765,619 filed on Jan. 24, 2012, to European Patent Application No. 12176785.9 filed on Jul. 17, 2012 and to Patent Cooperation Treaty Application No. PCT/CA2012/000644 filed on Jul. 9, 2012. The teachings of each of the foregoing documents are hereby incorporated by reference.

TECHNICAL FIELD

The present disclosure relates to ordering systems for ordering goods, and more particularly to scheduling of order processing for remotely ordered goods and organizing the completed orders. The present disclosure also relates to obtaining dynamic arrival estimates for arrival at a destination.

BACKGROUND

There are many remote ordering systems available that allow a user to place an order for goods using a networked mobile wireless telecommunication computing device, such as a smartphone. However, these systems do not account for the fact that the travel time and the preparation time may be different, resulting either in loss of quality or the individual having to wait. For example, before leaving work a user could use his or her smartphone to place an online order for food to be picked up from a restaurant, such as a pizzeria or a quick service restaurant, either on his or her lunch break or on the way home. However, in most cases the user will arrive at the restaurant either to find that the food has been ready for some time and is rapidly losing heat and freshness, or else the user will have to wait for the food to be ready, wasting valuable time.

Moreover, if the user arrives at the restaurant during a busy time, such as the lunch or dinner rush, there may be considerable disorganization and disorder. One possible solution is to provide a dedicated position within the restaurant for users picking up remote orders. However, even if a dedicated position is provided, where a large number of users have used their smartphones to place remote food orders and arrive at the restaurant around the same time, the restaurant staff must still match the orders to the respective users, which takes time. Even if the food is ready and fresh when the user arrives, the time taken for the restaurant staff to isolate a particular user's order from a large number of other remotely placed orders can be significant. This tends to defeat the purpose of placing a remote order in advance, and leads to irritation of the user and may also allow the food quality to degrade, even if it happened to have been ready precisely when the user arrived.

SUMMARY

A user can use a networked computing device, for example a networked mobile wireless telecommunication computing device such as a smartphone, to identify a suitable location of a provider of goods, view a list of items available from the provider, and generate an order for goods in advance. The completed orders are organized according to the expected order of arrival of the users so when a user arrives, his or her order can be easily pulled and presented. Preferably, in cases where the goods are of a type which degrade fairly rapidly after preparation, processing of the order is also timed so that the order will generally be completed at about the same time as the user arrives.

One method for processing a plurality of orders for goods at a provider location comprises (i) obtaining arrival estimates for when each of a plurality of users is expected to arrive, with each user associated with a respective order, (ii) using the arrival estimates to schedule processing of the orders, (iii) obtaining an arrival sequence estimate for the users indicating a sequence in which the users are expected to arrive, (iv) processing the orders to produce completed orders, and (v) organizing the completed orders according to the arrival sequence estimate.

Another method for processing a plurality of orders for goods at a provider location comprises (i) obtaining an arrival sequence estimate for each of a plurality of users indicating a sequence in which the users are expected to arrive, with each user associated with a respective order, (ii) using the arrival sequence estimate to schedule processing of the orders, (iii) processing the orders to produce completed orders, and (iv) organizing the completed orders according to the arrival sequence estimate.

A method for fulfilling a plurality of orders for goods at a provider location comprises (i) obtaining an arrival sequence estimate for each of a plurality of users indicating a sequence in which the users are expected to arrive, with each user associated with a respective order, and (ii) organizing completed orders according to the arrival sequence estimate.

Preferably, the arrival sequence estimate is continuously updated and the step of organizing completed orders according to the arrival sequence estimate is repeated responsive to a change in the arrival sequence estimate.

Processing the orders to produce completed orders may comprise assembly of components of the orders into the completed orders.

The arrival sequence estimate may be obtained by ordering users according to their respective radial distances from a target. The radial distances may be obtained using location information received from networked mobile wireless telecommunication computing devices carried by the users. The location information may comprise, for example, global positioning system coordinates and/or cellular repeater triangulation coordinates.

In one embodiment, a two-stage process is used to determine an arrival estimate for a travelling target, such as a user travelling to a provider to pick up a remotely placed order for goods. The first stage uses conventional map-based techniques to estimate how long it will take the target to traverse an expected path toward the destination along a series of roads, sidewalks or other constrained paths, for example a user walking, driving or bicycling to a provider location. The second stage estimates how long it will take the target to travel to the destination along a direct linear path, for example a user walking from a parking lot into the provider location.

A computer-implemented method for obtaining a dynamic arrival estimate for arrival at a destination comprises, during at least a first trip portion comprising travel within a constrained travel path network, calculating the dynamic arrival estimate based on an expected travel path toward the destination through the constrained travel path network, and during at least a second trip portion subsequent to the first trip portion, calculating the dynamic arrival estimate based on a radial distance from the destination.

A transition from the first trip portion to the second trip portion may be determined, for example, by detecting a departure from the constrained travel path network or by the dynamic arrival estimate falling below a predetermined threshold.

Data processing systems and computer program products for implementing the above methods are also described.

BRIEF DESCRIPTION OF THE DRAWINGS

These and other features will become more apparent from the following description in which reference is made to the appended drawings wherein:

FIG. 15G shows an exemplary menu page of the remote ordering application of FIG. 15A, for placing an order after a provider is selected;

FIG. 15H shows an exemplary menu item detail page of the remote ordering application of FIG. 15A;

FIG. 15J shows an exemplary link page of the remote ordering application of FIG. 15A, generated responsive to selection of a "link" button in the page of FIG. 15I;

FIG. 15K shows an exemplary navigation information page of the remote ordering application of FIG. 15A, with navigation information presented as a map;

FIG. 16B shows an exemplary page for a "New Orders" function of the provider order fulfillment support application of FIG. 16A;

FIG. 16E shows an exemplary page for a "Completed Orders" function of the provider order fulfillment support application of FIG. 16A.

DETAILED DESCRIPTION

As described and illustrated herein systems, methods and computer program products are provided for scheduling processing at a provider location of an order associated with a user, typically so that completion of processing of the order substantially coincides with arrival of the user at the provider location. These systems, methods and computer program products have particular application in the processing of orders for goods that spoil rapidly, such as in quick service restaurants, although they are not limited to these applications and may also be used, for example, in stores selling groceries or merchandise that is not subject rapid spoilage or degradation. In addition, various embodiments facilitate organization of the completed orders according to the sequence in which the users are expected to arrive, so as to improve the efficiency of order pickup. The approaches described herein may have environmental benefits, for example by reducing the amount of time spent idling in a drive-through line.

Figure 1:
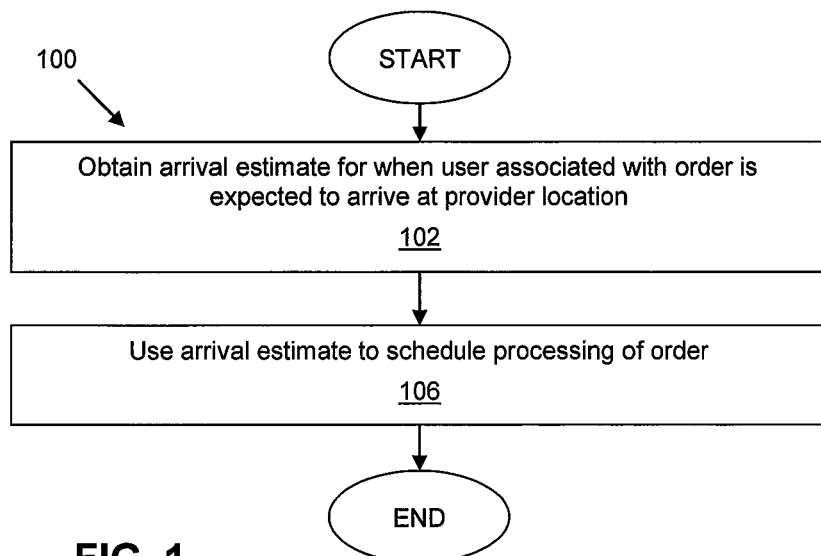
FIG. 1 is a flow chart showing generally a first exemplary method for scheduling processing of an order for goods at a provider location.

Referring first to FIG. 1, an exemplary method for scheduling processing of an order for goods at a provider location is shown generally at 100. The method 100 is generally implemented by a computer system. In some embodiments, the method 100 may be implemented by a networked mobile wireless telecommunication computing device such as a smartphone or tablet computer; in other embodiments the method 100 may be implemented by server-type data processing systems such as order processing systems associated with a provider.

At step 102, the method 100 obtains an arrival estimate for when a user associated with the order is expected to arrive at the provider location, and at step 106, the method 100 uses the arrival estimate to schedule processing of the order. Physical processing of the order at the provider location may then proceed according to the scheduling determined at step 106.

As described in greater detail below, an arrival estimate may be obtained by using position information derived from a global positioning system (GPS) navigation system, from an address input manually into a data processing system by a user, from wireless triangulation, from information from a local Internet Service Provider (ISP) or by any other suitable technique.

Embodiments of the method 100 in FIG. 1 relying on only a single, initial arrival estimate, without using any estimate relating to how long the order will take to process, may advantageously be used to efficiently schedule the sequence of order processing for multiple users in situations where spoilage or degradation of the goods being prepared is unlikely to be an issue. For example, two users may have submitted orders for substantially non-perishable goods that are to be picked up from a provider location where only a single stock picker is available, and the respective arrival estimates indicate that one user will arrive in ten minutes and the other user will arrive in twenty minutes. The method 100 in FIG. 1 could be used to schedule processing of these two orders, with the order for the user who is ten minutes away being processed before the order for the user who is twenty minutes away. In this embodiment, it is not necessary to update the arrival estimate, since the goods will not spoil or degrade if the arrival estimate is somewhat inaccurate.

Preferably, using the arrival estimate to schedule processing of the order at step 106 comprises using the arrival estimate to schedule processing of the order so that completion of processing of the order is expected to substantially coincide with arrival of the user at the provider location. In one embodiment, the method 100 may determine a processing start time so that arrival of the user is expected to coincide with completion of order processing. For example, where the arrival estimate is a time of day (e.g. 1:47 p.m.) that the user is expected to arrive at the provider location, the method 100 may use the arrival estimate to retrieve a start time for processing the order from a look-up table. The start times in the lookup tables may be based solely on the arrival estimate (time of day), or may be based on the arrival estimate (time of day) and some indication of the size of the order, such as the number of items in the order or the cost of the order. Thus, the lookup table may comprise rows corresponding to times of day (or ranges thereof) and columns corresponding to cost (or ranges thereof) for the order, and the start time may be retrieved from the cell that is in the row corresponding to the arrival estimate and in the column corresponding to the cost of the order.

Figure 1A:
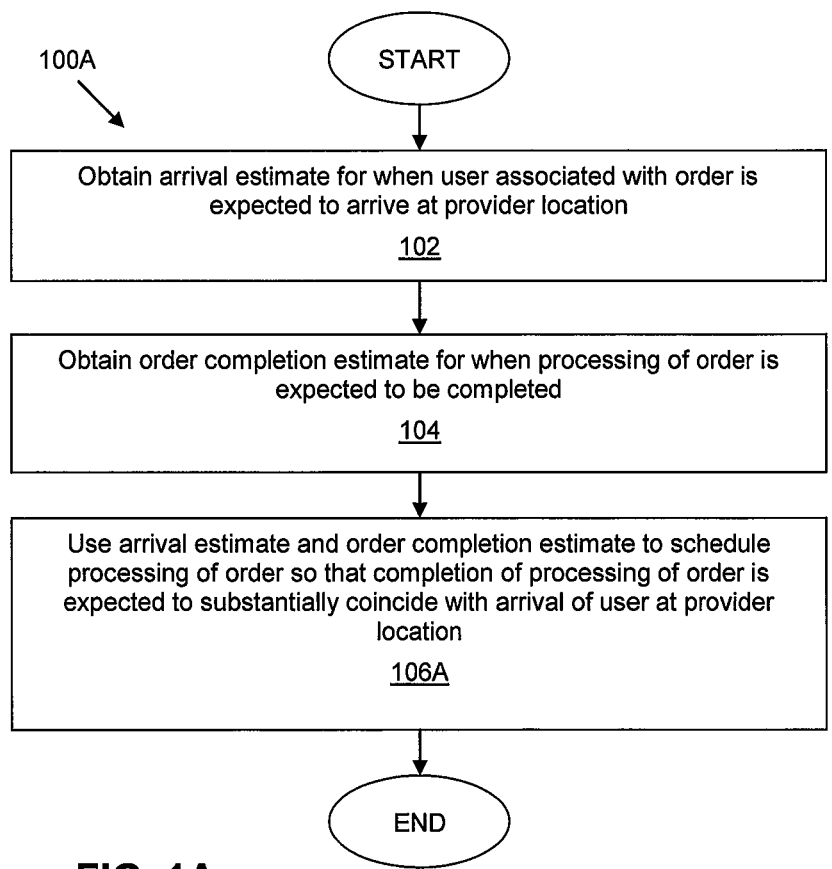
FIG. 1A is a flow chart showing a method that is a particular exemplary embodiment of the method of FIG. 1.

FIG. 1A shows an exemplary method 100A for scheduling processing of an order for goods at a provider location. The method 100A in FIG. 1A is a particular implementation of the method 100 in FIG. 1, with the same reference numerals referring to corresponding steps. The method 100A uses an order completion estimate, in addition to the arrival estimate, to schedule processing of the order so that completion of processing of the order is expected to substantially coincide with arrival of the user at the provider location. Thus, at step 104 the method 100A obtains an order completion estimate for when processing of the order is expected to be completed, and at step 106 the method 100A uses both the arrival estimate and the order completion estimate to schedule processing of the order. The order completion estimate could be a fixed value (e.g. in a fast food restaurant most orders can be completed in less than three minutes), may be obtained from a lookup table based on the size of the order (e.g. number of items or cost of the order), or may be calculated dynamically from the items in the order. Steps 102 and 104 may be performed in any order.

In one embodiment, where the arrival estimate is a time of day and the order completion estimate is a duration (e.g. a number of minutes), processing of the order may be scheduled by simply subtracting the order completion estimate from the arrival estimate. For example, if the arrival estimate is 1:50 p.m. and the order completion estimate is six minutes, processing of the order could be scheduled to begin at 1:44 p.m. so that completion of order processing is expected to coincide with arrival of the user at the provider location at 1:50 p.m. In this embodiment, the arrival estimate and the order completion estimate are not directly compared to one another, and the arrival estimate and the order completion estimate are not updated.

In other embodiments, using the arrival estimate and the order completion estimate to schedule processing of the order (step 106A) comprises comparing the arrival estimate and the order completion estimate and updating at least one of the arrival estimate and the order completion estimate, such that the then-current arrival estimate and the then-current order completion estimate are compared. In cases where the goods being ordered will perish or degrade rapidly once prepared, such as in a quick service or "fast food" restaurant, it may be important to obtain updates to arrival estimate and/or the order completion estimate to enhance precision of the scheduling. Updating of the arrival estimate may be particularly important in this context, as a user may encounter unexpected delays, such as traffic congestion. If only an initial arrival estimate is used, a food order whose preparation was scheduled so that order completion coincides with the original arrival estimate may in fact be spoiled or degraded when a delayed user actually arrives. Additionally, an initial order completion estimate may become inaccurate if not updated, for example if there are significant changes in volume at a provider location, which may create a backlog or a temporary shortage of some items.

Figure 2:
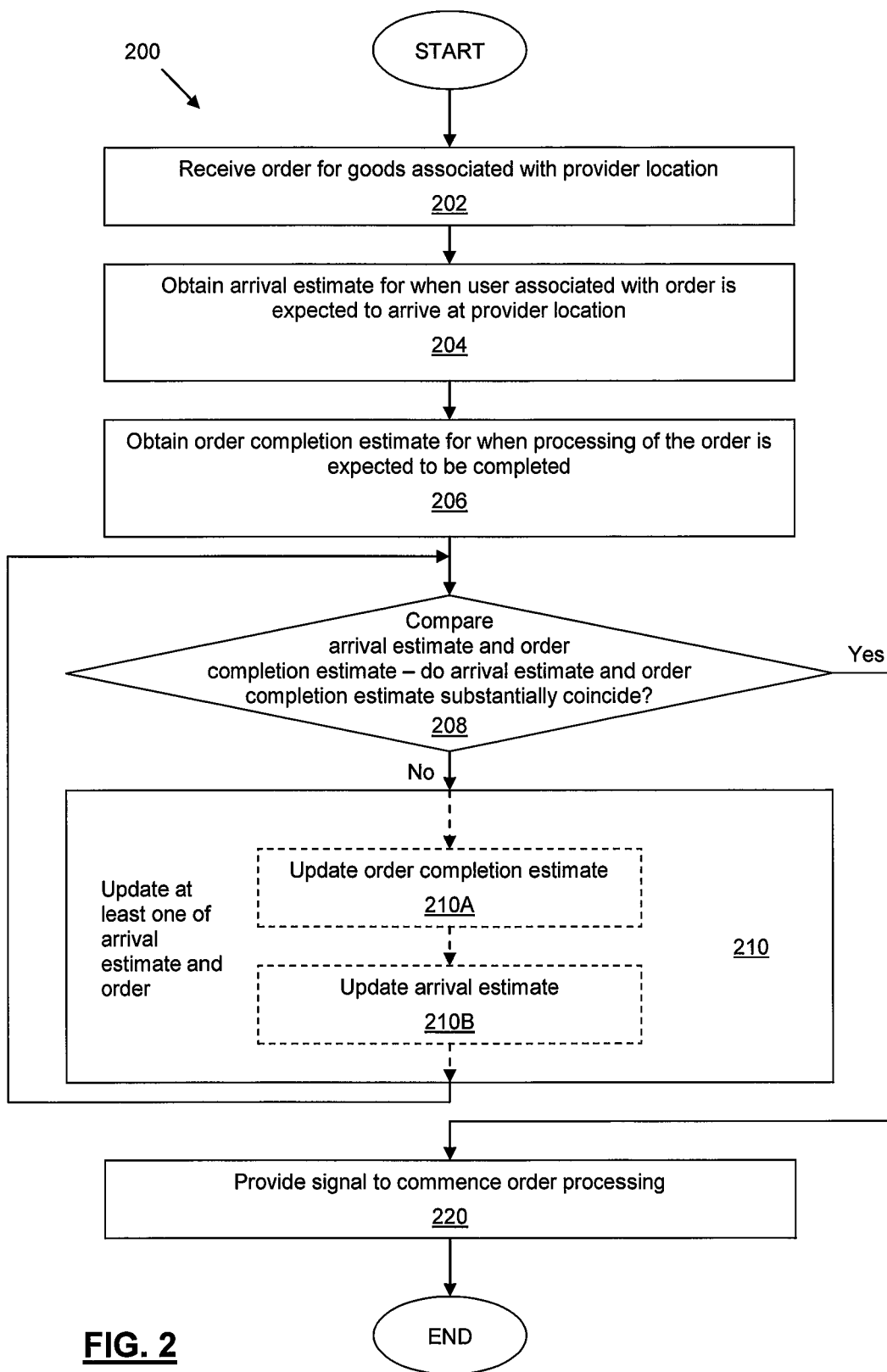
FIG. 2 is a flow chart showing a first exemplary implementation of the method of FIG. 1A.

Reference is now made to FIG. 2, which shows an exemplary method 200 for scheduling processing of an order for goods at a provider location. The exemplary method 200 is a first exemplary implementation of the method 100A of FIG. 1A.

At step 202, an order for goods is received. The order will be associated with a provider location where the order is to be processed, as well as being associated with a user who is to pick up the order. For example, the order may specify the provider location by allowing the user to select from a list of provider locations when submitting the order. The list may be based on the user's present location. In some embodiments, the order may be entered into the user's data processing system, such as a home computer or a networked mobile wireless telecommunication computing device such as a smartphone, and the user's data processing system may complete all of the steps of the method 200. In other embodiments, the order may be received at a data processing system associated with the provider, and the method 200 would be executed by the data processing system associated with the provider. A data processing system associated with a provider may be, for example the order processing system for the provider location that is to process the order for goods, or a central order processing system for a plurality of provider locations (e.g. a restaurant chain having a plurality of locations), or a data processing system of a provider aggregator that processes orders for a plurality of different providers, each of which may have one or more provider locations.

At step 204, which corresponds to step 102 of the method 100A in FIG. 1A, the method 200 obtains an arrival estimate for when the user associated with the order is expected to arrive at the provider location that is processing the order. The arrival estimate is associated with the order for goods received at step 102. The arrival estimate may be, for example, an estimated travel time of the user to the provider location from the user's current location, or an estimated arrival time of the user at the provider location, based on the user's current location. The arrival estimate may be obtained in a number of ways. Typically, the arrival estimate will be based on the user's initial location, using conventional map-based navigation technology such as that used in GPS navigation systems or Internet-based travel calculation systems like Google Maps or MapQuest to determine an estimated travel time (e.g. 15 minutes) to, or estimated time of arrival (e.g. 9:15 a.m.) at, the provider location. Such calculations may take into account factors such as time of day, traffic patterns, and the like, as is known in the art. For example, where the order is initially entered into a GPS-equipped smartphone, the smartphone may use its GPS system to determine the initial location, that is, the current location of the smartphone. The smartphone could then use appropriate software to calculate an initial arrival estimate, which the smartphone could then use in implementing the method 200, or transmit to a data processing system associated with the provider where the method 200 is being implemented by the latter data processing system. Alternatively, where the method 200 is being implemented by a data processing system associated with the provider, the smartphone may simply determine and transmit its current location to the data processing system associated with the provider. Other techniques for obtaining an initial location to use in calculating the arrival estimate include cellular triangulation, determination from ISP data, and manual entry of a location.

Map-based navigation technology determines an expected travel path that the user will follow along the various roads and calculates the expected trip duration based on the expected speed on each travel path segment. This approach generally assumes that the trip is complete when an object has arrived at the street address associated with the destination, and therefore generally does not account for time taken to park a vehicle or walk to a provider location. As a result, map-based trip duration estimates may underestimate the total travel time. Where the address used as the destination for a map-based trip duration estimate is imprecise, such as the street address for a large shopping mall, this underestimate may be considerable. Accordingly, arrival estimates generated using map-based navigation technology will preferably be adjusted to account for these additional portions of the trip. These adjustments may be a fixed value, for example assuming that it will take three minutes to park the car and walk to the provider building, or may be generated dynamically, as described in greater detail below.

At step 206, which corresponds to step 104 of the method 100A in FIG. 1A, the method 200 obtains an order completion estimate for when processing of the order is expected to be completed. Like the arrival estimate, the order completion estimate is also associated with the order for goods received at step 102. The order completion estimate may be, for example, an estimated duration of the processing of the order (e.g. 4 minutes), or an estimated completion time for the order (e.g. 12:06 p.m.) given a specified start time for the order when the order processing will be complete. The order completion estimate may be generated in a number of different ways.

As noted above, in some embodiments a fixed value may be used as the order completion estimate. For example, where the method 200 is to be used in conjunction with a fast food restaurant, the order completion estimate may be set to a constant value based on the length of time for preparing a typical order and which will provide an adequate estimate for most cases. Thus, if in a particular fast food restaurant 90% of orders can be completed in three minutes or less, a constant value of three minutes may be used as the order completion estimate. If the order is completed sooner (e.g. one and a half or two minutes) spoilage will not be an issue (as compared to the three minute estimate), and those cases that take longer (e.g. four or five minutes) are unlikely to keep the user waiting for a substantial period of time.

In other embodiments, the order completion estimate may be generated dynamically. A dynamically generated order completion estimate may be based on the time of day, the number and/or type of items ordered, the current staffing level at the relevant provider location, the current volume of business at the relevant provider location, or some combination of the foregoing as well as other relevant factors.

In some embodiments, orders may be treated as a unit for the purpose of scheduling processing where this will not have a substantial adverse effect on quality. In such embodiments, the order completion estimate may be the longest estimated preparation time of the components contained in the order. For example, if an order is for a hamburger, drink and fries and the estimated preparation time for the hamburger is three minutes while the estimated preparation time for the drink and fries are one minute each, the order completion estimate may be three minutes (since the menu items can be processed in parallel) and scheduling is based on that three minute estimate, with processing of each component beginning at the same time. In other embodiments, orders may be broken down into components, with processing of each component being scheduled separately. In particular, the order completion estimate may comprise a component completion estimate for each component (or group of components) of an order, with processing of individual components (or groups of components) being scheduled separately. For example, in a food order whose components include a well-done steak and an ice cream sundae, it is preferable to begin cooking the steak well before beginning to make the ice cream sundae.

In some embodiments that are particularly well suited to restaurant applications, the estimated preparation time for each menu item can be varied based on volume. For example, the nominal estimated preparation time for a hamburger may be three minutes but might be increased to five minutes during peak hours. This increase can be triggered automatically at the appropriate times, or manually, and may be applied to individual menu items separately or universally to all menu items.

Although FIG. 2 shows step 204 being performed before step 206, in other embodiments step 206 may be performed before step 204.

Steps 208 and 210 together correspond to step 106A of the method 100A shown in FIG. 1. At step 208, the method 200 compares the arrival estimate and the order completion estimate. In response to a determination at step 208 that the arrival estimate and the order completion estimate substantially coincide, the method 200 proceeds to step 220 and provides a signal to commence processing of the order. Step 220 will typically comprise transmitting either the order itself, or a signal to commence processing of the order, to a provider or a particular provider location that will process the order.

Several methodologies may be used to determine whether the arrival estimate and the order completion estimate substantially coincide. In a preferred embodiment, the arrival estimate and the order completion estimate will be considered to substantially coincide when they are within a predetermined threshold from one another, for example one or two minutes. Where both the order completion estimate and the arrival estimate are times of day, or both the order completion estimate and the arrival estimate are time periods (e.g. an estimated processing time and an estimated travel time, respectively), they may be compared directly. Where the arrival estimate and the order completion estimate are in different forms, such as where one is a time of day and the other is a time period, they may be prepared for comparison by converting one to the other. For example, if the arrival estimate is a time period but the order completion estimate is a time of day, the arrival estimate can be converted to a time of day by adding the time period to the current time of day, or the order completion estimate can be converted to a time period by subtracting the current time of day therefrom.

In some instances, a user will be close enough to the provider location that will process the order that it will take longer to process the order than it will for the user to arrive at that provider location. It is therefore preferred that at step 208, the arrival estimate and the order completion estimate are deemed to coincide when comparing the arrival estimate and the order completion estimate indicates that the user associated with the order is expected to arrive at the provider location before the order is expected to be completed. Thus, for example, in response to a determination at step 208 that the estimated processing time for the order is approximately equal to or exceeds the initial estimated travel time, the method 200 would proceed to step 220 and provide a signal to commence processing of the order for goods. This procedure will cause order processing to commence substantially immediately following receipt of the order so as to minimize the amount of time that the user will have to wait. In addition, in such situations the method 200 may notify the user that they are closer to the provider location than the estimated processing time, and may also continue to compare the arrival estimate and the order completion estimate and notify the user when he or she should depart so that his or her arrival will substantially coincide with order completion.

In response to a determination at step 208 that the arrival estimate and the order completion estimate do not substantially coincide, the method 200 proceeds to step 210 and obtains an updated arrival estimate, an updated order completion estimate, or obtains both an updated arrival estimate and an updated order completion estimate.

Step 210A shows updating of the order completion estimate, and step 210B shows updating of the arrival estimate; when both steps 210A and 210B are carried out these steps may be carried out in any order. Either step 210A or step 210B may be omitted in appropriate circumstances. For example, where the arrival estimate and the order completion estimate are both represented as a time of day, step 210B may be omitted and the arrival estimate may be held constant with only the order completion estimate being updated (step 210A), since the order completion estimate will depend on the time at which processing begins. In this situation, updating the order completion estimate at step 210A would comprise updating the start time upon which the order completion estimate is based. In another example, where the arrival estimate and the order completion estimate are both represented as a time period or duration, step 210A may be omitted and the order completion estimate may be held constant, with only the arrival estimate being updated (step 210B), since the time period that is the arrival estimate in this case will generally decrease as time elapses. In this situation, updating the arrival estimate may comprise decrementing the previous arrival estimate based on the amount of time that has elapsed, i.e. counting down. Thus, where the arrival estimate is an estimated travel time, determining the updated estimated travel time may comprise decrementing a most recent previously estimated travel time by an interval substantially equal to the time elapsed since determination of the most recent previously estimated travel time. Alternatively, updating the arrival estimate may comprise executing a new calculation of the arrival estimate. In such an embodiment, where the arrival estimate is an estimated travel time, obtaining the updated estimated travel time may comprise, in the case of a networked mobile wireless telecommunication computing device, updating the current location, calculating the updated estimated travel time from the updated location, the provider location and an updated travel route between the updated location and the provider location, for example from an onboard GPS system. Where the arrival estimate is an estimated travel time and the method 200 is being executed by a data processing system associated with a provider, updating the estimated travel time by the data processing system may comprise the data processing system querying a mobile wireless telecommunication computing device associated with the user, receiving, in response to the query, an identification of an updated location, and then the data processing system calculating the updated estimated travel time from the updated location, the provider location and an updated travel route between the updated location and the provider location. The updated travel route may be obtained from the mobile wireless telecommunication computing device or determined by the data processing system associated with the provider. The updated travel route will typically be a projected travel route based on the current location of the user, since the actual travel route cannot be known with certainty since it has not yet been taken.

The updated order completion estimate determined at step 210A may be obtained in the same way as the initial order completion estimate determined at step 206. For example, where the order completion estimate is obtained from a lookup table based on a given start time for the order, updating the order completion estimate may comprise accessing the same lookup table again using the then-current start time. Similarly, updating of the order completion estimate at step 210A may comprise dynamically recalculating the order completion estimate in embodiments where the order completion estimate is generated dynamically, such as where the order completion estimate may change due to the volume of business at a particular provider location, for example. Alternatively, the updated order completion estimate at step 210A may be determined in a different way than the initial order completion estimate obtained at step 206.

Similarly, the updated arrival estimate determined at step 210B may be obtained in the same way as the initial arrival estimate determined at step 204, such as by obtaining a dynamically recalculated arrival estimate. In one embodiment, a dynamically updated location for the user, such as from a GPS-equipped smartphone, may be used to generate an updated arrival estimate in the same way that the original arrival estimate was generated. For example, the user's updated location may indicate that the user has deviated from the anticipated route upon which the previous arrival estimate was based. In other embodiments, the updated arrival estimate determined at step 210B may be obtained in a different way than the initial arrival estimate obtained at step 204. For example, the initial arrival estimate obtained at step 204 may be an estimated travel time dynamically calculated, such as from a GPS or manually entered location, and may be updated simply by decrementing according to elapsed time. Such an approach may be used, for example, if the order is transmitted from a desktop computer and is not associated with a networked mobile wireless telecommunication computing device.

Alternatively, step 210B may be performed in more than one way, such as by generating a dynamically updated arrival estimate based on new GPS location data on every A update while decrementing the previous estimate for the other updates, or decrementing the arrival estimates between updates thereof.

Optionally, a delay may be interposed between steps 208 and 210 to limit the use of processing resources; that is, the order completion estimate and/or the arrival estimate would be updated periodically at intervals rather than constantly. Typically, mapping applications on networked mobile wireless telecommunication computing devices will check for position updates at set intervals; this consumes battery life and may also require data usage and thereby increase user costs. As such, in one preferred embodiment the frequency with which the arrival estimate is updated may be varied based on the arrival estimate itself—the closer the arrival estimate is to the order completion estimate, the more frequently the arrival estimate will be updated.

After updating either the order completion estimate or the arrival estimate or both at step 210, the method 200 returns to step 208 to again compare the order completion estimate and the arrival estimate to see if they substantially coincide. Thus, the second and subsequent iterations of step 208 compare the then-current arrival estimate to the then-current order completion estimate, with at least one, and possibly both, of the then-current arrival estimate and order completion estimate being an updated arrival estimate and order completion estimate, respectively. Alternatively, in the second and subsequent iterations of step 208 the then-current arrival estimate may be the initial arrival estimate with only the order completion estimate being updated, or the then-current order completion estimate may be the initial order completion estimate, with only the arrival estimate being updated.

Figure 2A:
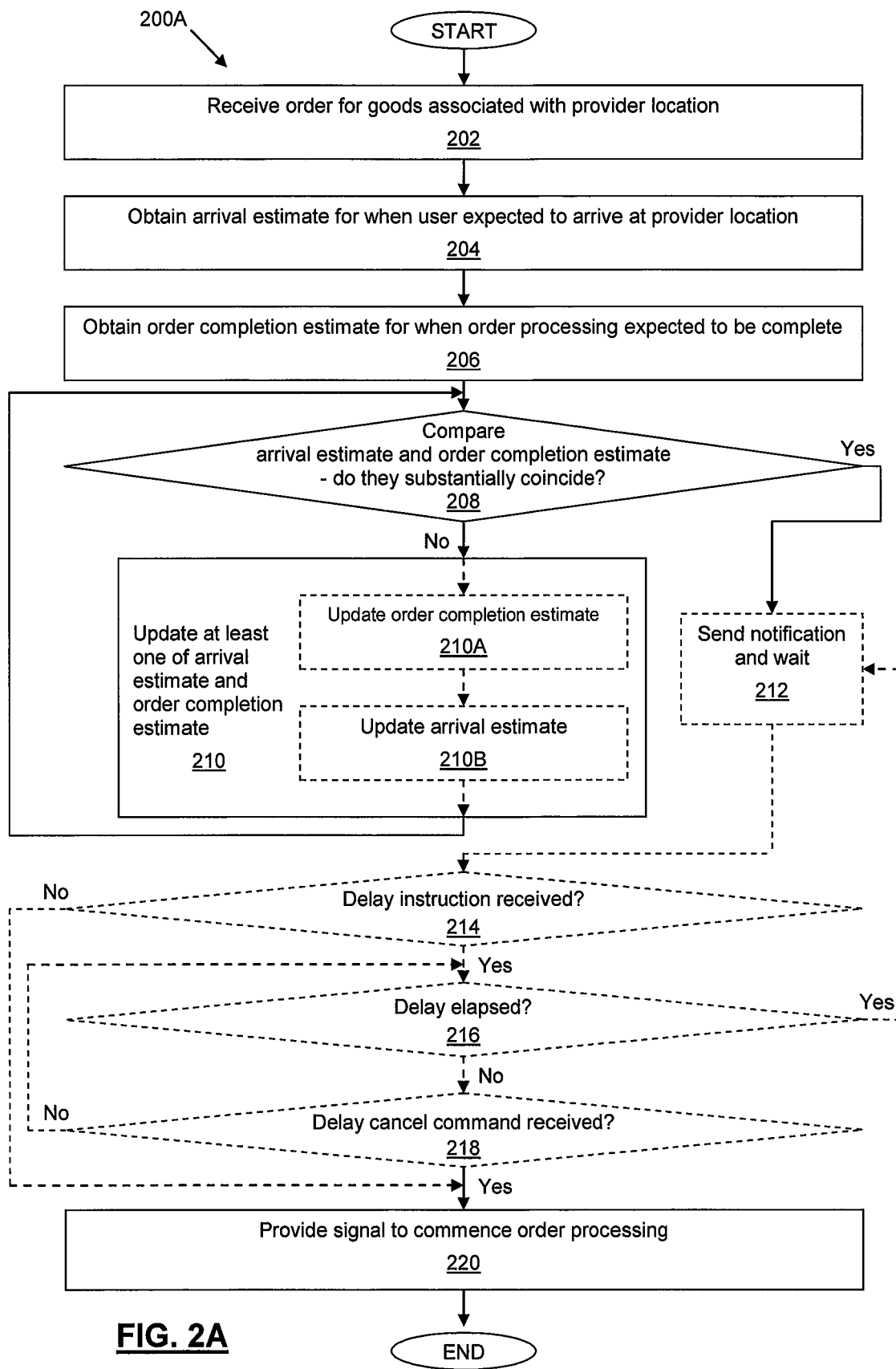
FIG. 2A is a flow chart showing a second exemplary implementation of the method of FIG. 1A.

FIG. 2A shows another exemplary method 200A for scheduling processing of an order for goods at a provider location. The method 200A shown in FIG. 2A is similar to the method 200 shown in FIG. 2, with like reference numerals identifying corresponding steps, and includes additional optional steps 212 to 218 (shown with dashed lines) for providing notification to a user and allowing a user to delay the commencement of order processing, for example if the user is caught in traffic or decides to stop unexpectedly.

In the method 200A shown in FIG. 2A, after a determination at step 208 that the arrival estimate and the order completion estimate substantially coincide, instead of proceeding immediately to step 220 to provide the signal to commence order processing, the method 200A proceeds to step 212 and sends a notification to the user that order processing is about to begin, and then waits for a predetermined time to give the user an opportunity to provide a delay instruction, which may be a fixed or a variable, user-selected delay. The method 200A then proceeds to step 214 to check whether a delay instruction has been received from the user. Responsive to a determination at step 214 that no delay instruction has been received, the method 200A proceeds to step 220 and provides the signal to commence order processing.

If the method 200A determines at step 214 that a delay instruction has been received, the method then proceeds to step 216 to check whether the delay has elapsed. If the method 200A determines at step 216 that the delay has elapsed, the method 200A returns to step 212 to send a further notification to the user and give the user an opportunity to provide a further delay instruction. If the method 200A determines at step 216 that the delay has not yet elapsed, then the method 200A proceeds to step 218 to check whether a command to cancel the delay instruction has been received. Responsive to a determination at step 218 that no delay cancel command has been received, the method 200 returns to step 216 to again check whether the delay has elapsed. If the method 200A determines at step 218 that a delay cancel command has been received, then the method 200A proceeds to step 220 and provides the signal to commence order processing.

In embodiments in which a delay instruction can be provided, the order completion estimate may include a buffer time to account for the time associated with steps 212 to 218.

While FIG. 2A shows step 218 occurring after step 216, these steps may be performed in the reverse order; i.e. the method 200A could check for a delay cancel command before checking if the delay has elapsed, or steps 216 and 218 may be performed substantially simultaneously. In some embodiments, the user may not be provided with an opportunity to cancel a delay instruction, in which case step 218 may be omitted. In some embodiments, a user may only be permitted to provide a single delay instruction, in which case (if a delay cancel option is provided) step 218 would precede step 216 and the method 200A may proceed directly from step 216 to step 220 when it is determined that the delay has elapsed.

Figure 3A:
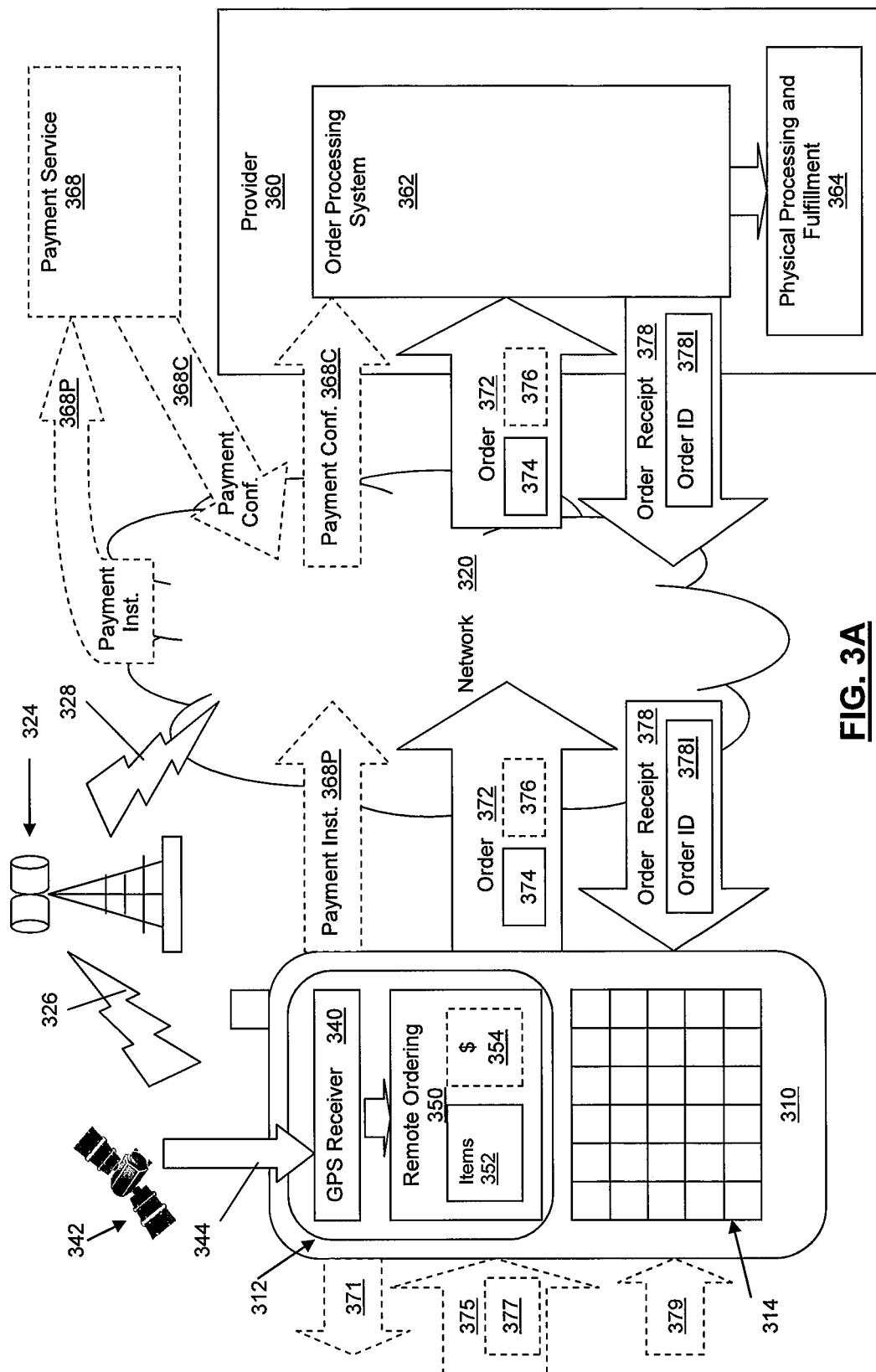
FIG. 3A shows a schematic representation of a first exemplary arrangement for implementing a method for scheduling processing of an order by a provider.

FIG. 3A shows a schematic representation of a first exemplary arrangement for implementing a method for scheduling processing of an order by a provider. As shown in FIG. 3A, a networked mobile wireless telecommunication computing device in the form of a smartphone 310 has a display 312 and user interface 314 in the form of a keyboard. In the illustrated embodiment, the display 312 and user interface 314 are separate; in other embodiments the display and user interface may be integrated into a single, touch-sensitive interactive screen, as is known in the art, and the keyboard may be omitted. The smartphone 310 is in communication with a network 320, such as the Internet or a private network, by way of a wireless telecommunication system 324 represented schematically by a wireless transmission tower. The wireless telecommunication system 324 exchanges wireless communication signals 326 with the smartphone 310, and also exchanges communication signals 328 with the network 320, thereby enabling the smartphone 310 to communicate with the network 320. The communication signals 328 between the wireless telecommunication system 324 and the network 320 may be wired or wireless.

The smartphone 310 is equipped with a locating system, which in the illustrated embodiment is a global positioning system ("GPS") receiver 340 that receives signals 344 from orbiting satellites 342 and, either directly or in cooperation with a processor of the smartphone 310, determines the position of the smartphone 10. For simplicity of illustration only a single satellite 342 is shown, in operation a plurality of satellites 342 are used in a global positioning system, as is known in the art.

In the embodiment shown in FIG. 3A, the method 200 from FIG. 2 is implemented by the smartphone 310. The smartphone 310 includes a remote ordering application 350 in the form of computer-readable data and instructions stored in the memory (not shown in FIG. 3A; see FIG. 9) of the smartphone 310 for execution by the processing unit (see FIG. 9) of the smartphone 310. The remote ordering application 350 enables a user (not shown in FIG. 3A) of the smartphone 10 to generate an order for goods, and includes an item list 352 and optionally includes payment support 354. The remote ordering application 350 may be, for example, a separate application program installed on the smartphone 310 or may be a page or pages within a web browser application on the smartphone 310, including a browser-executable software program. The item list 352 will generally comprise a list of items available from a provider 360 (discussed further below), prices associated with each item on the item list 352, and possibly additional information about the items. For example, where the provider 360 is a restaurant or a chain of restaurants, the item list 352 would typically comprise at least a list of menu items and the prices of those menu items, and possibly images and/or descriptions of the menu items. The item list 352 can be maintained remotely and transmitted to the smartphone 310 in response to a request, or the item list 352 may be stored on the smartphone 10 and be periodically updated, for example when updating a remote ordering application.

Preferably, the remote ordering application 350 provides for voice control so that it can be used by a driver in a motor vehicle without the driver having to use his or her hands to control the remote ordering application 350, and uses text-to-voice or similar functionality to enable orders to be audibly read back to the user.

The optional payment support 354 is used by the remote ordering application 350 to facilitate payment for an order for goods generated by the remote ordering application 350. In one embodiment, the payment support 354 enables a user to enter payment information, such as a credit card number or a prepaid value card number, at the time an order is generated; in another embodiment the payment support 354 stores payment information for reuse. In a further embodiment, the payment support 354 links to an external payment service 368, such as a credit card processor or that provided by PayPal, having an address at 2211 North First Street, San Jose, Calif. 95131, to facilitate payment for an order. Such linking may be direct, or may be via a separate application program provided by the external payment service 368 and stored on the smartphone 310. In another embodiment, a data processing system associated with the provider 360 may store payment information. For example, a person may establish a user account with a provider 360, which account may include identifying information for the person as well as enabling information for one or more payment methods, such as a credit card, bank account or prepaid value storage, that can be used to pay for goods either upon receipt of an order or upon collection of the goods by a user. In such embodiments, the payment support 354 may be used to select among multiple payment methods.

In one embodiment, payment processing is handled by first pre-authorizing a credit card transaction at the time the order 372 is confirmed, which pre-authorization may be initiated, for example, by the user selecting an "I'm on my way" button, and completed once the user has collected the goods and the provider has marked the order as "complete" on their side, in each case as described in greater detail below. This method of payment processing is advantageous because it avoids certain complications that would arise if the payment transaction were completed before the goods were collected, such as chargebacks in the event that the user is dissatisfied.

In other embodiments, the remote ordering application 350 may not include any payment support 354 and payment may be made in any conventional manner when the user collects the goods at the provider location 366. Because the payment support 354 and the use of the external payment service 368 is optional, the payment support 354 as well as the external payment service 368 and the communications 368P, 368C therewith are shown in dashed lines in FIG. 3A.

In the embodiment illustrated in FIG. 3A, the remote ordering application 350 is distributed by a provider 360 who makes goods available for sale, lease, rental and the like. For example, the provider 360 may be, without limitation, a restaurant, or a retailer such as a grocery store, general merchandise store, liquor or beer store or a video rental store. The provider 360 may have any number of individual locations at which goods may be provided to a user, ranging from a single location to thousands of locations. The locations may be owned by the provider, or may be franchises of the provider, or some combination thereof. The provider 360 has an order processing system 362 for receiving and processing orders for goods generated by the remote ordering application 350 and received via the network 320, and then dispatching the orders for physical processing and fulfillment 364 at a physical provider location 366 (see FIG. 4) operated by the provider 360. The order processing system 362 will typically be a server-type data processing system, which may comprise one or more individual computer systems coupled to the network 320. The order processing system 362 may be a central order processing system that communicates with the point-of-sale order processing systems at individual physical provider locations 366, or the provider locations 366 may be provided with a computer system or terminal linked to the order processing system 362 to display incoming orders. Typically, the physical provider location 366 is a retail outlet. Where the provider 360 operates a plurality of such provider locations 366, the order processing system 362 will route the order to the appropriate provider location 366. The provider location 366 may be selected based on the current location of the smartphone 310, a destination location or a planned travel route, in each case with the user being asked to confirm the provider location 366. Alternatively, the user may manually enter a desired provider location 366. Certain provider locations 366 may also be stored as "favorites" for frequent use.

In operation, in the embodiment shown in FIG. 3A a user will use the remote ordering application 350 to generate an order 372 for goods that are available from the provider 360; the order is received in the smartphone 310, thereby fulfilling step 202 of the method 200 shown in FIG. 2 and the method 200A shown in FIG. 2A. In one embodiment, the order 372 may be a previously created order, which may be stored on the smartphone 310 or retrieved by the smartphone 310 from a remote system. For example, a user could create "favorite" orders or reuse a previous order. In the exemplary embodiment shown in FIG. 3A, the order 372 includes an identification 374 of the type and quantity of goods being ordered as well as payment information 376. The payment information 376 may be a credit card number and associated information, or may comprise an indication that payment instructions 368P were sent to an external payment service 368 associated with the smartphone 310. In other embodiments, where permitted by the order processing system 362, an order for goods need not include payment information, and in such circumstances may include other information, such as a telephone number or other identifier for the smartphone 310. In embodiments in which the order 372 does not include payment information 376, the user can pay for the goods at the time of collection at the provider location 366, or a user's credit card, bank account or a prepaid value storage may be automatically charged once the user has collected the goods.

The smartphone 310 then obtains an order completion estimate for the order 372 (step 206 of the method 200 shown in FIG. 2 and the method 200A shown in FIG. 2A). The order completion estimate may be calculated by the smartphone 310 based on information stored in the remote ordering application 350, or alternatively (not shown in FIG. 3A) the smartphone 310 may transmit information about the items to be ordered (but not the order 372 itself) to the order processing system 362 and receive the order completion estimate from the order processing system 362.

After the order 372 has been generated, at the appropriate time, as explained in greater detail below, the order 372 is transmitted by the smartphone 310 through the network 320 to the order processing system 362 operated by the provider 360. Where the order 372 includes payment information 376, the order processing system 362 processes the payment information 376 and, responsive to successful processing of the payment information 376, transmits an order receipt 378 to the smartphone 310. Where the payment information 376 is a credit card number and associated information, the order processing system 362 can process this information in a known manner, and the order receipt 378 may be transmitted to the smartphone 310 using the remote ordering application 350, via e-mail to an e-mail account associated with the smartphone 310, by text message to a phone number associated with the smartphone, or by other suitable technique. Where the payment information 376 indicates that payment instructions 368P were sent to an external payment service 368, the order processing system will receive and verify payment confirmation 368C from the external payment service 368 and, once payment is verified, transmit the order receipt 378 via the network either directly to the smartphone 310 as shown in FIG. 3A, or to the external payment service 368 for transmission by the external payment service 368 to the smartphone 310. In embodiments where the order 372 does not include payment information 376, such as where the goods are to be paid for upon collection at the provider location 366, the payment processing steps may be omitted although an order receipt 378 will typically still be transmitted to confirm placement of the order even though it does not confirm payment. The order receipt 378 preferably includes an order identifier 3781 so that the order receipt 378 can be connected to the order 372. For example, the order identifier 3781 can be a numeric, alphabetic or alphanumeric code and/or can repeat the identification 374 of the type and quantity of goods from the order 372. Alternatively, the order identifier 3781 can be a bar code or quick-response (QR) code. After receiving the order receipt 378, the smartphone 310 can store, retrieve and reproduce the order receipt 378, for example by presenting the order receipt 378 on the display 312. In permitted cases where the order 372 does not include payment information 376, a separate payment confirmation can be transmitted once payment has been processed.

After successful processing of the payment information 376, or in a permitted case where no payment information is provided, the order processing system 362 processes the order 372 and routes it for physical processing and fulfillment 364 at a physical location 366 (see FIG. 4). Typically, in the case where the provider 360 operates a plurality of physical locations 366, the order 372 will specify the physical location 366 where physical processing and fulfillment 364 should occur and hence from where the goods should be collected.

In the exemplary arrangement shown in FIG. 3A, the smartphone 310 will obtain an initial arrival estimate (step 204 of the method 200/200A in FIG. 2/FIG. 2A) for when the user is expected to arrive at the physical provider location 366 where the order is to be processed, using the GPS receiver 340 or other locating system. The smartphone 310 does not transmit the order 372 immediately after the order is generated, but only when the smartphone 310 determines that the arrival estimate for the user substantially coincides with the order completion estimate for the order 372 (i.e. step 208 of the method 200/200A in FIG. 2/FIG. 2A). Thus, in the exemplary embodiment shown in FIG. 3A, transmission of the order 372 is step 220 of the method 200 shown in FIG. 2 and the method 200A shown in FIG. 2A, and the smartphone 310 implements step 208 of the method 200/200A in FIG. 2/FIG. 2A by using the GPS receiver 340 or other locating system to determine when the smartphone 310 is in an appropriate geographical location such that the estimated remaining travel time of the user 370 to the physical location 366 from which the goods are to be collected is approximately equal to the time required to complete the physical processing and fulfillment 364 of the goods. As such, the smartphone 310 will obtain periodic updates of the arrival estimate (step 210B of the method 200/200A in FIG. 2/FIG. 2A) using the GPS receiver 340 or other locating system, and may also obtain updates of the order completion estimate from the order processing system 362 (step 210A of the method 200/200A in FIG. 2/FIG. 2A; not shown in FIG. 3A). Because transmission of the order 372 is based on the location of the user and his or her smartphone 310, the order 372 is part of, and hence associated with, a location-triggered communication from the smartphone 310, and the provider 360 processes the order 372 in response to that location-triggered communication.

Figure 3B:
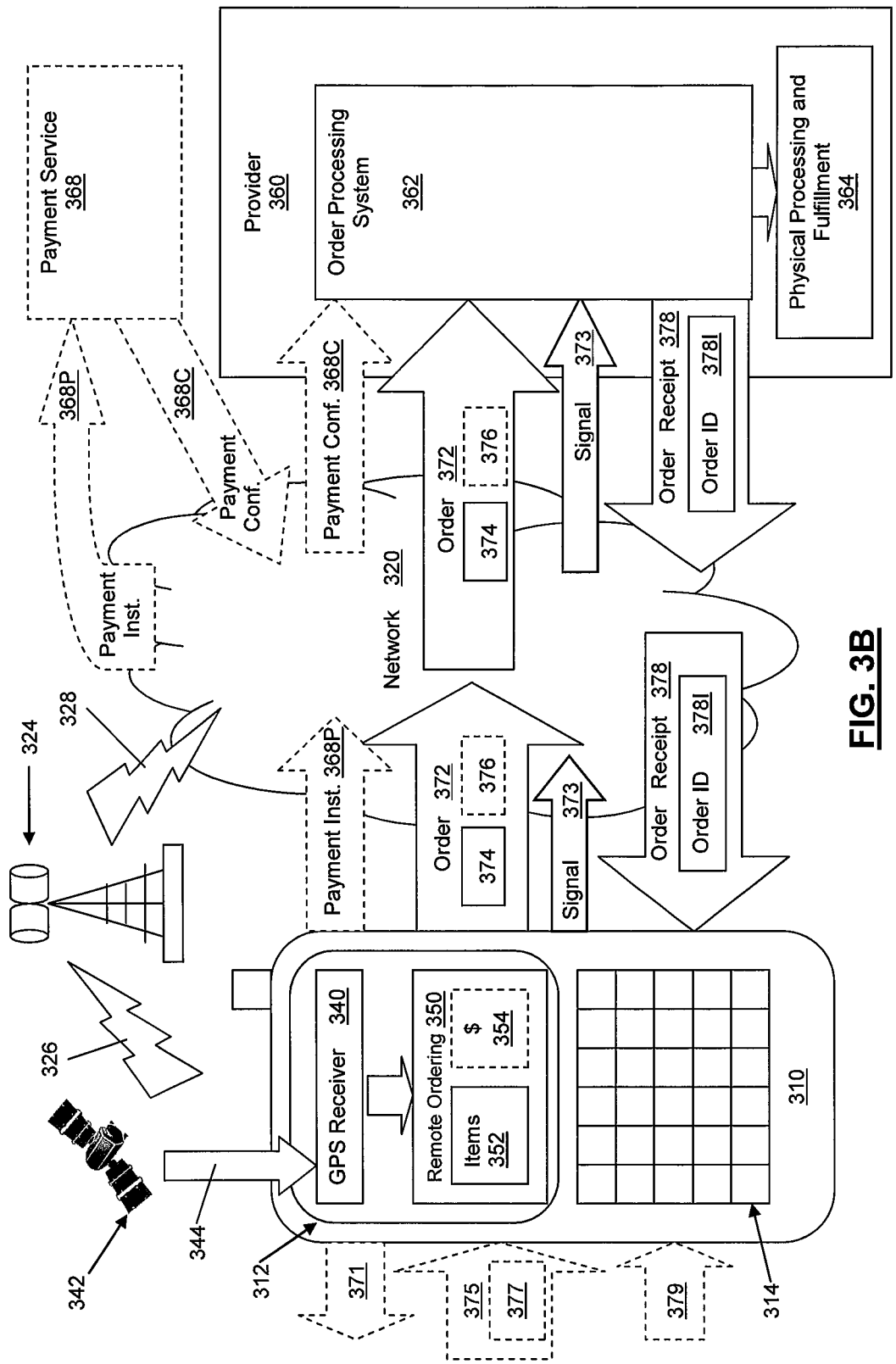
FIG. 3B shows a schematic representation of a second exemplary arrangement for implementing a method for scheduling processing of an order by a provider.

An alternate embodiment of the arrangement in FIG. 3A is shown in FIG. 3B. In this alternate embodiment, instead of waiting to transmit the order 372 until the estimated processing time for the order 372 is approximately equal to the estimated remaining travel time to the relevant provider location 366, the order 372 is transmitted by the smartphone 310 in advance. In such an embodiment, while the payment information 376 may be processed and the order receipt 378 sent immediately, physical processing and fulfillment 364 of the order 372 will be held in abeyance until the smartphone 310 transmits a separate communication or signal 373 to the provider 360 signaling that processing should begin (step 220 of the method 200 in FIG. 2). Thus, the location-based communication may be associated with the order 372 by containing the order 372, as shown in FIG. 3A, or may be a separate communication 373 that is associated with the order 372, for example by means of a suitable order identifier, as shown in FIG. 3B. The order completion estimate may be calculated by the smartphone 310, or may be sent to the smartphone 310 from the order processing system 362, which can use the order 372 to generate the order completion estimate. The arrangement shown in FIG. 3B is otherwise similar to the arrangement shown in FIG. 3, and hence like reference numerals are used to refer to like features.

In embodiments such as the one shown in FIG. 3B where the order 372 is transmitted ahead of time, the provider 360 may carry out some initial physical processing steps upon receiving the order 372 while holding the final processing steps in abeyance until the order processing system 362 receives the signal 373. Typically, the initial physical processing steps would be those that are not critical to issues of freshness, spoilage or degradation and the final processing steps held in abeyance would be those that will have an effect on freshness, spoilage or degradation if not timed correctly. For example, where the order 373 is for a pizza, the provider 360 may prepare the pizza in response to the order 372, but not cause the pizza to be placed in the oven until the order processing system 362 receives the signal 373 indicating that the user's travel time is approximately equal to the cook time for the pizza. Thus, the signal 373 to commence processing the order 372 may be a signal to commence a final stage of processing.

Optionally, determination and monitoring of the arrival estimate may be deferred for some time after receiving the order 372 in the smartphone 310. In one embodiment, the user may enter the order 372 into the smartphone 310, but the smartphone 310 would not transmit the order 372 until the user selects an "I'm on my way" or similar button on the smartphone 310. For example, the user may place a dinner order in the early afternoon while still at work, several hours before he or she plans to leave.

Optionally, the smartphone 310 provides a notification 371 (step 212 of the method 200A in FIG. 2A) before transmitting the order 372 (FIG. 3A) or the signal 373 (FIG. 3B) to the order processing system 362 signaling that processing should begin. Also optionally, the smartphone 310 allows the user to provide a delay instruction 375 to the smartphone 310 to delay transmission of the order 372 (FIG. 3) or the signal 373 (FIG. 3B). This relates to steps 214, 216 and 218 of the method 200A in FIG. 2A. The delay instruction 375 may be for a set period of time (e.g. 5 or 10 minutes), or the user may specify a time period 377 in the delay instruction 375. The sequence of notification 371 and delay instruction 375 may operate recursively, i.e. following expiration of the time period 377 specified by the previous delay instruction 375, the smartphone 310 may provide a further notification 371 providing the user with an opportunity to provide a further delay instruction 375. The notification 371 may be an audible notification, a visual notification or an audiovisual notification, and the delay instruction 375 may be provided by voice command or by keyboard or touchscreen input. The delay instruction 375 may be provided in response to the notification 371, or independently, for example to cause the notification 371 or the signal 373 to be sent a set period of time after the time that the notification 371 or the signal 373 would ordinarily be sent based on the location of the smartphone 310. Also optionally, the smartphone 310 can receive a cancel delay command 379 to cancel a previously received delay instruction 375.

Figure 3C:
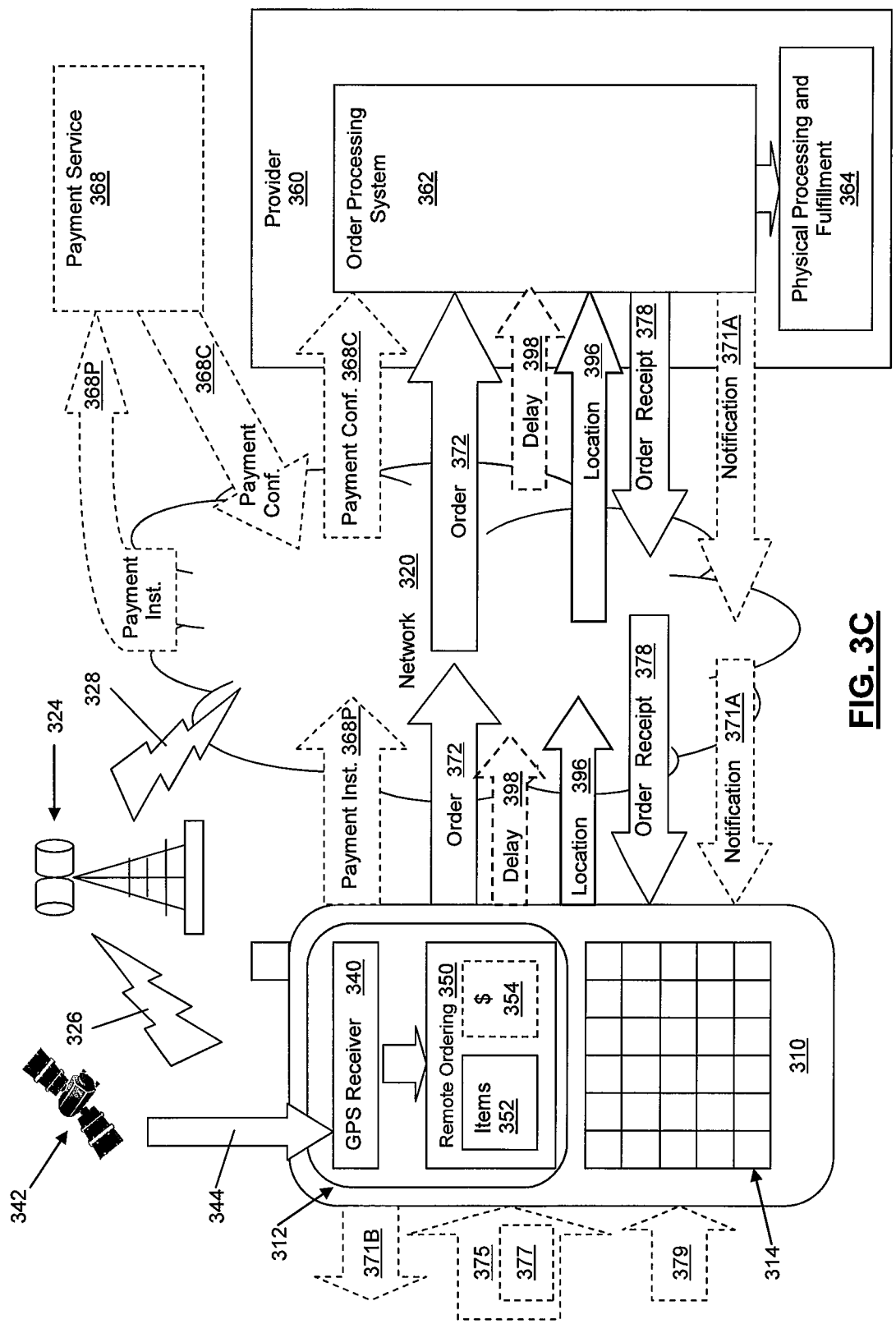
FIG. 3C shows a schematic representation of a third exemplary arrangement for implementing a method for scheduling processing of an order by a provider.

Reference is now made to FIG. 3C, which shows another alternate embodiment of a method for processing an order. The embodiment shown in FIG. 3C is similar to the embodiments shown in FIG. 3A and 3B, with like reference numerals referring to like features, but in the embodiment shown in FIG. 3C the method 200/200A from FIG. 2/FIG. 2A is executed by the order processing system 362 rather than the smartphone 310.

In the embodiment shown in FIG. 3C, the smartphone 310 transmits the order 372 to the order processing system 362 (the identification 374 of the type and quantity of goods being ordered as well as payment information 376 are included in the order 372 and are omitted from FIG. 3C for simplicity of illustration only). In the embodiment shown in FIG. 3C, receipt by the order processing system 362 of the order 372 is step 202 of the method 200/200A in FIG. 2/FIG. 2A. The smartphone 310 also transmits location information 396, obtained from the GPS receiver 340 or other locating system, to the order processing system 362, either without prompting or in response to a query from the order processing system 362. In a preferred embodiment, the location information 396 comprises an initial arrival estimate calculated by the GPS receiver 340 or other locating system, in which case receipt of the location information 396 at the order processing system is step 204 of the method 200/200A in FIG. 2/FIG. 2A. Alternatively, the location information 396 may simply comprise a then-current location of the smartphone 310, in which case step 204 of the method 200 will comprise the order processing system 362 determining an initial arrival estimate based on the location information 396. The order processing system 362 will also execute step 206 of the method 200/200A in FIG. 2/FIG. 2A, for example by using a predetermined order completion estimate or by calculating the order completion estimate from the order 372. In an alternate embodiment, the remote ordering application 350 on the smartphone may embed an initial order completion estimate in the order 372 and the order processing system 362 may obtain the order completion estimate by extracting it from the order 372.

Similarly to the embodiment described in respect of FIG. 3B, determination and monitoring of the arrival estimate may be deferred for some time after receiving the order 372 in the smartphone 310, for example until the user selects an "I'm on my way" or similar button on the smartphone 310.

The order processing system 362 then executes step 208 of the method 200/200A in FIG. 2/FIG. 2A. If the order processing system 362 determines that the arrival estimate and the order completion estimate substantially coincide, the order processing system 362 will execute step 220 of the method 200/200A in FIG. 2/FIG. 2A and send a signal to commence processing of the order, for example by sending instructions to a particular provider location. The signal sent at step 220 of the method 200/200A in FIG. 2/FIG. 2A may be internal to the order processing system 362.

If the order processing system 362 determines that the arrival estimate and the order completion estimate do not substantially coincide, then the order processing system 362 will update one or both of the order completion estimate (step 210 of the method 200/200A in FIG. 2/FIG. 2A) and the arrival estimate and then again compare the arrival estimate and the order completion estimate (step 208 of the method 200/200A in FIG. 2/FIG. 2A), continuing this cycle until the order processing system 362 determines that the order completion estimate and the arrival estimate do substantially coincide.

Updating the arrival estimate by the order processing system 362 may comprise receiving updated location information 396 from the smartphone 310, either in response to a query from the order processing system 362 or with the location information 396 being sent automatically, such as periodically, from the smartphone 310. In such embodiments, the updated location information 396 may comprise an updated arrival estimate calculated by the GPS receiver 340 or other locating system, in which case step 210B of the method 200/200A in FIG. 2/FIG. 2A is fulfilled by receipt of the location information 396 at the order processing system 362. If the location information 396 is an updated location of the smartphone 310, step 210B of the method 200/200A in FIG. 2/FIG. 2A will comprise the order processing system 362 determining an updated arrival estimate based on the updated location information 396. The order processing system 362 may also update the order completion estimate (step 210A of the method 200/200A in FIG. 2/FIG. 2A), for example based on updated information about queues and latency at the particular provider location that will process the order 372.

In one embodiment of the arrangement shown in FIG. 3C, the arrival estimate will only be updated if the user deviates from an expected route or if the smartphone 310 detects a significant variance in the arrival estimate. A map (not shown) covering the expected route from the current location of the smartphone 310 to the provider location may be sent to the smartphone 310, for example in response to receipt of the order 372 or in response to the user selecting the "I'm on my way" button. The remote ordering application 350 can, directly or in cooperation with a navigation application (not shown) on the smartphone 310, use the map to monitor the user's location via GPS, without the use of data services and calculate a dynamic estimated time of arrival at the provider location. If the remote ordering application 350 detects that the user has deviated from the planned route along the map, or that the estimated time of arrival at the provider location varies from the initial arrival estimate by more than a threshold amount, then an updated arrival estimate can be provided to the order processing system 362.

Optionally, in a manner similar to the embodiments shown in FIGS. 3A and 3B, the embodiment shown in FIG. 3C may provide for the user to receive a notification before physical processing and fulfillment 364 of the order 372 begins and be given an opportunity to delay physical processing of the order 372. In the embodiment shown in FIG. 3C, before beginning physical processing and fulfillment 364 of the order 372, the order processing system 362 would send a notification signal 371A to the smartphone 310 (step 212 of the method 200A of FIG. 2A), and the smartphone 310 would, in response to the notification signal 371A, provide a notification 371B to the user and allow the user to enter into the smartphone 310 a delay instruction 375, which may be for a set period of time (e.g. 5 or 10 minutes), or may specify a time period 377. The smartphone 310 would then send a delay signal 398 to the order processing system 362, in response to which the order processing system 362 would delay transmitting the signal to commence processing of the order 372. This relates to steps 214, 216, and 218 of the method 200A in FIG. 2A. Similarly to the embodiments shown in FIGS. 3A and 3B, in the embodiment shown in FIG. 3C the sequence of notification signal 371A, notification 371B, delay instruction 375 and delay signal 398 may operate recursively, i.e. following expiration of the time period 377 specified by the previous delay instruction 375, the order processing system 362 may provide a further notification signal 371A and the smartphone 310 may then provide a further notification 371B, thereby enabling the user to provide a further delay instruction 375. As in the embodiments shown in FIGS. 3A and 3B, in the embodiment shown in FIG. 3C, the smartphone 310 can receive a cancel delay command 379 (step 218 of the method 200A shown in FIG. 2) to cancel a previously received delay instruction 375, in which case the smartphone 310 would send a delay cancellation signal (not shown) to the order processing system 362.

In certain other embodiments, the order 372 may be sent from a different networked computing device than the user's networked mobile wireless telecommunication computing device, such as a computer's home computer or office computer. In such embodiments, the user's networked mobile wireless telecommunication computing device would still provide either a signal 373 to commence processing, or location information 396 to enable the order processing system 362 to determine when to commence processing. For example, a user could use his or her office computer to submit the order 372 that he or she intends to pick up on the way home from work. In such embodiments, the order may be prepared and sent using a web page operated by the provider 360.

Figure 3D:
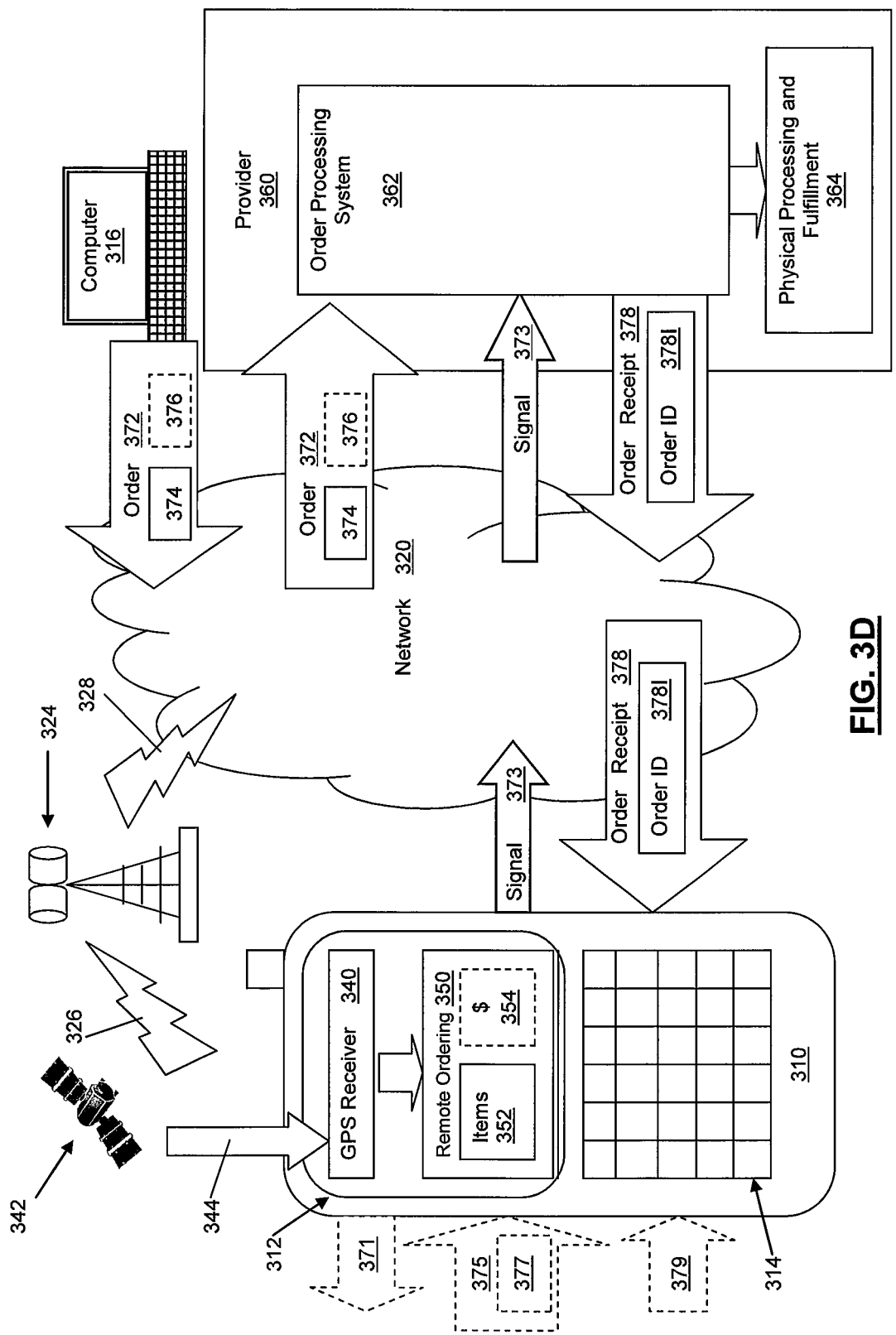
FIG. 3D shows a schematic representation of a fourth exemplary arrangement for implementing a method for scheduling processing of an order by a provider.
Figure 3E:
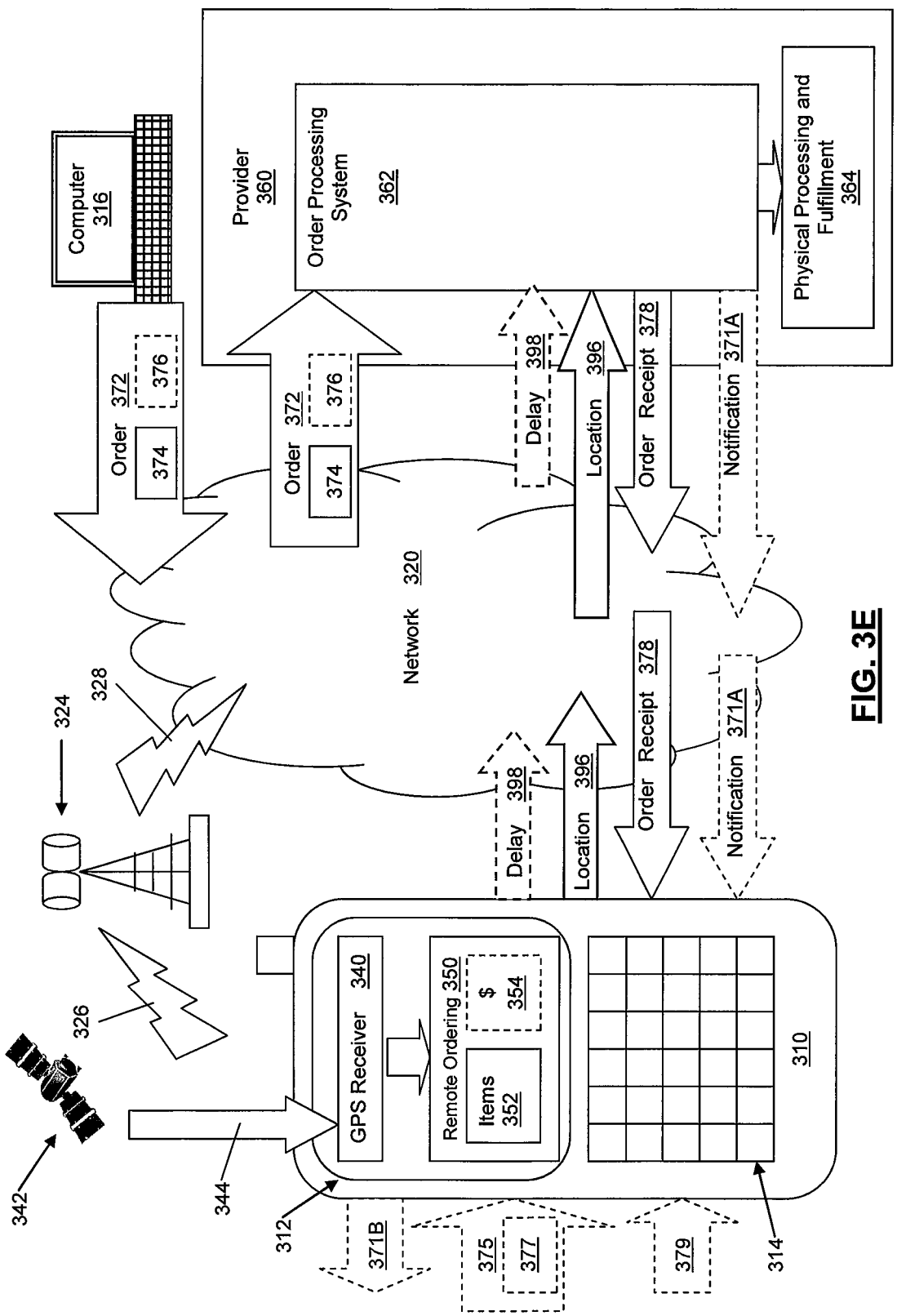
FIG. 3E shows a schematic representation of a fifth exemplary arrangement for implementing a method for scheduling processing of an order by a provider.

FIGS. 3D and 3E show arrangements similar to those in FIGS. 3B and 3C, respectively, except that the order 372 is sent from another computing device, in this case a user's desktop computer 316, to the provider 360. The payment instructions can be sent from the desktop computer 316 with the order 372, or may be sent separately from the smartphone 310, for example with the signal 373. Simply for ease of illustration, the payment service 368, payment instructions 368P and payment confirmation 368C are not shown in FIGS. 3D and 3E although they may be present in practice. The order receipt 378 is sent to the remote ordering application 350 on the smartphone 310 to facilitate transmission of the signal 373 (FIG. 3D) or the location information 396 (FIG. 3E) by the smartphone 310.

The arrangements shown in FIGS. 3D and 3E allow one individual to enter an order 372 to be picked up by another individual through the use of a linking feature. For example, suppose Penny is in the office and her boss asks her to work late, disrupting her plan to cook dinner when she gets home. She telephones her husband and tells him to order some food, since she does not even have time to place an order. Her husband then places an order, using his computer or smartphone, and links the order to Penny's smartphone, which may provide a notification of the linked order and the pickup location. When she is ready to leave work, Penny could then open the remote ordering application, open the relevant order, select the "I'm on my way" button, and operation of the system will proceed as described above. Optionally, the remote ordering application could also provide navigation support to guide Penny to the pickup location. Also optionally, in some embodiments the system could enable the individual who placed the order to monitor both the estimated arrival time of the second individual at the pickup location as well as the estimated arrival time of the second individual at the ultimate destination (e.g. home).

Linking can also be used to provide for an approvals process, for example by providing a master account with one or more sub-accounts linked to the master account. Generally, the master account is associated with an individual who is paying for the goods. For example, a minor child who has a smartphone or other suitable device could be given a sub-account under his or her parents' master account. On her lunch break at school, the minor child may use the remote ordering application 350 to place an order at a quick service restaurant near her school. This would trigger an alert on one or both of her parents' smartphones, allowing them to see what she has ordered and approve or reject it. The remote ordering application 350 would not allow the order 372 or the signal 373 to be sent so as to initiate order processing unless the order was approved by a master account holder. The master account could include other features such as spend tracking and/or tracking the location of the minor child.

Figure 4A:
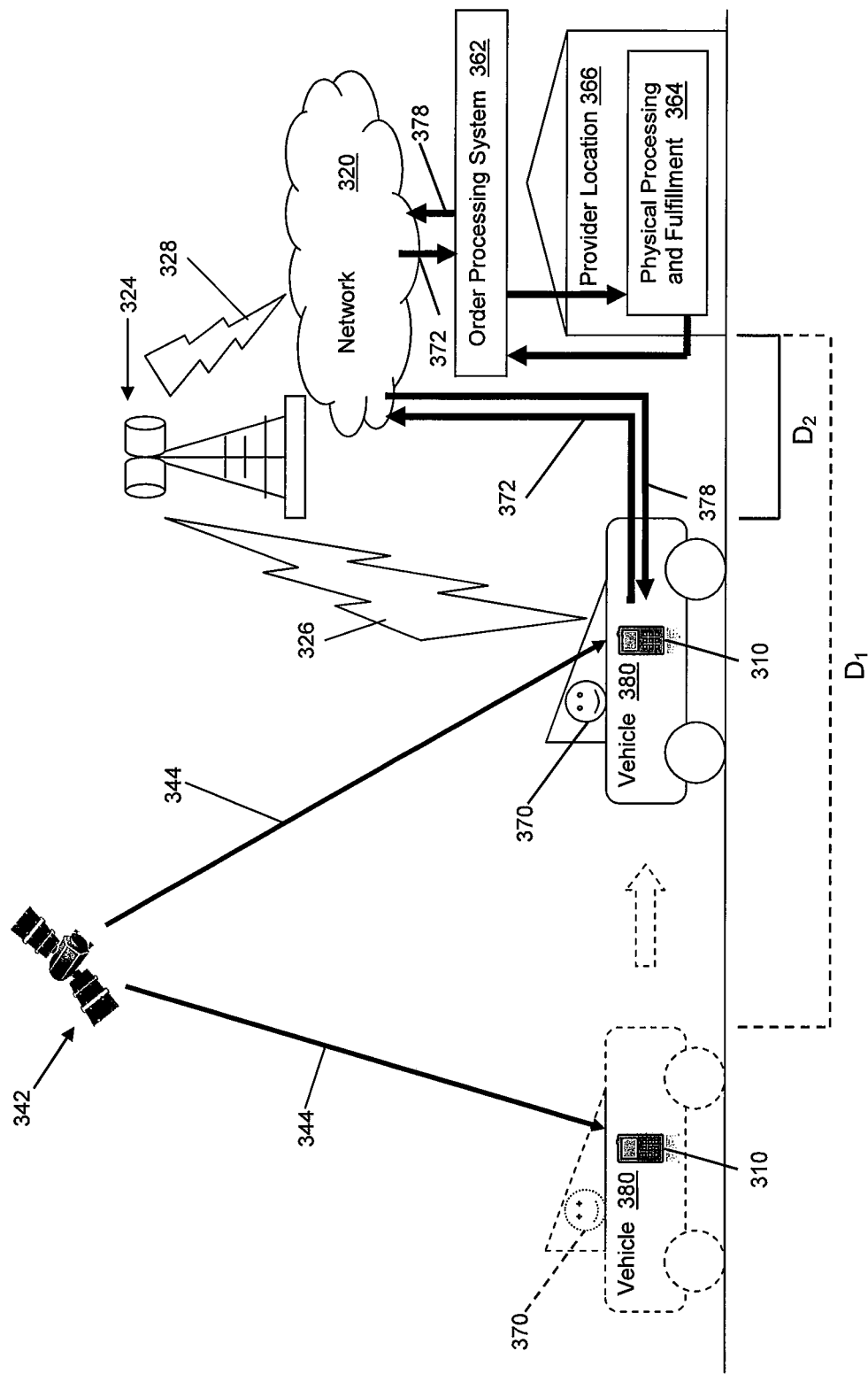
FIG. 4A shows schematically the operation of a communication process for the embodiment shown in FIG. 3A.

Reference is now made to FIG. 4A, which shows schematically the operation of a communication process for the arrangement shown in FIG. 3A. A user 370 has generated an order 372 using the remote ordering application 350 on his or her smartphone 310, and then entered his or her vehicle 380 and started driving to the provider location 366 from which the goods are to be collected. As the user 370 begins driving, the user 370, and hence the smartphone 310, are a first distance Di from the provider location 366, as determined by the GPS receiver 340 (FIG. 3A) using the signals 344 from the satellites 342. The distance $D_1$ is such that the estimated remaining travel time for the user 370 and vehicle 380 to arrive at the provider location 366 is greater than the estimated processing time for the order 372. As such, in the embodiment shown in FIGS. 3A and 4A, the order 372 is stored in memory of the smartphone 310 but has not yet been transmitted to the order processing system 362 through the network 320.

As the user 370, vehicle 380 and smartphone 310 travel toward the provider location 366, the estimated travel time is updated, continuously or periodically, and compared to the estimated processing time for the order 372 by the smartphone 310. When the user 370, vehicle 380 and smartphone 310 are a second distance D2 from the provider location 366, which is less than the distance $D_1$, the estimated travel time remaining to arrive at the provider location 366 is approximately equal to the estimated processing time for the order 372; that is, the arrival estimate and the order completion estimate substantially coincide. The remote ordering application 350 then transmits the order 372 to the order processing system 362, via the network 320. The order processing system 362 then processes the payment information 376 and sends the order receipt 378 and also causes physical processing and fulfillment 364 of the order 372 at the appropriate provider location 366 to commence.

Figure 4B:
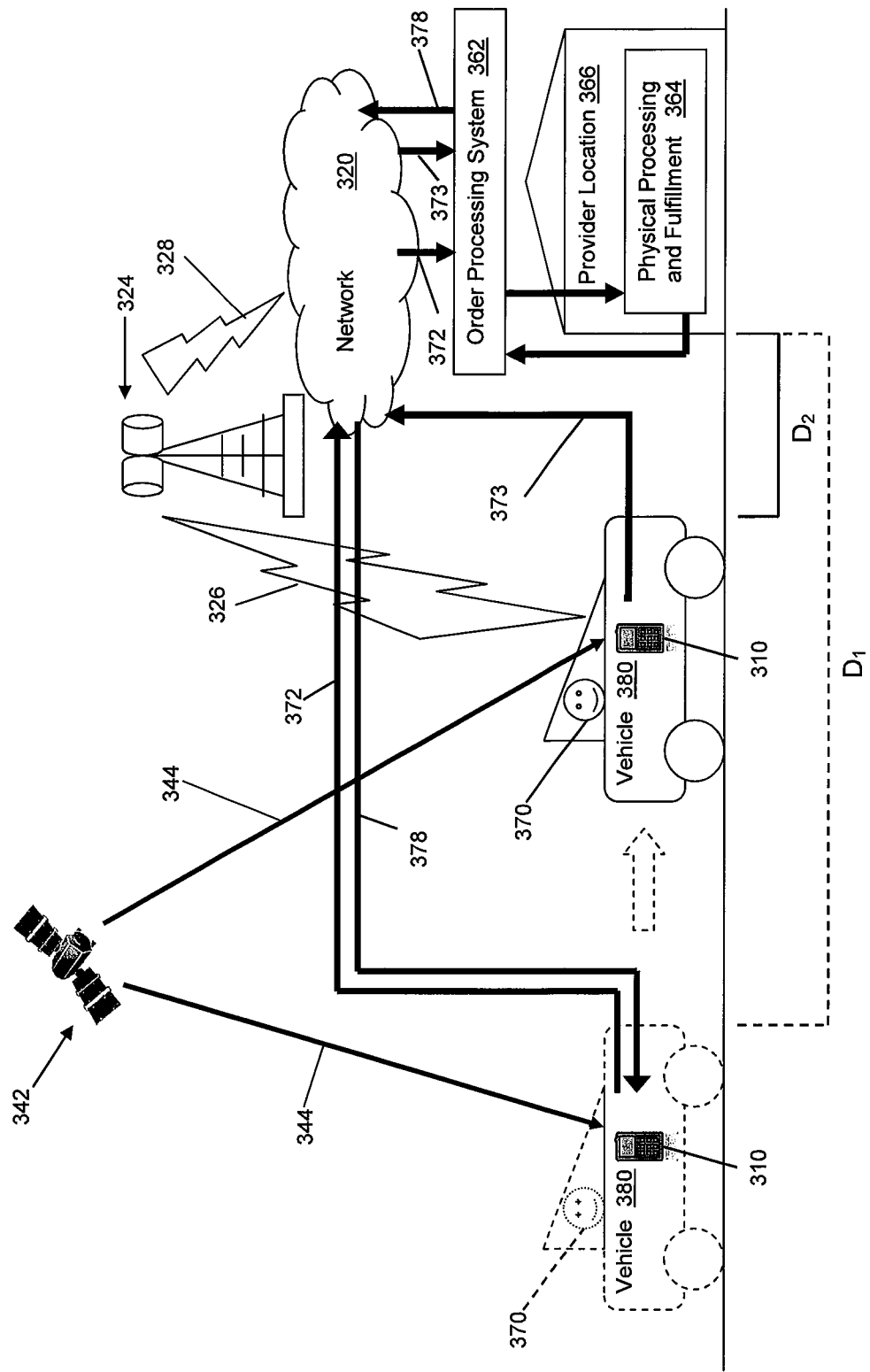
FIG. 4B shows schematically the operation of a communication process for the embodiment shown in FIG. 3B.

FIG. 4B shows schematically the operation of the location-triggered communication process for the arrangement shown in FIG. 3B, and is identical to FIG. 4A, with like reference numerals used to refer to like features, except that in FIG. 4B the order 372 is transmitted, payment processed and the order receipt 378 returned shortly after being entered into the smartphone 310, with a separate signal 373 to commence processing to be transmitted later. In the embodiment shown in FIGS. 3B and 4C, the order 372 is transmitted while the user 370, and hence the smartphone 310, are a first distance $D_1$ from the provider location 366, where the distance $D_1$ is such that the estimated remaining travel time for the user 370 and vehicle 380 to arrive at the provider location 366 is greater than the estimated processing time for the order 372; that is, the arrival estimate and the order completion estimate do not substantially coincide. As such, the signal 373 to commence processing has not yet been transmitted to the order processing system 362. When the user 370, vehicle 380 and smartphone 310 are at the second distance D2 from the provider location 366 where the arrival estimate and the order completion estimate substantially coincide, the remote ordering application 350 then transmits the signal 373 to commence processing to the order processing system 362. For the arrangement shown in FIG. 3D, the operation of the location-triggered communication process is the same as that shown in FIG. 4B, except that the order 372 is transmitted by the user's desktop computer 316 instead of the user's smartphone 310, as shown in FIG. 4D.

Figure 4C:
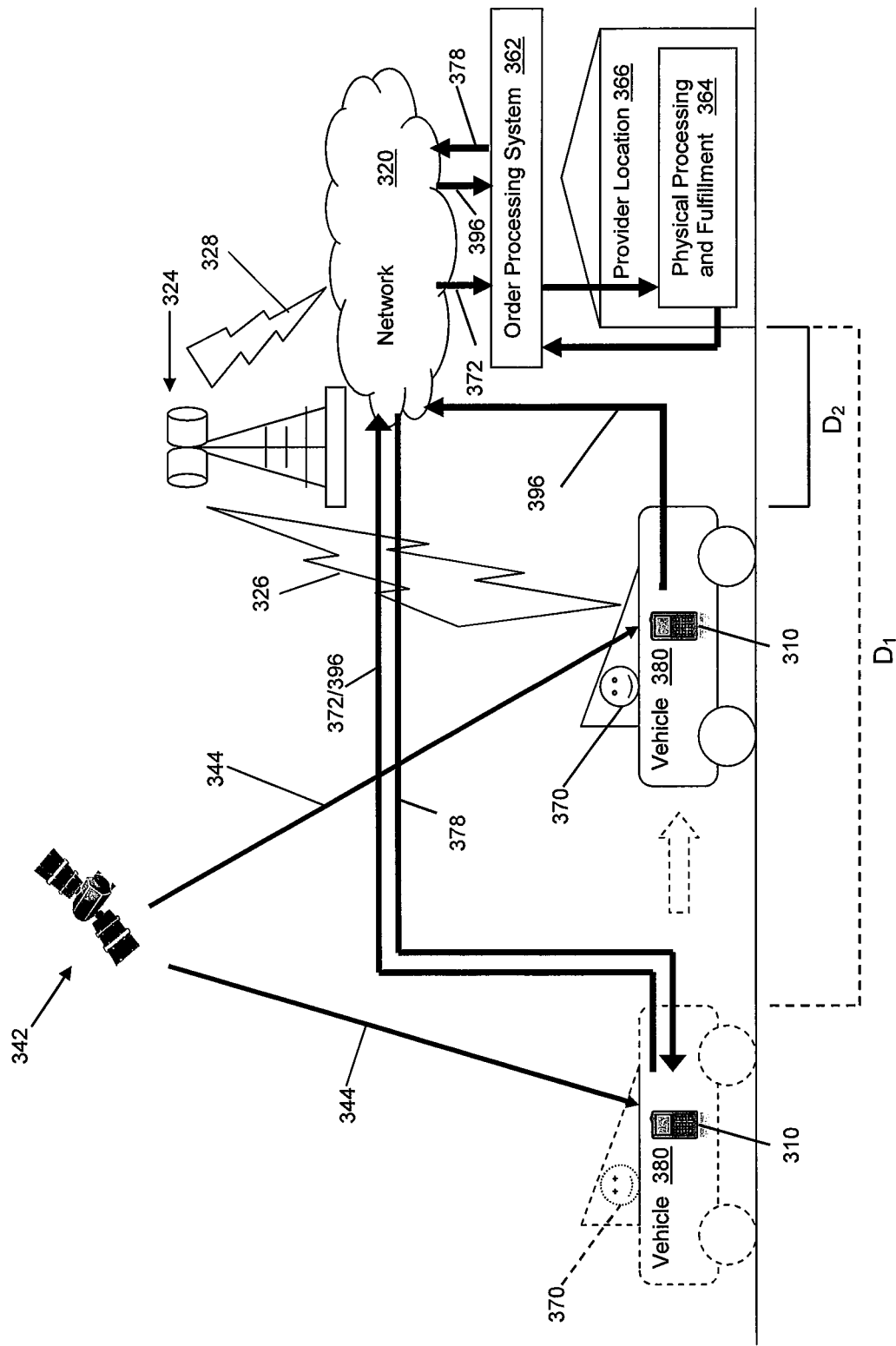
FIG. 4C shows schematically the operation of a communication process for the embodiment shown in FIG. 3C.
Figure 4D:
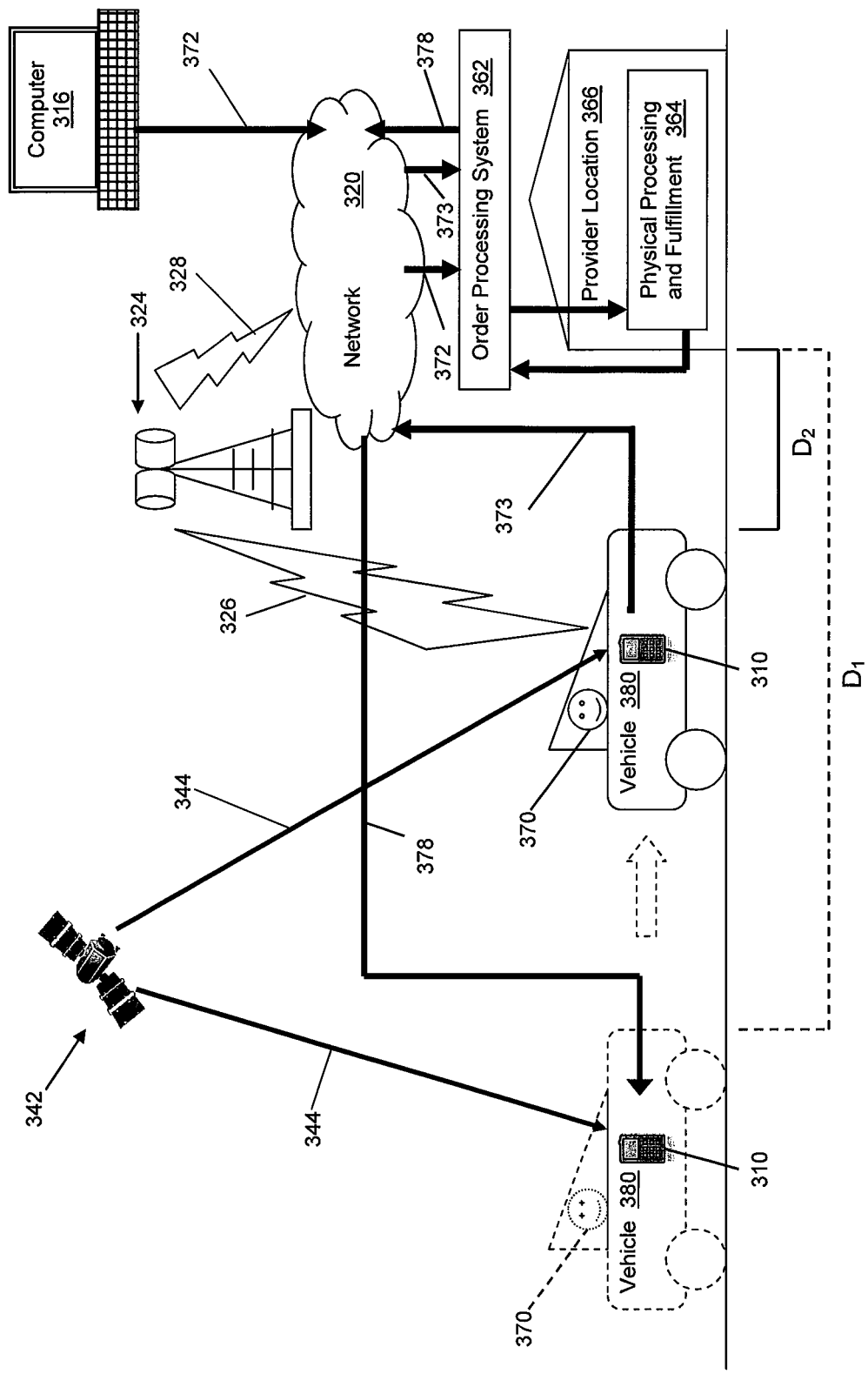
FIG. 4D shows schematically the operation of a communication process for the embodiment shown in FIG. 3D.
Figure 4E:
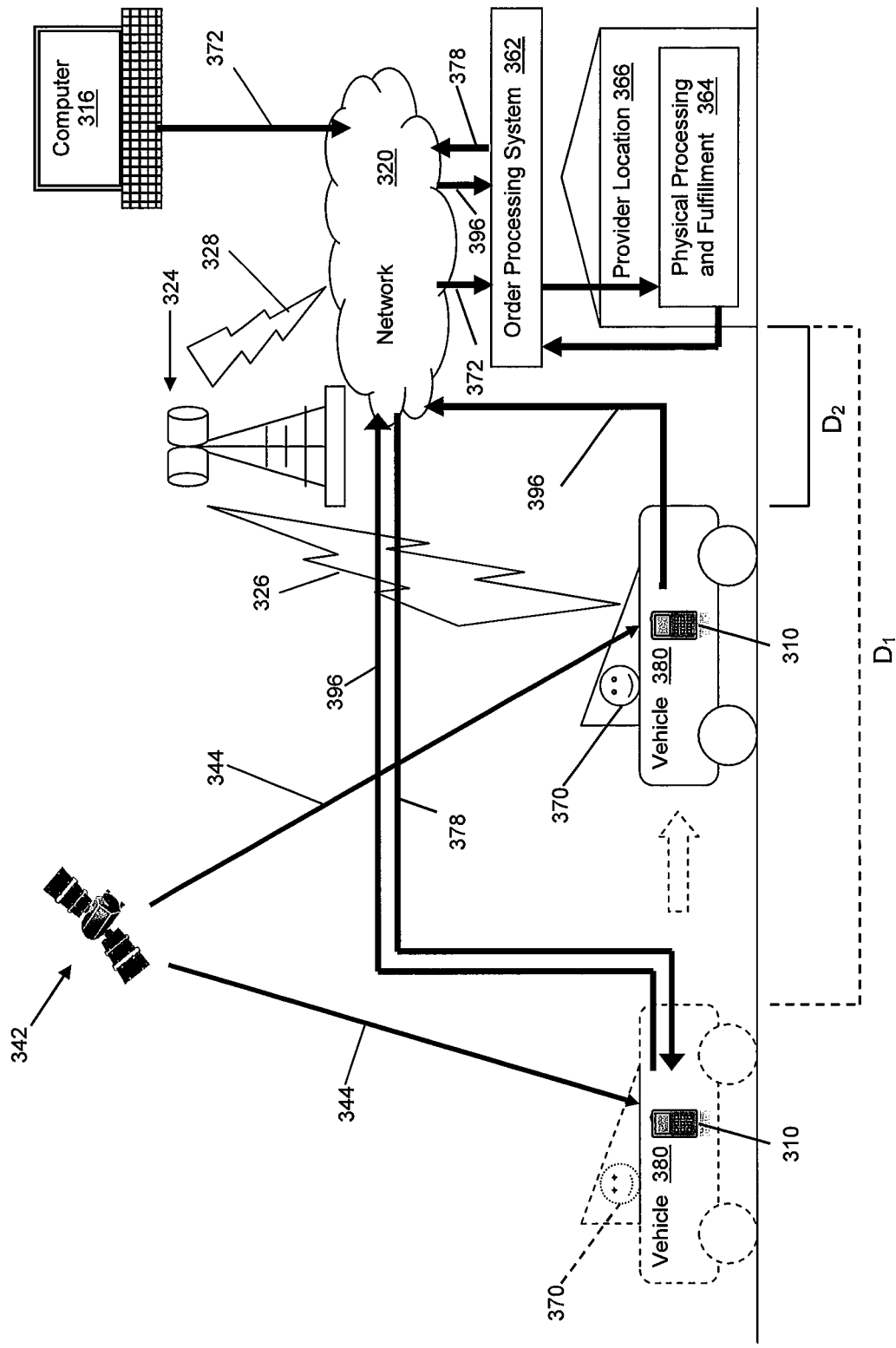
FIG. 4E shows schematically the operation of a communication process for the embodiment shown in FIG. 3E.

FIG. 4C shows schematically the operation of the location-triggered communication process for the arrangement shown in FIG. 3C, in which the method 200/200A from FIG. 2/FIG. 2A is executed by the order processing system 362 rather than the smartphone 310. FIG. 4C is similar to FIG. 4B, with like reference numerals used to denote like features, except that instead of transmitting a signal 373 to commence processing to the order processing system 362, the smartphone 310 sends location information 396 to the order processing system 362. Initial location information 396 is transmitted with the order 372, which is sent when the user 370, and hence the smartphone 310, are a first distance $D_1$ for which the arrival estimate and the order completion estimate do not substantially coincide, and the smartphone 310 continues to send location information 396 as the user 370 and smartphone 310 approach the provider location 366. When the location information 396 enables the order processing system 362 to determine that the arrival estimate and the order completion estimate substantially coincide, i.e. at distance D2, the order processing system 362 sends the signal for the provider location 366 to commence processing of the order. For the arrangement shown in FIG. 4E, the operation of the location-triggered communication process is the same as that shown in FIG. 4B, except that the order 372 is transmitted by a user's desktop computer 316 instead of the user's smartphone 310 and the smartphone 310 only transmits location information 396, as shown in FIG. 4E.

In one embodiment, handling of a situation where the smartphone 310 becomes unable to determine its location, for example because of a failure of the GPS receiver 340, may depend on whether the order processing has commenced. If order processing has not started (or the signal to commence processing has not been transmitted), then an error message is generated, which may suspend or cancel the order, or give the user the option to continue with the order despite the fact that order completion may not coincide with his or her arrival. If the user chooses to proceed, then the smartphone 310 or order processing system 362 may use the most recent arrival estimate and decrement from it as time elapses (e.g. if the last arrival estimate was seven minutes, the system will count down from seven minutes). On the other hand, if order processing has already commenced (or the signal to commence processing has been transmitted), then the smartphone 310 or order processing system 362 will simply use the most recent arrival estimate. Thus, decrementing may also be used as a "fallback" procedure for updating the arrival estimate in the case where dynamic recalculation is the primary procedure but such dynamic recalculation fails.

Because processing of the order 372 is delayed until receipt of a location-triggered communication sent when the estimated processing time for the order 372 is approximately equal to the estimated travel time to the provider location 366, the user 370 will generally arrive at the provider location at about the same time as physical processing and fulfillment 364 of the order 372 is completed. As a result, in most circumstances, when the user 370 arrives at the provider location 366, physical processing and fulfillment 364 of the order 372 will either be about to be completed, or have just been completed, so that there is very little waiting by the user 370 for the goods or by the goods for the user 370. This is particularly important where the quality of the goods deteriorates quickly over time, such as with restaurant meals, and can also reduce the amount of time that a user waits in line, as compared to the case where the user places the order upon arrival at the provider location. As such, although these methods are not limited to these establishments, certain systems, methods and computer program products described herein have particular application in respect of quick service or "fast food" type restaurants and coffee and donut shops. For example, a remote order can be placed in advance as described above, specifying a drive through pick-up, and the user could simply drive up to the window, present the order receipt 378 and pick up the order, rather than having to drive up, stop to order, stop to pay and then stop and wait for the order to be assembled. Where the order identifier 3781 for the order receipt 378 comprises a bar code or a QR code, the user could present the order receipt 378 by presenting the bar code or QR code on the display 312 of the smartphone 310, to be scanned by a suitable scanning device at the provider location 366. This enables the provider location 366 to ensure that the right orders go to the right users.

The provision of a notification 371 and the ability of a user to provide a delay instruction 375 allows for flexibility to adapt to unexpected events. For example, a user may find that he or she is in heavier than expected traffic such that the estimated travel time to the provider location 366 will be inaccurate, or may decide to do an errand on the way to the provider location, and can use the delay instruction 375.

In one exemplary embodiment, a user who regularly visits a coffee shop for morning coffee on the way to work would use the remote ordering application 350 to generate their order 372 before leaving home, and as the user gets close enough to the coffee shop, the order (or signal) would be sent and payment executed (or pre-approved) so that all the user would have to do is pick up the order, thereby circumventing the line. The remote ordering application 350, or a web site of the provider 360 accessed from a desktop computer 316, can enable creation of a "regular" order, such as the daily coffee order described above, which would be automatically initiated when the user gets close enough to the relevant provider unless cancelled by the user. For example, when the user first activates the smartphone 310 on a given day, the remote ordering application 350 can remind the user of the "regular" order and present the user with the option to cancel it for that day. Such a "regular" order can be set to operate only on certain days, such as weekdays for the coffee shop example described above.

A "regular" order as described above can be created manually by a user, or automatically by a remote ordering application 350 based on tracking or previous orders. For example, where a user demonstrates a consistent pattern of ordering coffee from a particular location on weekday mornings for pickup around 8:00, for example over a period of one or two weeks, the remote ordering application 350 may automatically generate a "regular" order and provide a prompt at 6:30 such as "I have noticed you order coffee about this time—shall I order it for you?"

In the restaurant context, the methods, systems and computer program products described herein are not limited to take-out orders, and in some embodiments a "dine in" feature may be provided. For example, where a group of friends are going to a restaurant after work, one of them can order drinks and/or appetizers, the preparation of which could then be scheduled so that they are ready when the group arrives. In addition, where two or more people who are going to a restaurant from different locations one of them could place an order using his or her smartphone and link it to the other smartphone(s), or each could place his or her own orders and the orders could then be linked. Arrival estimates would be obtained and updated for each person, and order processing would be scheduled to substantially coincide with arrival of the last of them to arrive. Another application of a "dine in" feature is for meals after organized children's sporting events. It is not uncommon for a coach to take a children's sports team to a quick service restaurant after a game, often overwhelming the establishment. As a result, the turnaround time can be quite long, whereas with the methods, systems and computer program products described herein, the order can be ready when the team arrives.

It is also contemplated that in certain embodiments, one "master" networked mobile wireless telecommunication computing device could aggregate orders entered onto a plurality of other networked devices into a "master" order.

Such embodiments could be used, for example, to enable a single order to be placed in advance for the passengers of a long-distance coach bus.

The methods, systems and computer program products described herein are not limited to restaurant applications, and may also be used for other retailers, such as a beer or liquor retailer. Certain of the methods, systems and computer program products described herein, although not limited thereto, may have particular application in respect of a grocery store, where an order may contain certain items that require refrigeration and may degrade or perish if the order is left out for too long after being assembled, while also containing other items that could be degraded if placed in refrigeration. To facilitate such applications, a dedicated grocery pick up facility may be provided. By removing many of the aspects associated with conventional grocery shopping, such as wide aisles, large footprint product placement, large open produce sections, cash registers and the like, a condensed facility dedicated to picking and order pickup can be provided that is substantially smaller than a conventional grocery store carrying the same product range. Such dedicated facilities may be provided as standalone locations, or as adjuncts to existing grocery stores.

Figure 5A:
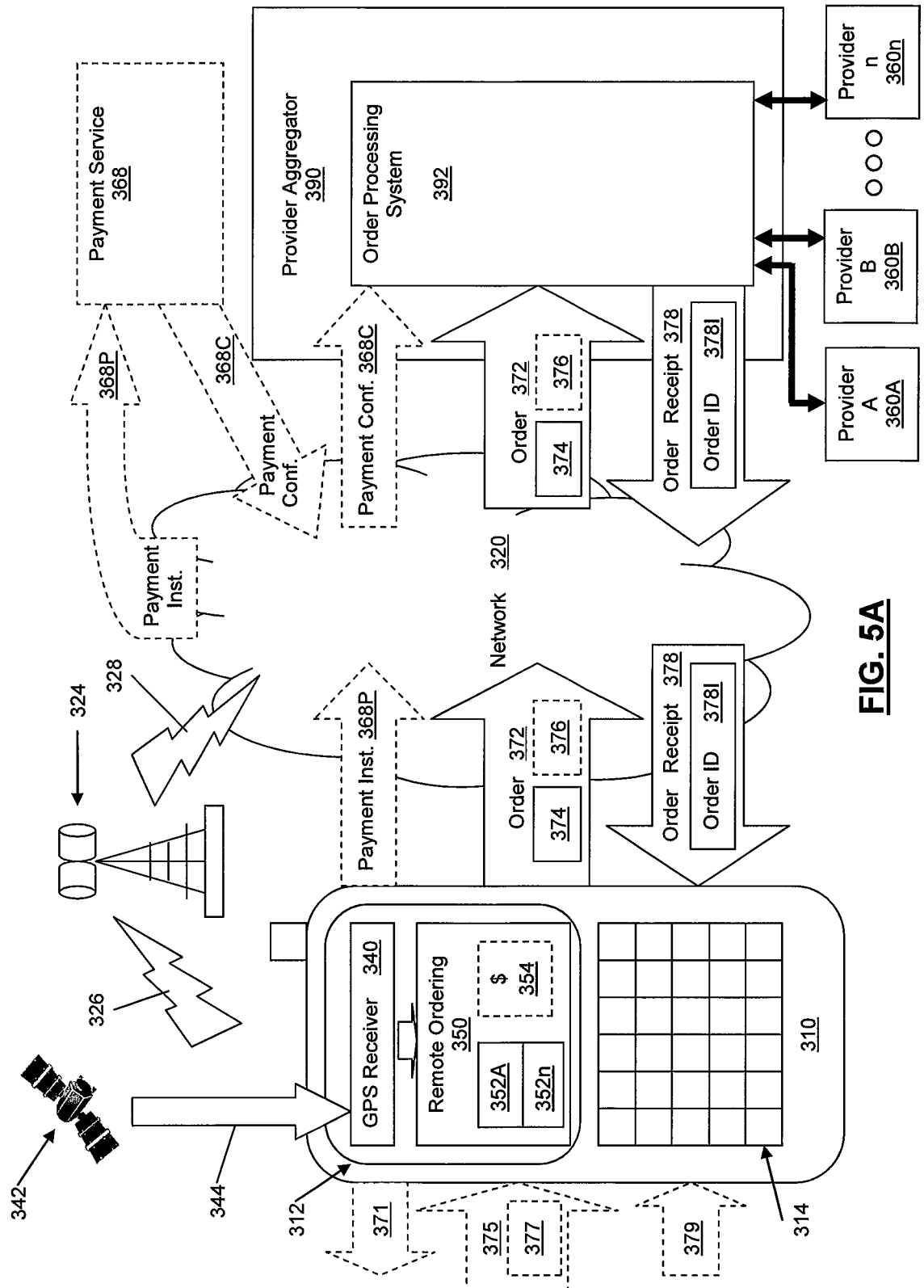
FIG. 5A shows a schematic representation of a first exemplary arrangement for implementing a method for scheduling processing of an order by a provider aggregator.

FIG. 5A shows a schematic representation of another exemplary arrangement for implementing a method for processing an order. The arrangement shown in FIG. 5A is similar in many respects to the exemplary arrangement shown in FIG. 3A, and like reference numerals are used to refer to corresponding features.

In the exemplary arrangement shown in FIG. 5A, the remote ordering application 350 is distributed by a provider aggregator 390 instead of by an individual provider 360. The provider aggregator 390 maintains relationships with a plurality of providers 360A, 360B . . . 360n and aggregates the offerings of goods by those providers 360A, 360B . . . 360n through its own order processing system 392. Like the order processing system 362 of the provider 360, the order processing system 392 of the provider aggregator 390 will typically be a server-type data processing system, which may comprise one or more individual computer systems coupled to the network 320. Details of the providers 360A, 360B . . . 360n are omitted from FIG. 5A for clarity of illustration, but will generally comprise a provider order processing system, one or more provider locations, and facilities for physical processing and fulfillment of orders. The order processing system 392 of the provider aggregator 390 will be coupled, for example via the network 320, to the order processing systems of the providers 360A, 360B . . . 360n.

By aggregating a plurality of providers 360A, 360B . . . 360n the provider aggregator 390 can enable a user to place orders with one or more of a plurality of providers 360A, 360B . . . 360n using a single interface, such as a single web site accessed from a desktop computer 316 or a single remote ordering application 350, which will typically include a plurality of item lists 352A . . . 352n, one for each provider 360A, 360B . . . 360n. For example, where the providers 360A, 360B . . . 360n are restaurants or restaurant chains, the remote ordering application 350 could present a list of restaurants or restaurant locations within a chain and, responsive to one of the restaurants being selected, then present the item list 352A . . . 352n, typically a form of menu, for that restaurant or location, enabling a user to generate the order 372. At the appropriate time, the order 372 is transmitted through the network 320 to the order processing system 392 of the provider aggregator 390 and the payment information 376 processed, and the order 372, or at least the identification 374 of the goods ordered, is routed to the appropriate provider 360A, 360B . . . 360n for physical processing and fulfillment, typically via the order processing system of the respective provider.

Payment arrangements for the provider aggregator 390 are similar to those for the case of an individual provider 360, and may provide for processing of payments by the provider aggregator 390, either on an order-by-order basis or via a pre-established user account, or via an external payment service 368. In such embodiments, the provider aggregator 390 will typically have an arrangement by which the providers 360A, 360B . . . 360n receive the payments processed by the provider aggregator, possibly with a deduction of a service charge by the provider aggregator 390. Alternatively, a user may make payment directly to the provider 360, for example on an order-by-order basis, through a user account established with that provider, or when picking up the goods.

As with the embodiment illustrated in FIG. 3A, in the embodiment shown in FIG. 5A the order 372 is not transmitted from the smartphone 310 until the order completion estimate for the order 372 and the arrival estimate for the user at the relevant provider location substantially coincide.

Figure 5B:
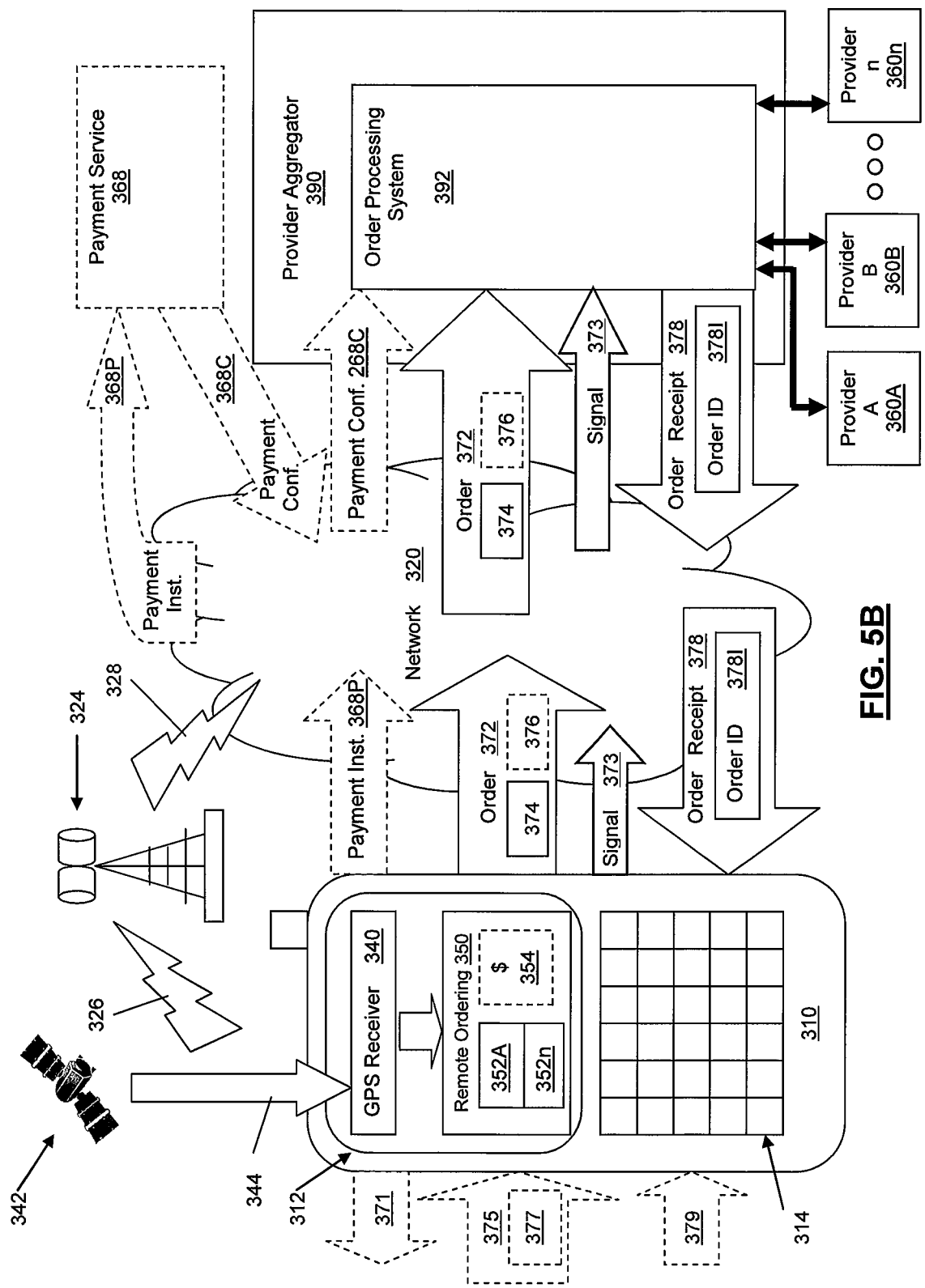
FIG. 5B shows a schematic representation of a second exemplary arrangement for implementing a method for scheduling processing of an order by a provider aggregator.

FIG. 5B shows an alternate embodiment of the arrangement shown in FIG. 5A, which is similar to the arrangement shown in FIG. 3B except that a provider aggregator 390 is interposed between the remote ordering application 350 and a plurality of providers 360A, 360B . . . 360n as shown in FIG. 5A. Thus, in FIG. 5B, the order 372 is transmitted in advance and physical processing and fulfillment of the order 372 is held in abeyance until the smartphone 310 transmits a separate signal 373 to the order processing system 392 of the provider aggregator 390. In FIG. 5B, like reference numerals are used to refer to features corresponding to those in FIGS. 2B and 5A.

Figure 5C:
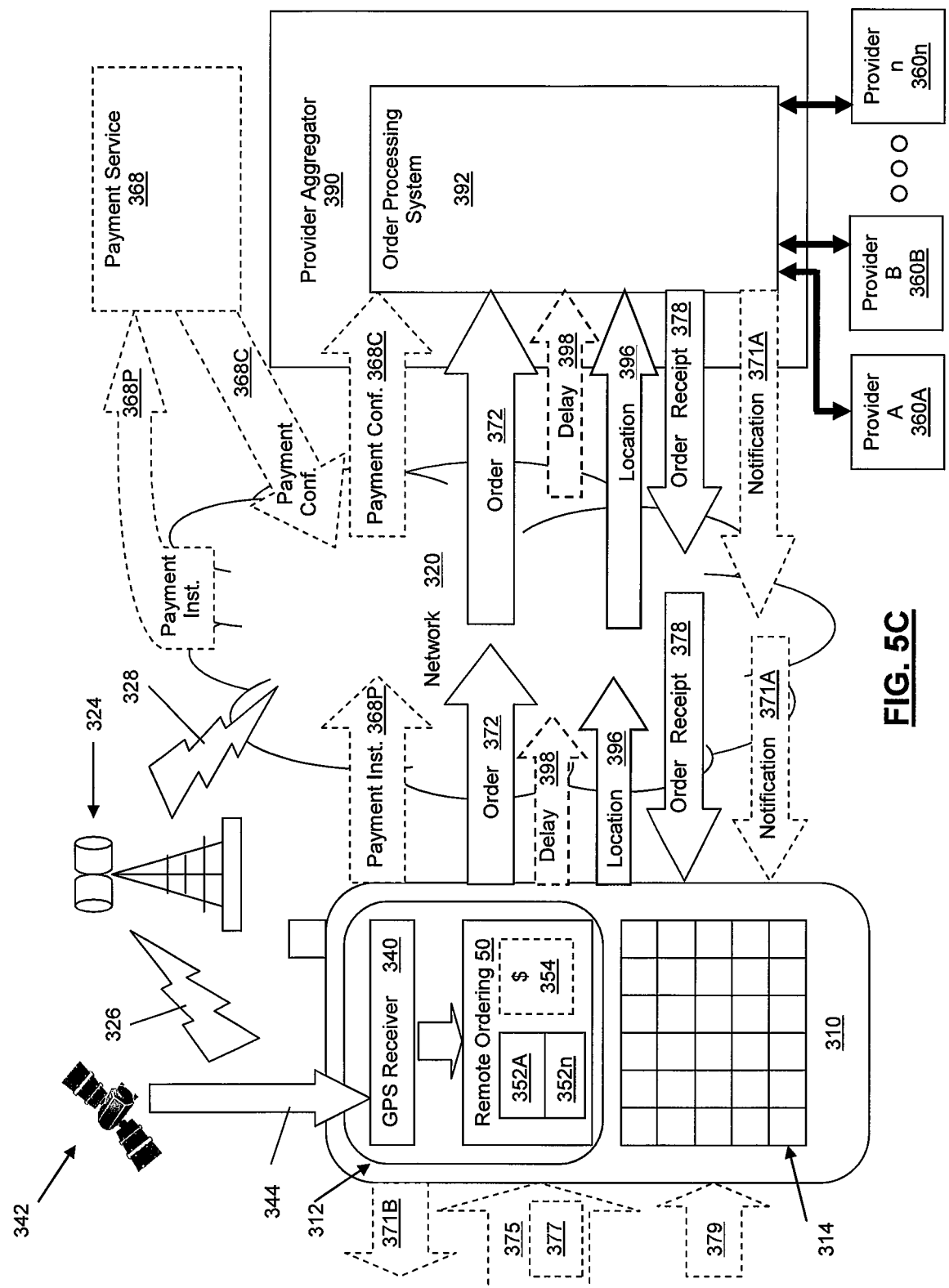
FIG. 5C shows a schematic representation of a third exemplary arrangement for implementing a method for scheduling processing of an order by a provider aggregator.

FIG. 5C shows another alternate embodiment of the arrangement shown in FIG. 5A. FIG. 5C is similar to the arrangement shown in FIG. 3C except that a provider aggregator 390 is interposed between the remote ordering application 350 and a plurality of providers 360A, 360B . . . 360n as shown in FIG. 5A. Thus, in FIG. 5C, the order 372 is transmitted in advance and the smartphone 310 periodically transmits location information 396 to the order processing system 392 of the provider aggregator 390, with physical processing and fulfillment of the order 372 being delayed until the order processing system 392 of the provider aggregator 390 determines that the arrival estimate and the order completion estimate substantially coincide and (if applicable) there is no outstanding delay signal 398. In FIG. 5C, like reference numerals are used to refer to features corresponding to those in FIGS. 3C and 5A.

Figure 5D:
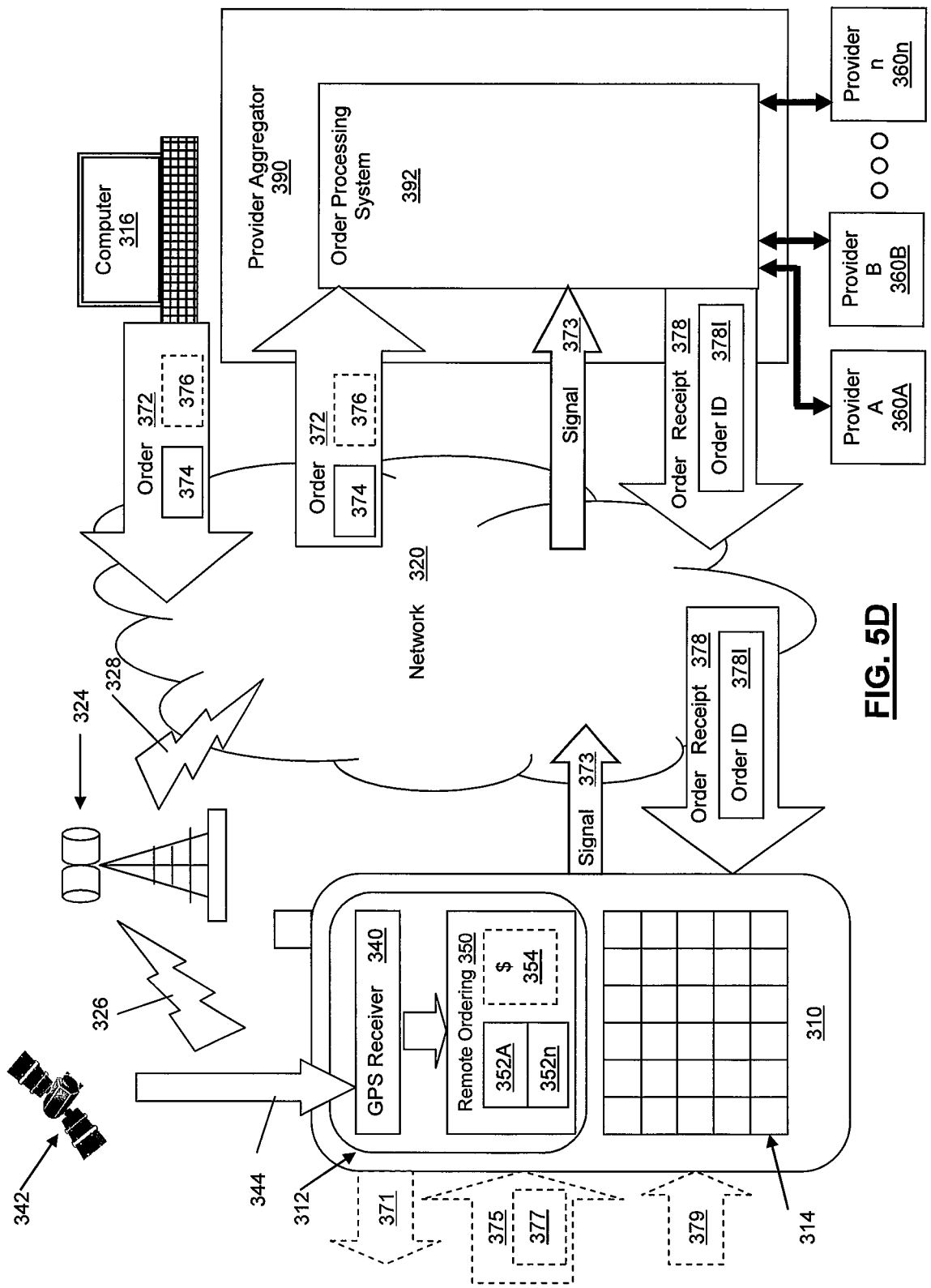
FIG. 5D shows a schematic representation of a fourth exemplary arrangement for implementing a method for scheduling processing of an order by a provider aggregator.
Figure 5E:
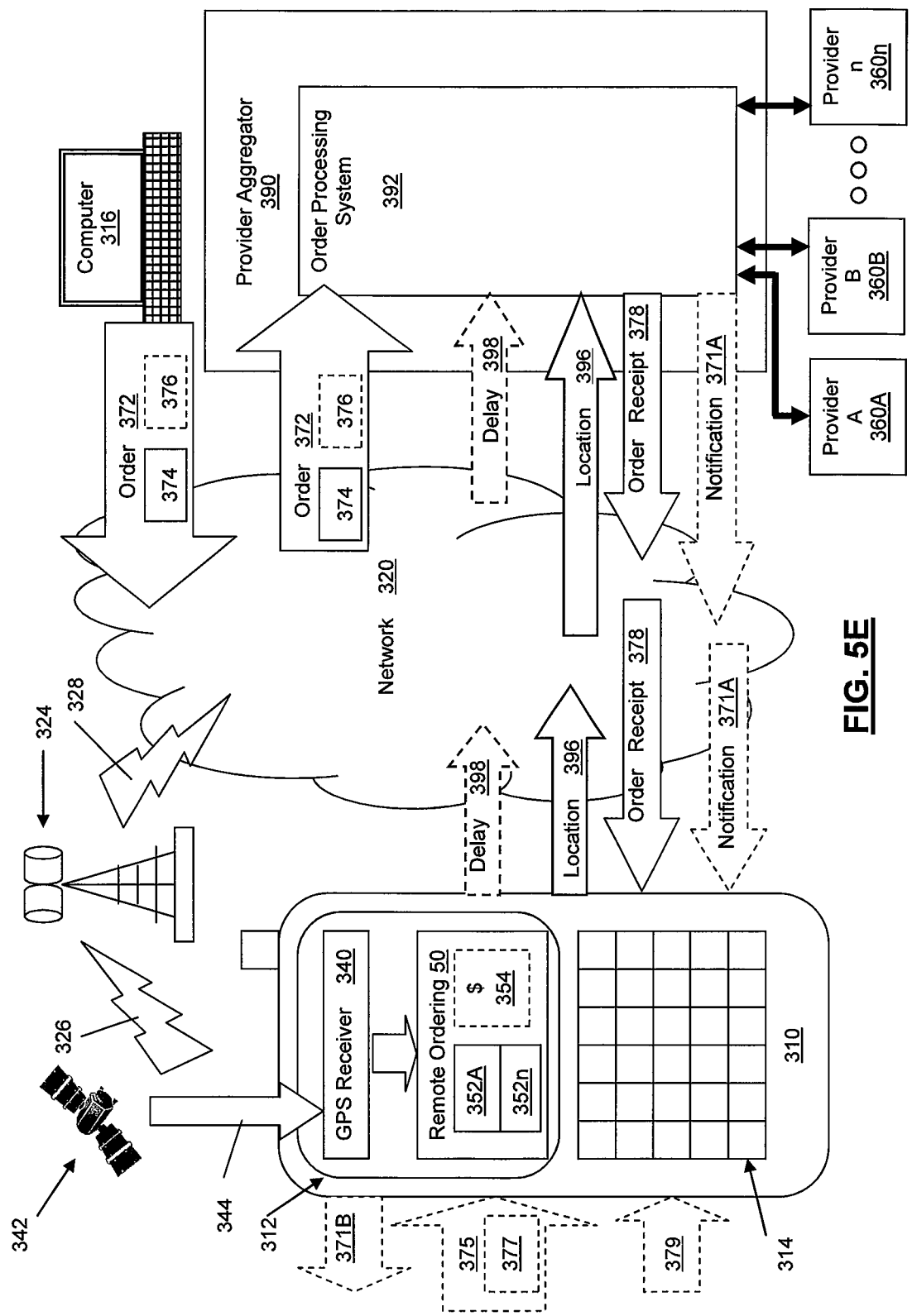
FIG. 5E shows a schematic representation of a fifth exemplary arrangement for implementing a method for scheduling processing of an order by a provider aggregator.

FIGS. 5D and 5E show arrangements similar to those in FIGS. 5B and 5E, respectively, except that the order 372 is sent from a user's desktop computer 316 to the provider 360, in a manner similar to that shown in FIGS. 3D and 3E.

The arrangements shown in FIGS. 5A, 5B and 5C are substantially identical to those shown and described in respect of FIGS. 3A, 3B and 3C, respectively, except that the order 372, the signal 373, if any (FIG. 5B) and the location information 396, if any (FIGS. 5C and 5E) are sent to the order processing system 392 of the provider aggregator 390, which then passes on the order 372 and/or sends an order commencement signal to the relevant provider 360. The order processing system 392 of the provider aggregator 390 may be integrated with a central order processing system of a provider 360, or directly with the point-of-sale order processing systems of the relevant provider locations 366, or the provider locations 366 may be provided with a computer system or terminal linked to the order processing system 392 of the provider aggregator 390 to display incoming orders.

Optionally, where the order 372 was sent ahead of time, instead of automatically transmitting the signal 373 to commence processing based on a detected location, a user may manually trigger the signal 373. For example, a user who has previously submitted an order 372 could manually use his or her smartphone 310 or desktop computer 316 to send the signal 373 just before he or she leaves to pick up the ordered goods. This arrangement would have particular application to situations where rapid spoilage or degradation of the goods being prepared is unlikely to be an issue, such as general merchandise stores, video rental stores, jewelry stores, liquor and beer stores, and grocery stores (depending on the items ordered). Also optionally, a remote ordering application may permit a user to send an indication (not shown) that they are ready to pick up a previously submitted order. In response to such an indication, the order processing system 362, 392 of the provider 360 or provider aggregator 390 could determine and transmit an order completion estimate to the remote ordering application indicating when processing of the order will be complete. The order completion estimate may be based on current demand, staffing and the like at the provider location. The user could then use the remote ordering application to either confirm that he or she will attend at the provider location, or request that the order processing system 362, 392 send a notification either when the order processing is complete or when the location information from the user's networked mobile wireless telecommunication computing device indicates that the user's travel time is approximately equal to the order processing time.

Figure 6:
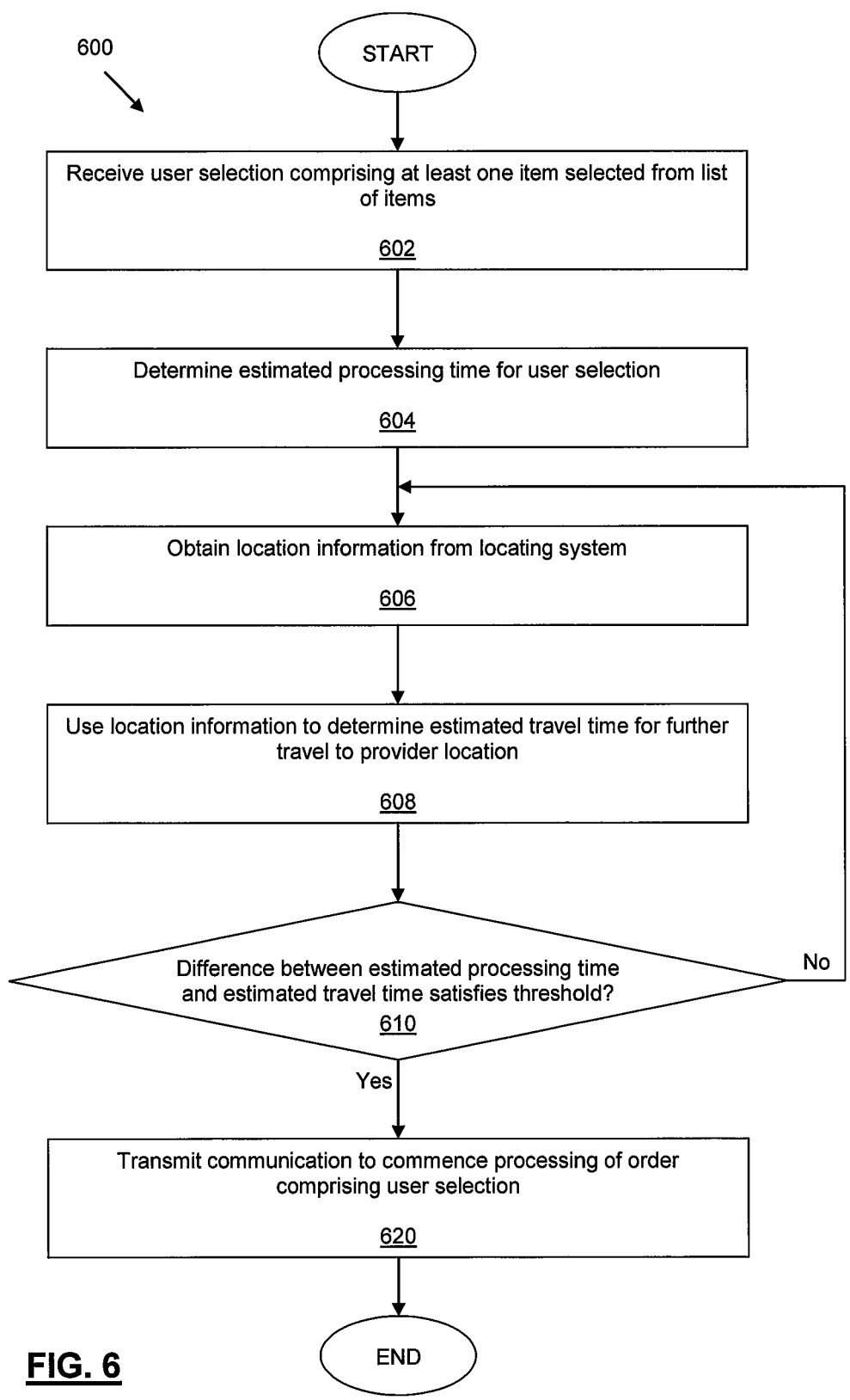
FIG. 6 is a flow chart illustrating a first exemplary implementation of the method of FIG. 2.

Referring now to FIG. 6, a flow chart illustrating a first exemplary implementation of the method 200 of FIG. 2 is indicated generally at 600. The method 600 may be executed by a networked mobile wireless telecommunication computing device, such as the smartphone 310. The method 600 may also be executed by the order processing system of either a provider or a provider aggregator, with the mobile wireless telecommunication computing device simply transmitting the order and then transmitting location information.

At step 602, the method 600 receives a user selection comprising at least one item selected from a list of items; this is a particular embodiment of step 202 of the method 200 shown in FIG. 2. Where the method 600 is executed by the mobile wireless telecommunication computing device, step 602 will comprise receiving the user's selection. Where the method 600 is executed by the order processing system of either a provider or a provider aggregator, step 602 will typically comprise receiving an order from a mobile wireless telecommunication computing device.

At step 604, the method 600 determines an estimated processing time for the user selection; this is a particular embodiment of step 206 of the method 200 shown in FIG. 2. Where the method 600 is executed by a mobile wireless telecommunication computing device, the mobile wireless telecommunication computing device can calculate the estimated processing time itself (for example using the remote ordering application 350), or can send a preliminary indication of the user selection to the order processing system, which can return the estimated processing time to the mobile wireless telecommunication computing device. Where the method 600 is executed by the order processing system of either a provider or a provider aggregator, step 604 may comprise estimating the processing time for the order or using a pre-determined fixed estimate. Physical processing and fulfillment would not yet commence.

At step 606, the method 600 obtains location information from a locating system for the mobile wireless telecommunication computing device. Where the method 600 is executed by a mobile wireless telecommunication computing device, step 606 involves communication between the remote ordering application 350 and the locating system for the mobile wireless telecommunication computing device, such as the GPS receiver 340 in the case of the smartphone 310, possibly with the cooperation of a navigation application. Where the method 600 is executed by the order processing system of either a provider or a provider aggregator, the location information will typically be sent by the mobile wireless telecommunication computing device to the order processing system. The location information may comprise an identification of the user's location, which is associated with the order for goods, and may be obtained by the order processing system querying the mobile wireless telecommunication computing and receiving the identification of the initial location from the mobile wireless telecommunication computing device in response to the query.

At step 608, the method 600 uses the location information to determine the estimated travel time for further travel to the selected provider location of the provider associated with the list of items from which the selection was received. The algorithm may incorporate information about a planned travel route to enhance the accuracy of the estimated travel time. Various algorithms for determining estimated travel time are known in the field of GPS navigation and hence are within the capability of one skilled in the art, now informed by the herein disclosure.

Steps 606 and 608 together comprise a particular embodiment of step 204 of the method 200 shown in FIG. 2. Where the method 600 is executed by an order processing system of a provider or provider aggregator, the order processing system can execute steps 606 and 608 either by querying the mobile wireless telecommunication device, receiving an identification of the user's location from the mobile wireless telecommunication device (step 606) and using that location information to execute its own calculation of the estimated travel time (step 608) or by causing the mobile wireless telecommunication device to obtain an identification of the user's location (step 606) and then using that location information to determine an estimated travel time and send it to the order processing system (step 608). Thus, an order processing system of a provider or provider aggregator may execute steps 606 and 608 by querying the user's mobile wireless telecommunication computing device and receiving the estimated travel time from the mobile wireless telecommunication computing device in response to the query, both for the initial estimated travel time and for updated estimated travel times.

At step 610, the method 600 compares the estimated processing time to the estimated travel time, and determines whether the difference between the estimated processing time and the estimated travel time satisfies a threshold, generally indicating that the estimated processing time and the estimated travel time are at least approximately equal. Step 610 is a particular implementation of step 208 of the method 200 shown in FIG. 2. The threshold used at step 610 is selected based on the exigencies of the particular circumstances, and may be set so that the threshold is satisfied when the estimated processing time is slightly greater than the estimated travel time, slightly less than the estimated travel time, or equal to the estimated travel time. Preferably, the threshold is deemed to be satisfied in any case in which the estimated processing time is greater than the estimated travel time, since this would indicate that the user is likely to arrive at the provider location before processing of the order is complete, so processing of the order should begin immediately to minimize waiting by the user.

If the method 600 determines that the difference between the estimated processing time and the estimated travel time does not satisfy the threshold (a "no" at step 610), the method 600 returns to step 606 to obtain updated location information. The return from step 610 to step 606 to obtain new location information, and then using the new location information to determine a new estimated travel time at step 608, is a particular embodiment of step 210B of the method 200 shown in FIG. 2. It will be noted that the exemplary method 600 does not implement step 210A of the method 200 shown in FIG. 2; i.e. the method 600 does not update the estimated processing time for the user selection. In an alternate embodiment of the method 600 in which the estimated processing time were also to be updated, following a "no" determination at step 610 the method 600 would return to step 604 to update the estimated processing time, and then proceed to step 606, instead of returning directly from step 610 to step 606.

If the method 600 determines that the difference between the estimated processing time and the estimated travel time satisfies the threshold (a "yes" at step 610), the method 600 proceeds to step 620. At step 620, in response to the determination at step 610 that the difference between the estimated processing time and the estimated travel time satisfies the threshold, the method 600 transmits a communication to commence processing of an order comprising the user selection. Where the method 600 is executed by a mobile wireless telecommunication computing device such as the smartphone 310, step 620 may comprise transmitting the order 372, including the payment information 354, to the order processing system 362, 392 of the provider 360 or provider aggregator 390, in which case the signal to commence processing is embodied in the order 372. Alternatively, where order 372 was sent in advance, the signal to commence processing would be a signal 373 separate from but associated with the order 372. Where the method 600 is executed by the order processing system of a provider aggregator, the signal to commence processing of the order would be sent to the order processing system of the relevant provider, or possibly directly to the relevant provider location, and where the method 600 is executed by the provider, the signal would be sent to the relevant provider location, or where the provider comprises a single location, may be a signal to alert the staff to begin processing the order. The signal may comprise the order 372 itself or, if the order 372 was sent by the relevant processing system in advance, a signal separate from but associated with the order 372 may be sent. Step 620 corresponds to step 220 of the method 200 shown in FIG. 2.

Figure 6A:
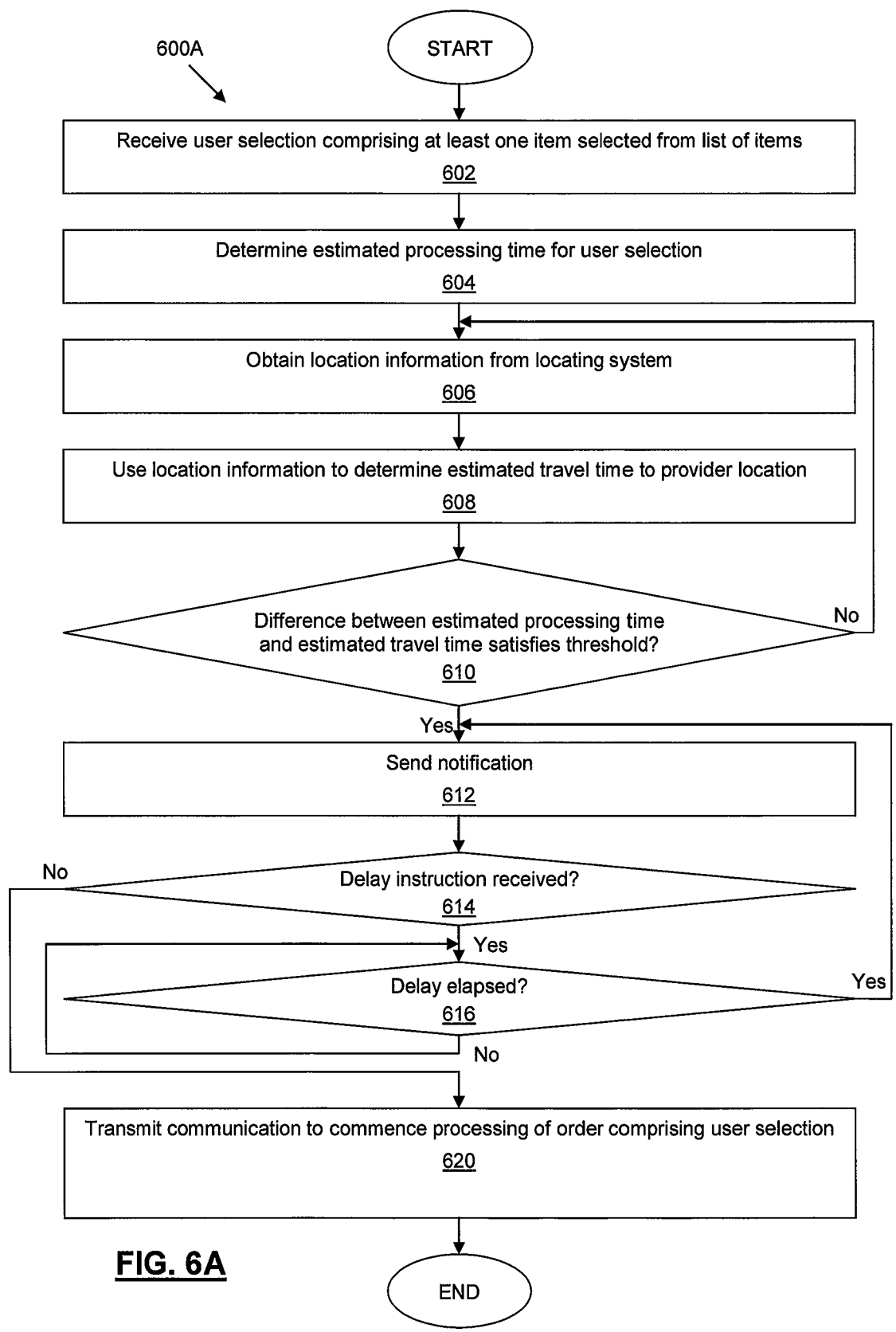
FIG. 6A is a flow chart illustrating a first exemplary implementation of the method of FIG. 2A.

FIG. 6A is a flow chart illustrating a first exemplary implementation 600A of the method 200A shown in FIG. 2A. The method 600A shown in FIG. 6A is similar to the method 600 shown in FIG. 6, with like reference numerals used to refer to corresponding steps, except that the method 600A shown in FIG. 6A provides a notification that the communication to commence processing (step 620) is about to be sent, and accommodates a delay instruction.

Continuing to refer to FIG. 6A, in response to the determination at step 610 that the difference between the estimated processing time and the estimated travel time satisfies the threshold, at step 612 the method 600A sends a notification to the user that the communication to commence processing (step 620) is about to be sent. Step 612 of the method 600A corresponds to step 212 of the method 200A shown in FIG. 2A. At step 614, which corresponds to step 214 of the method 200A shown in FIG. 2A, the method 600A checks whether a delay instruction has been received. Typically, step 614 will occur after a suitable pause following step 612, to provide the user with time to input a delay instruction. If the method 600A determines at step 614 that no delay instruction has been received, the method 600A proceeds to step 620 to send the communication to begin processing. Step 620 of the method 600A corresponds to step 220 of the method 200A shown in FIG. 2A. If the method 600A determines at step 614 that a delay instruction has been received, then at step 616, which corresponds to step 216 of the method 200A shown in FIG. 2A, the method 600A checks whether the delay period has elapsed, and if it has not elapsed, continues to monitor for whether the delay has elapsed. Once the method 600A determines at step 616 that the delay period has elapsed, the method 600A returns to step 612 to provide a further notification to the user and an opportunity to the user to enter a new delay instruction. The method 600A shown in FIG. 6A is an implementation of the method 200A shown in FIG. 2A that does not permit a user to cancel a previously input delay instruction; hence the method 600A does not include a step corresponding to step 218 of the method 200A shown in FIG. 2A.

Figure 6B:
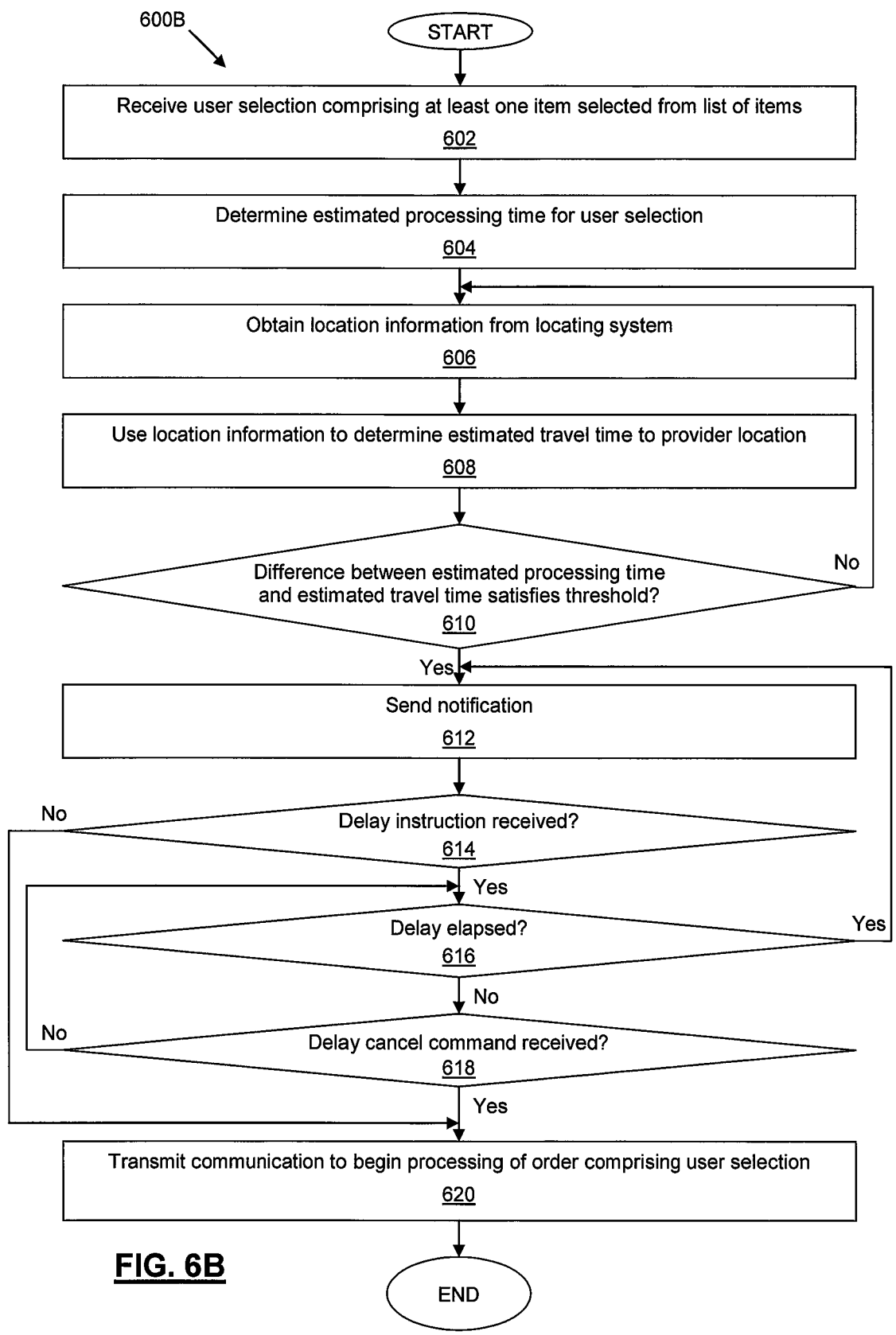
FIG. 6B is a flow chart illustrating a second exemplary implementation of the method of FIG. 2A.

FIG. 6B is a flow chart illustrating a second exemplary implementation 600B of the method 200A shown in FIG. 2A. The method 600B shown in FIG. 6B is identical to the method 600A shown in FIG. 6A, except that it allows a user to provide a delay cancel command to cancel a previous delay instruction. Again, like reference numerals are used to refer to corresponding steps. In the method 600B, after a determination (step 616) that the delay period has not elapsed, the method 600B checks at step 618 whether a delay cancel command has been received and then returns to step 616 if no delay cancel command was received. Step 618 of the method 600B corresponds to step 218 of the method 200A shown in FIG. 2A.

Figure 7:
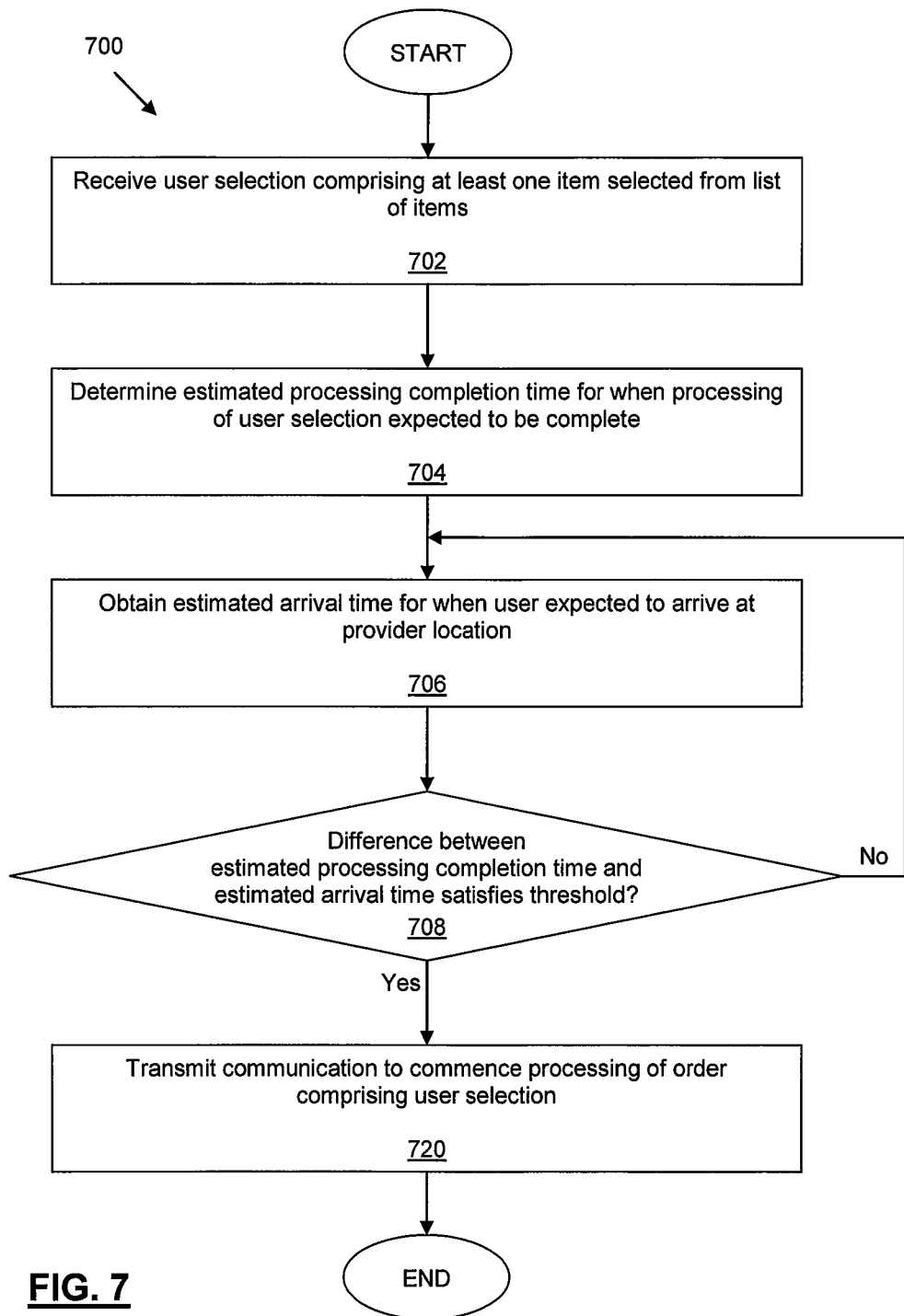
FIG. 7 is a flow chart illustrating a second exemplary implementation of the method of FIG. 2.

Reference is now made to FIG. 7, which shows a flow chart illustrating a second exemplary implementation 700 of the method 200 of FIG. 2. While the methods 600, 600A and 600B shown in FIGS. 6, 6A and 6B, respectively, determine whether the arrival estimate and the order completion estimate substantially coincide by comparing an estimated processing time for the order to the user's estimated travel time to the relevant provider location, the method 700 shown in FIG. 7 compares an estimated arrival time for the user to an estimated processing completion time for the order (i.e. the user's selection). The method 700 is otherwise similar to the method 600 shown in FIG. 6, and may be executed by a user's mobile wireless telecommunication computing device or by the order processing system of either a provider or a provider aggregator, and may be provided as a computer program product.

At step 702, which is a particular embodiment of step 202 of the method 200 shown in FIG. 2, the method 700 receives a user selection comprising at least one item selected from a list of items. In cases where a user's mobile wireless telecommunication computing device executes the method 700, step 602 will comprise receiving the user's selection, whereas for an order processing system of a provider or a provider aggregator, step 602 will typically comprise receiving an order from a mobile wireless telecommunication computing device.

At step 704, in a particular embodiment of step 206 of the method 200 shown in FIG. 2, the method 700 determines an estimated processing completion time (i.e. time of day) for the user selection. A mobile wireless telecommunication computing device executing the method 700 can calculate the estimated processing time itself or receive it from the order processing system. An order processing system of a provider or a provider aggregator can execute step 704 by estimating the processing time for the order or using a pre-determined fixed estimate. In either case, physical processing and fulfillment of the order comprising the user selection would not yet commence.

At step 706, which is a particular embodiment of step 204 of the method 200 shown in FIG. 2, the method 700 obtains an estimated arrival time for when a user is expected to arrive at the provider location where the user selection is to be processed.

An order processing system of a provider or provider aggregator executing the method 700 can execute step 706 either by querying the user's mobile wireless telecommunication device to obtain an identification of the user's location and using that location information to execute its own calculation of the estimated arrival time, by causing the user's mobile wireless telecommunication device to determine an estimated arrival time and send it to the order processing system, or by causing the user's mobile wireless telecommunication device to determine and send to the order processing system an estimated travel time, which the order processing system can add to the current time to obtain the estimated arrival time.

At step 708, which is a particular implementation of step 208 of the method 200 shown in FIG. 2, the method 700 compares the estimated completion processing time to the estimated arrival time, and determines whether the difference between the estimated processing time and the estimated travel time satisfies a suitable threshold. A "yes" result at step 708 generally indicates that the estimated processing completion time and the estimated arrival time, both represented as a time of day, are close to one another. In addition, it is preferable that the threshold is set so that step 708 will produce a "yes" result in cases where the estimated processing completion time is later than the estimated arrival time, as this result suggests that processing of the order will not be completed until after the user arrives at the provider location. In such circumstances, processing of the order should begin immediately so that waiting by the user after he or she arrives is minimized.

In response to a "yes" at step 706, the method 700 proceeds to step 720, at which the method 700 transmits a communication to commence processing of an order comprising the user selection. Step 720 corresponds to step 220 of the method 200 shown in FIG. 2. Where a mobile wireless telecommunication computing device executes the method 700, step 720 may comprise transmitting the order 372, including the payment information 354, to the order processing system 362, 392 of the provider 360 or provider aggregator 390 or, where the order 372 was sent in advance, the signal to commence processing would be a separate signal 373 associated with the order 372. In cases where the order processing system of a provider aggregator executes the method 700, the signal to commence processing of the order would be sent to the order processing system of the relevant provider or to the relevant provider location. Where the method 700 is executed by the order processing system of a provider, the signal would be sent to the relevant provider location, or where the provider comprises a single location, could be a signal to alert the staff to begin processing the order. The signal may comprise the order 372 itself or, if the order 372 was sent by the relevant data processing system in advance, a signal separate from but associated with the order 372 may be sent.

In response to a "no" determination at step 708, indicating that the difference between the estimated processing completion time and the estimated arrival time does not satisfy the threshold, the method 700 returns to step 706 to obtain an updated estimated arrival time; the return from step 708 to step 706 is a particular embodiment of step 210B of the method 200 shown in FIG. 2. Optionally, if the estimated processing completion time were also to be updated, step 210A of the method 200 shown in FIG. 2 could be implemented by returning to step 704 rather than step 706 following a "no" determination at step 708, and then proceeding to step 706.

Figure 7A:
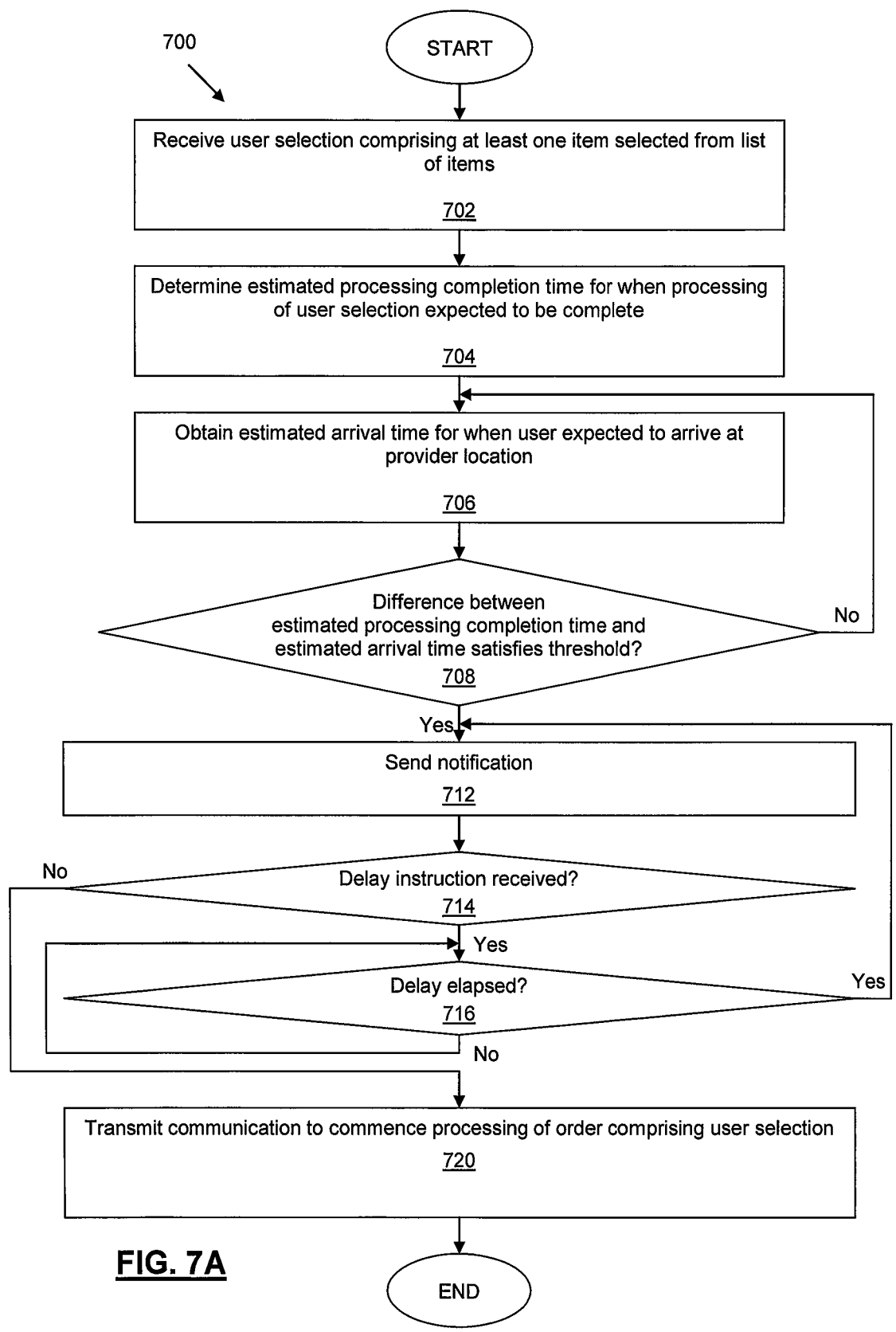
FIG. 7A is a flow chart illustrating a third exemplary implementation of the method of FIG. 2A.

FIG. 7A is a flow chart illustrating a third exemplary implementation 700A of the method 200A shown in FIG. 2A. The method 700A shown in FIG. 7A is similar to the method 700 shown in FIG. 7, with identical steps being denoted by identical reference numerals. Like the method 600A in FIG. 6A, the method 700A in FIG. 7A provides a notification that the communication to commence processing is about to be sent and accommodates a delay instruction. Steps 712, 714 and 716 of the method 700A in FIG. 7A correspond to steps 612, 614 and 616 of the method 600A shown in FIG. 6.

Figure 7B:
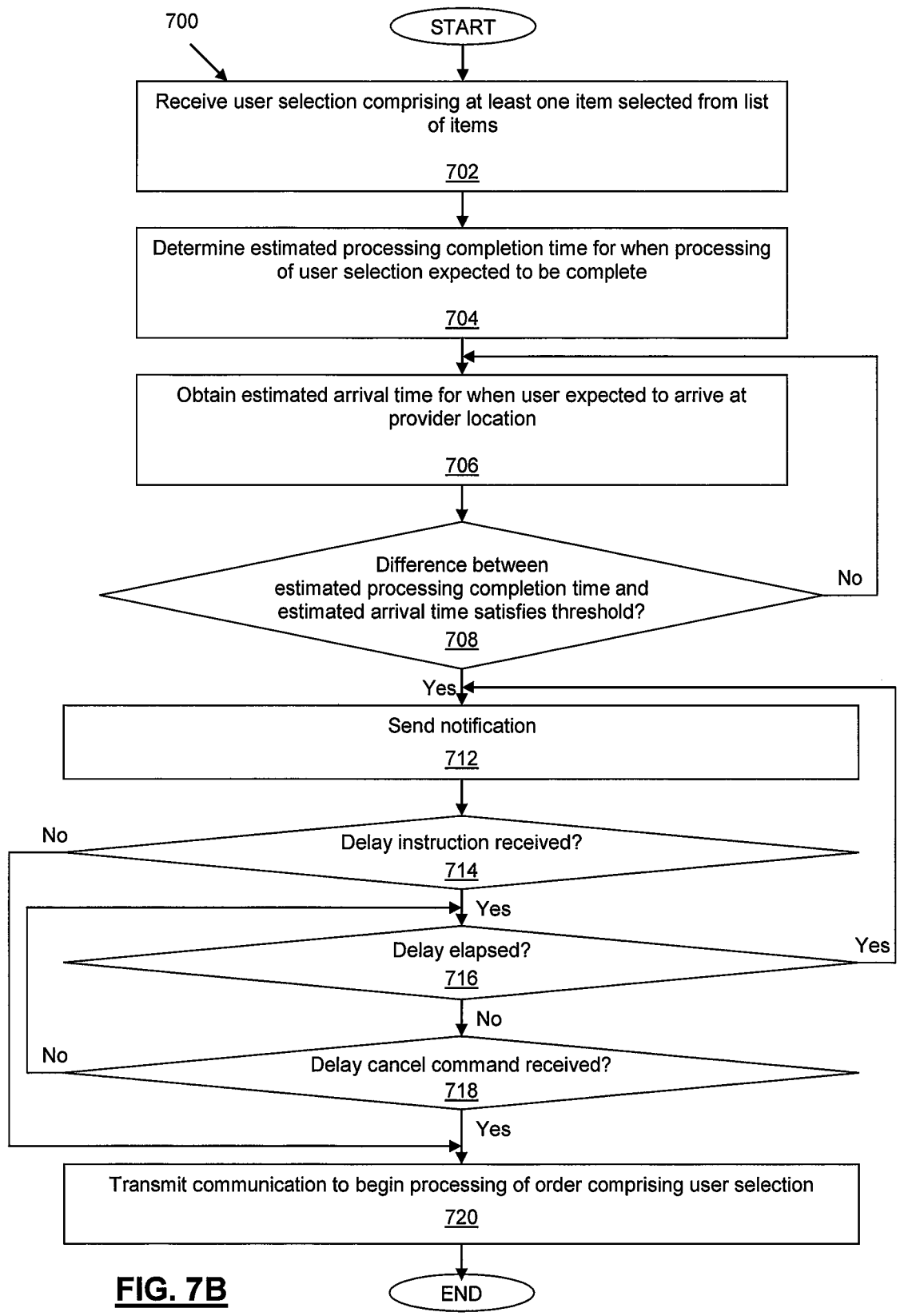
FIG. 7B is a flow chart illustrating a fourth exemplary implementation of the method of FIG. 2A.

FIG. 7B is a flow chart showing a fourth exemplary implementation 700B of the method 200A shown in FIG. 2A. The method 700B in FIG. 7B is identical to the method 700A shown in FIG. 7A, except that it allows a user to provide a delay cancel command to cancel a previous delay instruction. Again, like reference numerals are used to refer to corresponding steps, and step 718 of the method 700B in FIG. 7B corresponds to step 618 of the method 600B shown in FIG. 6B.

As the number of remote orders increases, it will become more difficult to match orders to arriving users if the sequence of arrival of the users is unknown. The result is that arriving users who have placed remote orders may have to wait while staff attempt to locate their order amongst all the other orders associated with other users. If multiple users arrive around the same time, the users may form a queue. This can lead to frustration on the user's part, and if the delay is considerable, can lead to a degradation in the quality of the goods in the order, defeating the purpose of scheduling processing so that order completion coincides with user arrival. Moreover, the greater the number of remote orders, the worse the problem gets, especially in a high volume context like a quick service restaurant. Accordingly, in addition to scheduling the processing of an order for goods so that completion of the order will substantially coincide with the arrival of the user, the present disclosure also describes systems, methods and computer program products for organizing the presentation of those orders to the users according to the sequence in which the users are expected to arrive, which is not necessarily the same order in which processing is triggered. Knowing the sequence in which the users are expected to arrive allows staff (or automated systems) at the provider location to have the orders sorted in a manner corresponding to that sequence so that they can be easily retrieved and presented as the users arrive.

Figure 11:
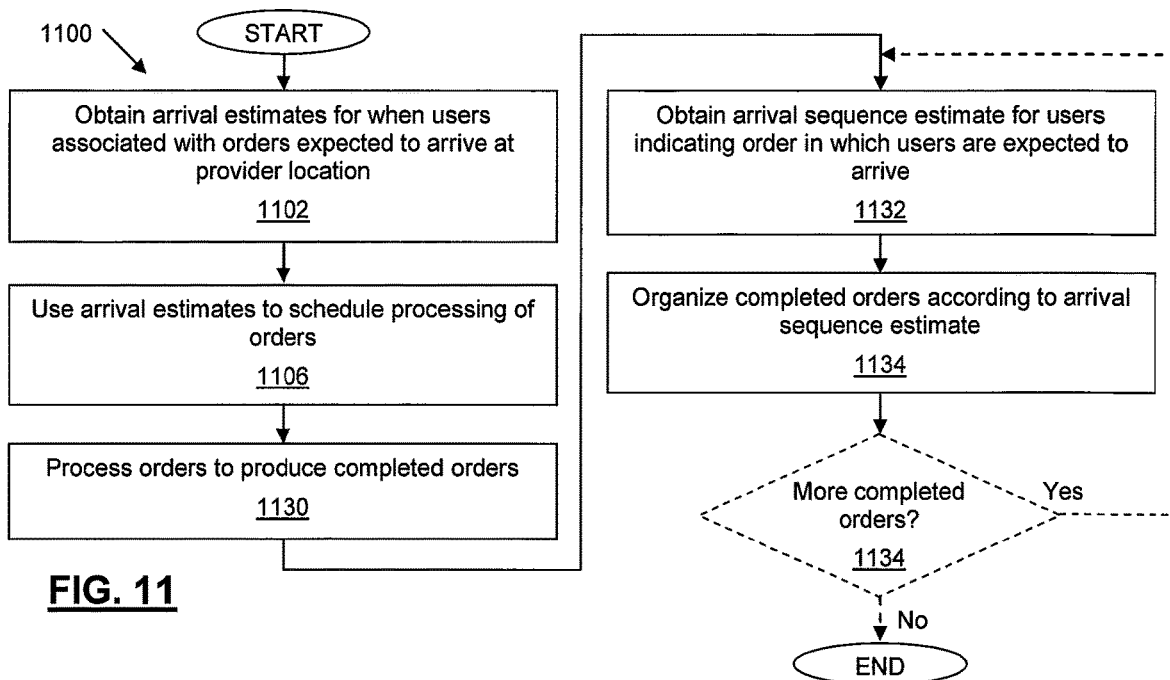
FIG. 11 is a flow chart showing a first exemplary method for processing a plurality of orders for goods at a provider location.

FIG. 11 shows at 1100 a first exemplary method for processing a plurality of orders for goods at a provider location. The method 1100 is similar to the method 100 described above, but also includes steps for organizing the presentation of the orders to the users according to the sequence in which the users are expected to arrive. Steps 1102, 1106 and 1130 will generally be implemented by a processor of a computer system, while steps 1132 and 1134 may be implemented either by an automated processing system or by human individuals, or a combination thereof.

At step 1102, the method 1100 obtains arrival estimates for when the users associated with the orders are expected to arrive at the provider location, and at step 1106, the method 1100 uses the arrival estimate to schedule processing of the orders. Physical processing of the order at the provider location may then proceed according to the scheduling determined at step 1106, and at step 1130, the method 1100 processes the orders according to the schedule to produce completed orders. At step 1132 the method 1100 obtains an arrival sequence estimate for the users indicating a sequence in which the users are expected to arrive and, at step 1134 the method 1100 organizes the completed orders according to the arrival sequence estimate. Steps 1130 and 1132 may be performed in any order or substantially simultaneously. Preferably, the arrival sequence estimate is continuously updated and step 1134 is repeated responsive to a change in the arrival sequence estimate. For example, the expected sequence of current users may change, or a new user may be added to the arrival sequence estimate. Thus, at optional step 1134, the method 1100 checks whether there are more completed orders that have not yet been transferred to a user and, as long as some such orders remain, the method 1100 returns to step 1132 to obtain an updated arrival sequence estimate. Where the arrival sequence estimate determined at step 1132 is unchanged, step 1134 may be a trivial step of maintaining the previous organization; where the arrival sequence estimate determined at step 1132 has changed, step 1134 will comprise organizing the completed orders according to the new arrival sequence estimate.

Figure 11A:
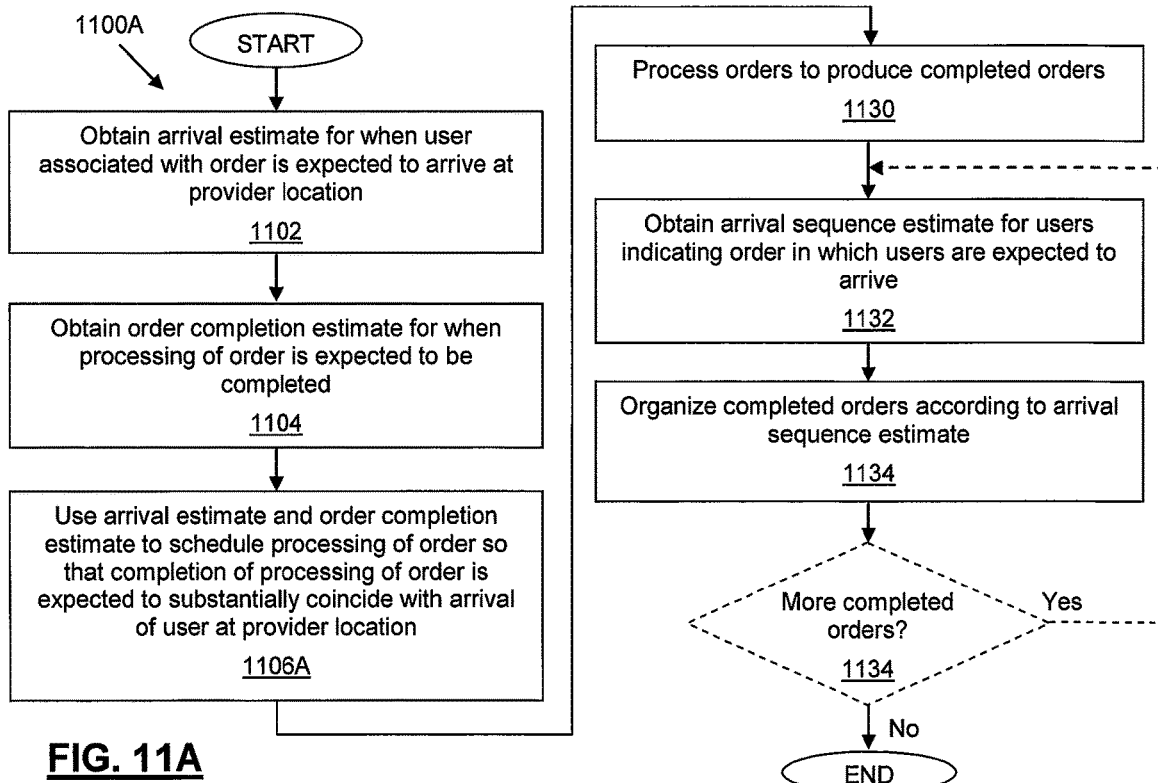
FIG. 11A is a flow chart showing a second exemplary method for processing a plurality of orders for goods at a provider location.

FIG. 11A shows a second exemplary method 1100A for processing a plurality of orders for goods at a provider location. The method 1100A in FIG. 11A is a particular implementation of the method 1100 in FIG. 11, with the same reference numerals referring to corresponding steps. Similarly to the method 100A shown in FIG. 1A, the method 1100A uses an order completion estimate, in addition to the arrival estimate, to schedule processing of the order so that completion of processing of the order is expected to substantially coincide with arrival of the user at the provider location. Thus, at step 1104 the method 1100A obtains an order completion estimate for when processing of the order is expected to be completed, and at step 1106A the method 1100A uses both the arrival estimate and the order completion estimate to schedule processing of the order.

In one embodiment, the arrival sequence estimate may be derived from the arrival estimates for the individual users. For example, where the arrival estimates are estimated times of arrival, the arrival sequence estimate may be obtained by ordering the estimated times of arrival in time sequence. Similarly, where the arrival estimates are estimated time periods until arrival, the arrival sequence estimate may be obtained by ranking the estimated time periods from lowest to highest.

Although the arrival sequence estimate may be derived from the arrival estimates for the individual users, other approaches may produce a more accurate arrival sequence estimate, and this increased accuracy may be advantageous in certain high volume applications, such as quick service restaurants. Where an object (including a human being) is travelling through a constrained travel path network, calculating an estimated time of arrival or estimated time until arrival is usually based on predicting the object's path through the network. A constrained travel path network is one where travel is limited (constrained) to certain predefined path segments. A network of roads through a city is an example of a constrained path travel network, since automobiles are effectively confined to the roads when travelling between non-adjacent locations—the automobiles cannot (or at least should not) drive through houses or other structures to get from one location to another. A location tracking system that predicts an estimated time of arrival or estimated time until arrival will typically include one or more maps containing information about the layout of the roads, that is, the travel path segments, and expected speeds of travel on those travel path segments. The location tracking system will use that information, together with the predicted path of the target (and possibly information about its actual speed) to estimate how long it will take for the object to reach the goal location. While this approach can produce highly accurate estimates about when an object such as an automobile or other road vehicle will arrive in the general vicinity of the goal location, for example the street location in front of a restaurant, the predictive power is greatly diminished once the object leaves the constrained travel path network. For example, when a vehicle pulls off the road into the parking lot, the vehicle's path toward the goal location is no longer constrained. If the parking lot near the restaurant is empty, the vehicle may cut diagonally across the rows of parking spots, whereas if the parking lot is full, the vehicle may move parallel to those rows. Moreover, once the driver exits the vehicle, he or she may follow a virtually limitless number of paths toward the goal location, for example deviating from an otherwise direct path toward the goal location to pet a small, cute dog. Thus, during the final portion of the journey toward a goal location, map-based methodologies encounter significant limitations on accuracy because they cannot effectively predict the path the object will take.

Figure 12A:
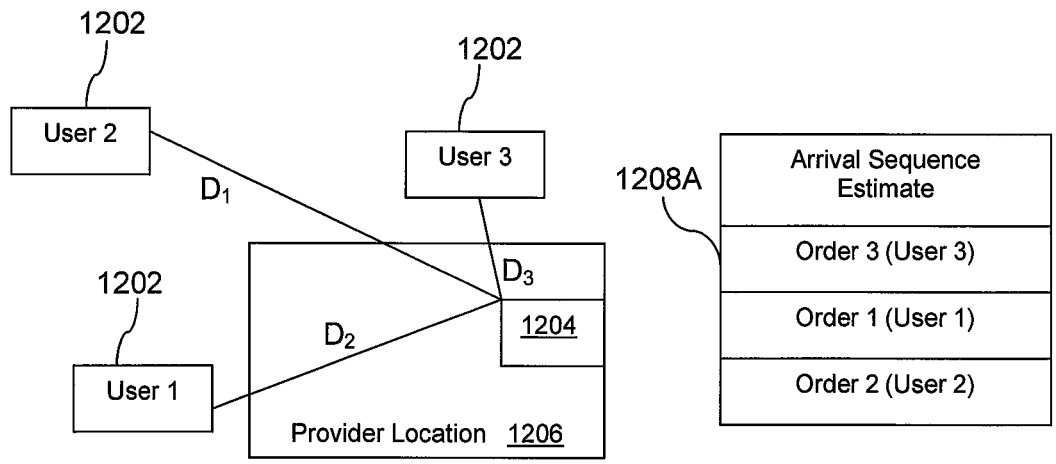
FIG. 12A is a schematic representation showing a first exemplary method for obtaining an arrival sequence estimate.

Accordingly, in one preferred embodiment the arrival sequence estimate may be obtained by ordering the users according to their respective radial distances from a target. FIG. 12A shows schematically an exemplary group of users 1202 consisting of User 1, User 2 and User 3 each having a respective radial distance D1, D2, D3 from a target 1204. The arrival sequence estimate 1208A comprises a list of orders ranked in order of increasing radial distance of the corresponding users 1202 from the target 1204. As explained further below, the target 1204 is preferably a specific point or position 1204 within the provider location 1206, such as an order fulfillment station at the provider location. For example, where the provider location 1206 is a restaurant, the target 1204 may be a pick-up counter or window, or the entrance to a drive-through lane. In one preferred embodiment, the target 1204 may be the location of another networked mobile wireless telecommunication computing device, which may be disposed at a pick-up position within the provider location.

Figure 12B:
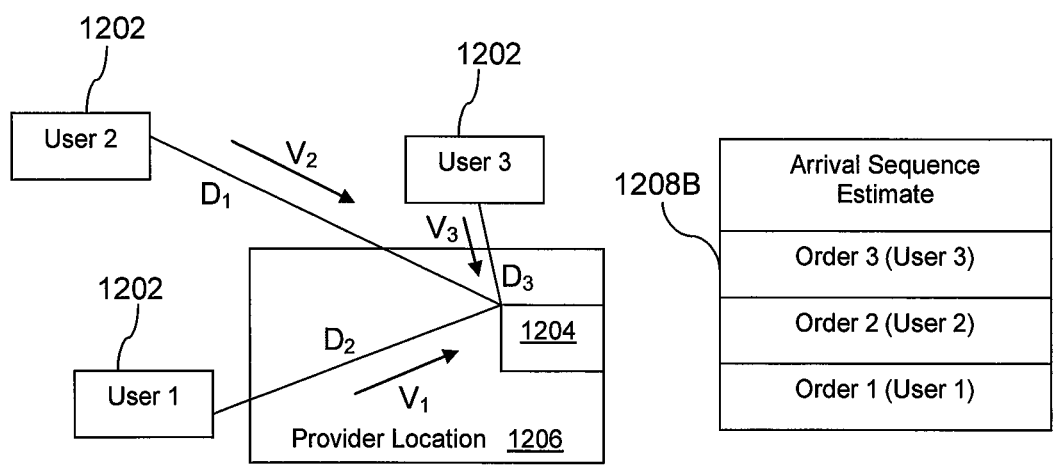
FIG. 12B is a schematic representation showing a second exemplary method for obtaining an arrival sequence estimate.

The arrival sequence estimate may be based solely on the radial distances of the users from the target, as shown in FIG. 12A, or may incorporate other factors, such as the current speed of the user. FIG. 12B is similar to FIG. 12A, with corresponding reference numerals referring to corresponding features, except that the arrival sequence estimate 1208A in FIG. 12B comprises a list of orders 1210 ranked in order of increasing expected time until arrival of the users 1202 at the target 1204, calculated by dividing the radial distance of each user 1202 from the target 1204 by the respective velocity $V_1$, $V_2$, $V_3$ of that user 1202. Although in FIG. 12B the users 1202 each have the same respective radial distance $D_1$, $D_2$, $D_3$ from the target 1204 as in FIG. 12A, with User 2 further away than User 1, User 2 is moving faster than User 1 and is expected to arrive at the target 1204 first. As such, while in the arrival sequence estimate 1208A in FIG. A, Order 1 associated with User 1 is ranked ahead of Order 2 associated with User 2 because User 1 is closer, in the arrival sequence estimate 1208B in FIG. 2, Order 2 associated with User 2 is ranked ahead of Order 1 associated with User 1.

The radial distances D1, D2, $D_3$ may be obtained in known manner using location information received from networked mobile wireless telecommunication computing devices carried by the users. For example, a remote ordering application on a networked mobile wireless telecommunication computing device may use native functionality of that device to obtain the location information by interfacing with a location module on the device through the operating system of the device. The velocities $V_1$, $V_2$, $V_3$ may similarly be determined in known manner, by computing the change in position over time. For example, in the embodiments shown in FIGS. 4C and 4E, the smartphone 310 of each user 370 may continue to transmit location information 396 even after order processing has commenced to enable the arrival sequence estimate to be determined. In a case where a user's networked mobile wireless telecommunication computing device fails to transmit the location information required to rank the user in the arrival sequence estimate, that user may be marked in the arrival sequence estimate as an exception and removed from the order ranking. Orders associated with users marked as exceptions may be segregated from the other orders. If a user arrives who does not match the arrival sequence estimate, that user can be checked against the exceptions and then matched promptly with their order.

The location information may be obtained using known techniques, and may comprise, for example, global positioning system coordinates, cellular repeater triangulation coordinates, Wi-Fi triangulation coordinates, or coordinates derived from a combination of these. In particular, it is not intended that the present disclosure be confined to presently existing methods for determining location information, and the use of technologies developed subsequent to the filing hereof are expressly contemplated.

While a combination of radial distance from a target and velocity may be used to obtain a dynamic arrival estimate (either estimated time of arrival or estimated time until arrival), the predictive value will be relatively high only where travel is relatively unconstrained, for example through a parking lot. For travel through a constrained travel path network such as a road system, however, the predictive power of a dynamic arrival estimate based on radial distance and velocity will be poor because it is based on the unrealistic assumption of a direct travel path, rather than a travel path that is constrained by the requirement to traverse the travel path segments. In contrast, a map-based dynamic arrival estimate will provide a good prediction for travel through a constrained travel path network such as a road system, but is of limited value for travel that is substantially unconstrained. An improved dynamic travel estimate can be obtained by combining the two techniques such that a map-based approach is used for travel through a constrained travel path network while an approach based on radial distance is used for relatively unconstrained travel.

As noted above, map-based navigation technology may underestimate a trip duration because it generally assumes that a trip is complete when an object has arrived at the street address associated with the destination, and it is therefore preferable for an arrival estimate generated in this way to be adjusted to account for the final portion of a trip, such as parking and walking to the pick-up location. For example, if the provider location is part of a ten acre shopping mall, two users may arrive at the mall simultaneously but at different entrances that are a kilometer apart and are located at substantially different distances from the provider location. One exemplary method for generating an arrival estimate that adjusts for these types of factors will now be described.

Figure 13:
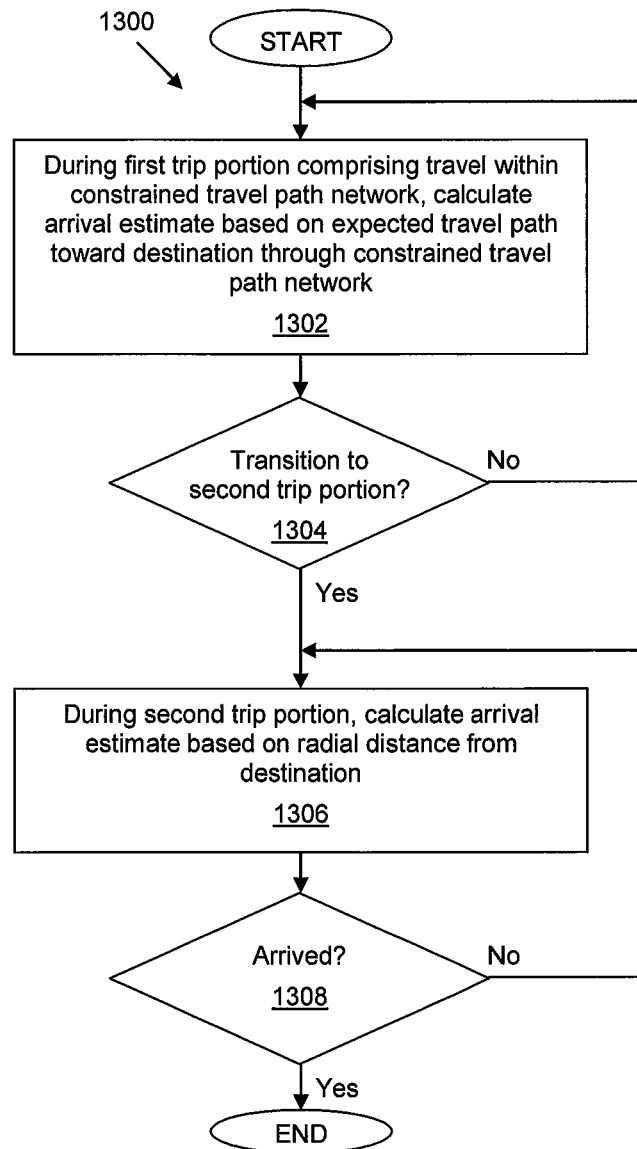
FIG. 13 is a flow chart showing an exemplary computer-implemented method for obtaining a dynamic arrival estimate for arrival at a destination.

Reference is now made to FIG. 13, which shows an exemplary computer-implemented method 1300 for obtaining a dynamic arrival estimate for arrival at a destination. The destination may be, for example, an order fulfillment station within a provider location.

At step 1302, during a first trip portion comprising travel within a constrained travel path network, the method 1300 calculates the arrival estimate based on an expected travel path of the object toward the destination through the constrained travel path network. At step 1304, the method 1300 checks for a transition from the first portion of the trip to a second portion of the trip; the second trip portion is subsequent to the first trip portion. Typically, the second portion of the trip is one in which travel is expected to be substantially unconstrained. In one embodiment, transition from the first trip portion to the second trip portion is determined by detecting a departure from the constrained travel path network. For example, a map-based tracking system may detect that a user has left the roadway and entered a parking lot. Alternatively, transition from the first trip portion to the second trip portion may be determined by the dynamic arrival estimate falling below a predetermined threshold. If the method determines at step 1304 that transition from the first trip portion to the second trip portion has not yet occurred, the method 1300 returns to step 1302 to recalculate the arrival estimate. Responsive to a determination at step 1304 that transition from the first trip portion to the second trip portion has occurred, the method 1300 proceeds to step 1306.

At step 1306, during the second trip portion, the method 1300 calculates the arrival estimate based on the radial distance of the object from the destination. As noted above, the calculation may be based solely on radial distance, or may incorporate the velocity of the object as well as other factors.

At step 1308, the method 1300 checks whether the object has arrived at the destination. This check may be carried out by comparing the detected location of the object to the location of the destination and, where the detected location of the object matches the location of the destination (possibly within a margin of error to account for imprecision in the detected location or other factors). Responsive to a determination at step 1308 that the object has not arrived at the destination, the method 1300 returns to step 1306 to recalculate the arrival estimate based on the radial distance of the object from the location. Responsive to a determination at step 1308 that the object has arrived at the destination, the method 1300 ends.

Since the arrival estimate is continuously or periodically recalculated (at steps 1302 and 1306), the arrival estimate is a dynamic arrival estimate. Step 1306 adjusts the arrival estimate generated at step 1302.

In the embodiment shown in FIG. 13, a single calculation type is used during each trip portion, namely calculation based on an expected travel path of the object toward the destination through the constrained travel path network during the first trip portion, and calculation based on radial distance during the second trip portion. In other embodiments, both calculations may be carried out simultaneously.

For example, the arrival estimate may be a weighted average of a calculation based on an expected travel path of the object toward the location through the constrained travel path network and a calculation based on radial distance. The weighting may be fixed, or may vary so that during the first trip portion, the arrival estimate is weighted more toward the calculation based on an expected travel path of the object toward the location through the constrained travel path network and during the second trip portion, the arrival estimate is weighted more toward the calculation based on radial distance. In other embodiments, the method may encompass a first trip portion during which the arrival estimate is based on an expected travel path of the object toward the destination through the constrained travel path network, a second trip portion during which the arrival estimate is based on radial distance from the destination, and an intermediate trip portion between the first trip portion and the second trip portion and during which both techniques are used.

Having an arrival sequence estimate for the sequence in which the users are expected to arrive allows the completed orders for goods to be organized for easy presentation. For example, the orders for goods may be arranged in a queue in which the next order in the queue corresponds to the user who is expected to arrive next. This can provide considerably improved efficiency.

It is also contemplated that in certain circumstances, it may be advantageous to schedule order processing based solely on an arrival sequence estimate, without use of an arrival estimate for when a user is expected to arrive. For example, toys are generally nonperishable and do not physically degrade when pulled from shelves to fill an order. As such, it would not be particularly disadvantageous if a remotely-placed order for toys were ready well before the user arrived to pick up that order. In such circumstances, scheduling processing of the order according to an arrival sequence estimate (e.g. the order for which the user is expected to arrive next is processed next) may be suitable.

Figure 14:
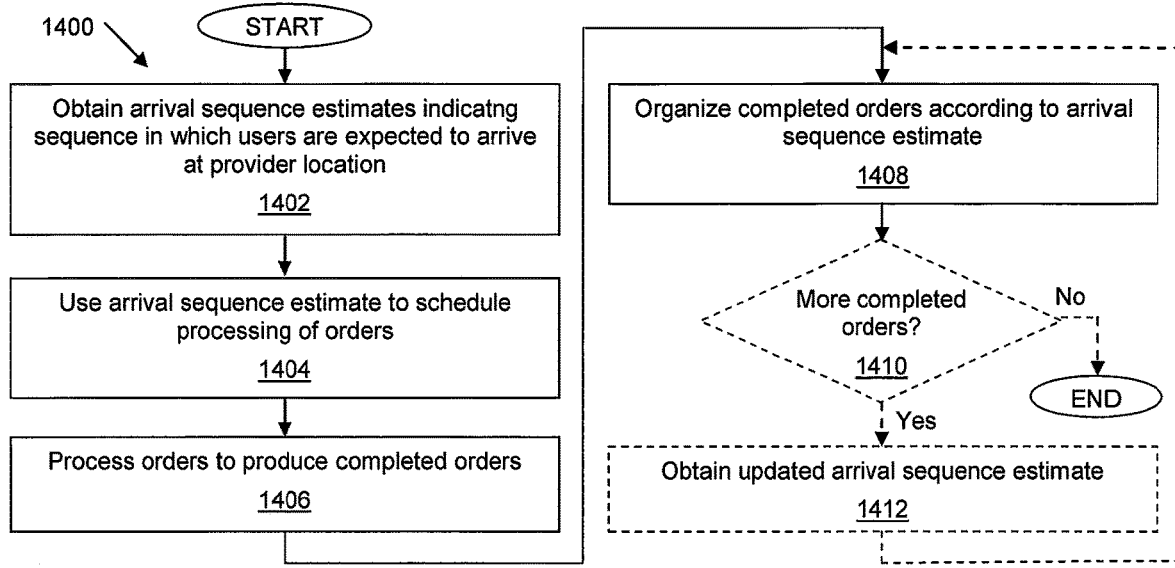
FIG. 14 is a flow chart showing a third exemplary method for processing a plurality of orders for goods at a provider location.

FIG. 14 shows an exemplary method 1400 for processing a plurality of orders for goods at a provider location. At step 1402, the method 1400 obtains an initial arrival sequence estimate for the users associated with the respective orders. As before, the arrival sequence estimate indicates the sequence in which the users are expected to arrive, and may be obtained as described above. At step 1404, the method 1400 uses the arrival sequence estimate to schedule processing of the orders, and at step 1406 the method 1400 processes the orders according to the schedule to produce completed orders. At step 1408, the method 1400 organizes the completed orders according to the arrival sequence estimate.

In a preferred embodiment, the arrival sequence estimate is continuously updated and step 1408 will be repeated if the arrival sequence estimate changes. Accordingly, at optional step 1410, the method 1400 checks whether there are more completed orders that have not yet been picked up or otherwise disposed of. Where step 1410 determines that there are still some such orders, the method 1400 proceeds to optional step 1412 to obtain an updated arrival sequence estimate, and then returns to step 1408 to organize the order according to the updated arrival sequence estimate. If the updated arrival sequence estimate is the same as the initial arrival sequence estimate, step 1408 may consist of merely maintaining the previous organization; if the arrival sequence estimate changes, step 1408 comprises organizing the completed orders according to the new arrival sequence estimate. Optionally, instead of returning to step 1408 after optional step 1412, the method 1400 may return to step 1404 update the scheduling of order processing.

Steps 1402, 1404, 1410 and 1412 will generally be implemented by a processor of a computer system, while steps 1406 and 1408 may be implemented either by an automated processing system or by one or more human individuals, or a combination thereof.

In some instances, little or no physical processing is required in order to fulfill an order for goods. Picking up a parcel at the post office is an example of this, as there is no physical processing of the parcel itself—when a user arrives to collect a parcel, it is merely a matter of finding the parcel and handing it to the user (as well as having the user present identification, sign for the parcel, etc.). However, time may be consumed in finding the right parcel while the user waits at the counter, since the post office staff did not know when the user was coming. If the post office staff knew the sequence in which users were coming to collect parcels, the staff could organize those parcels according to that sequence, simplifying the process considerably. The same approach could be applied to the storage and retrieval of luggage by a hotel concierge, as well as a variety of other contexts.

Figure 14A:
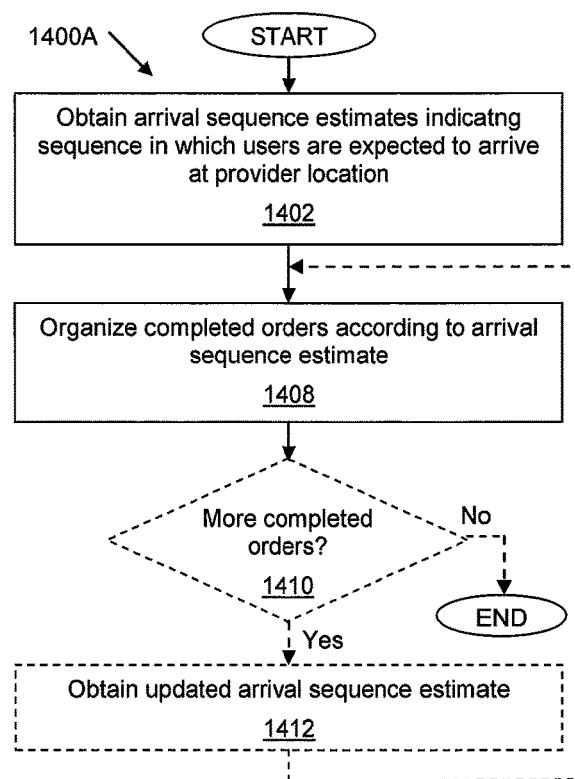
FIG. 14A is a flow chart showing an exemplary method for fulfilling a plurality of orders for goods at a provider location.

FIG. 14A shows an exemplary method 1400A for fulfilling a plurality of orders for goods at a provider location. The method 1400A is similar to the method 1400 in FIG. 14, except that there is no physical processing of goods associated with the orders, so steps 1404 and 1406 are omitted. The method 1400A may be applied in situations that do not require physical processing of the goods associated with an order (other than delivering them to the user), such as the post office and hotel concierge examples noted above.

Certain aspects of operation of an exemplary remote ordering application, such as the exemplary remote ordering application 350, will now be described by reference to FIGS. 15A through 15M, which show exemplary screen shots representing a display of a touchscreen networked mobile wireless telecommunication computing device executing a remote ordering application as described herein. Individual screen displays are referred to as "pages".

Figures 15A, 15B:
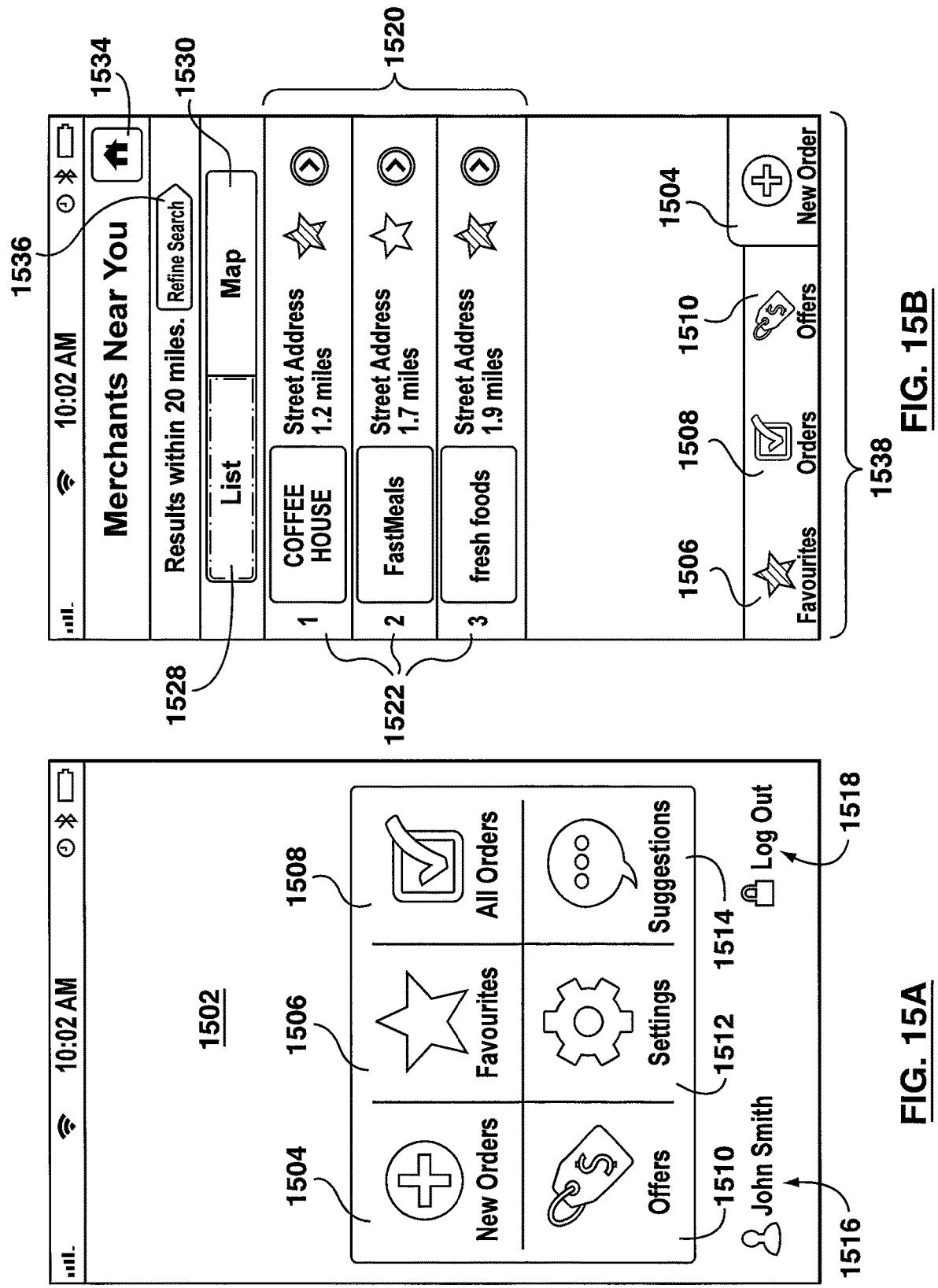
FIG. 15A shows a main landing page for an exemplary remote ordering application.
FIG. 15B shows an exemplary search results page of the remote ordering application of FIG. 15A, returning search results for local providers in list form.

FIG. 15A shows a main landing page for the exemplary remote ordering application, which includes a trademark position 1502 for displaying a trademark, as well as a plurality of icons, namely a "New Orders" icon 1504, a "Favourites" icon 1506, an "All Orders" icon 1508, an "Offers" icon 1510, a "Settings" icon 1512 and a "Suggestions" icon 1514. The main landing page also includes a user identity display 1516 and a "Log Out/Log In" icon 1518. By selecting one of the icons 1504, 1506, 1508, 1510, 1512 or 1514, a user can access various features of the remote ordering application.

Selecting the "New Orders" icon 1504, either on the main landing page in FIG. 15A or in the navigation region 1538, will generate a page displaying all providers within a pre-defined search radius of the user's current location, that is, the current location of the networked mobile wireless telecommunication computing device. The providers may be displayed as a list 1520 displaying entries 1522 for the available providers, as shown in FIG. 15B, or as a map 1524 displaying the providers as icons 1526, as shown in FIG. 15C. A "List" button 1528 and a "Map" button 1530 are provided for switching between the list or map views, and a "Home" button 1534 allows a user to return to the main landing page shown in FIG. 15A. A "Refine Search" button 1536 allows users to access a page (not shown) for refining the search parameters to narrow or expand the list of providers. Generation of the list and map views of the available providers is within the capability of one skilled in the art, now informed by the present disclosure. For example, such a list may be generated by interfacing with the Google Maps system. Google Maps is offered by Google Inc., having an address at 1600 Amphitheatre Parkway, Mountain View, Calif. 94043, United States. More information about interfacing with Google Maps is available at https://developers.google.com/maps/, the relevant teachings of which (including linked pages) are hereby incorporated by reference.

A horizontal navigation region 1538 is provided at the bottom of many of the pages, as shown in FIGS. 15B to 15F and 15M, displaying a subset of the icons 1504, 1506, 1508, 1510, 1512 or 1514; in those Figures the most frequently accessed icons, the "New Orders" icon 1504, "Favourites" icon 1506, "All Orders" icon 1508 and "Offers" icon 1510 are displayed. Optionally, a user can scroll horizontally through the navigation region 1538 to access additional icons.

Figure 15D:
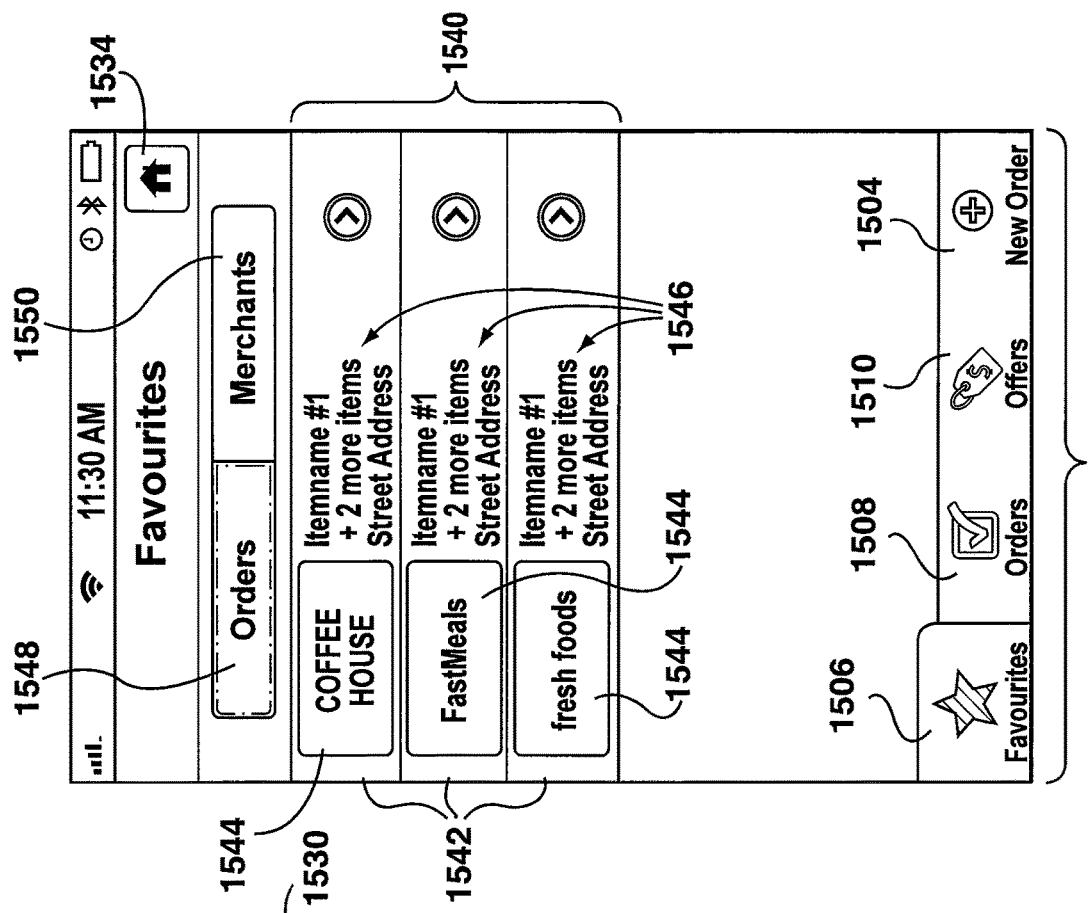
FIG. 15D shows an exemplary favourites page of the remote ordering application of FIG. 15A, listing favourite orders.
Figure 15C:
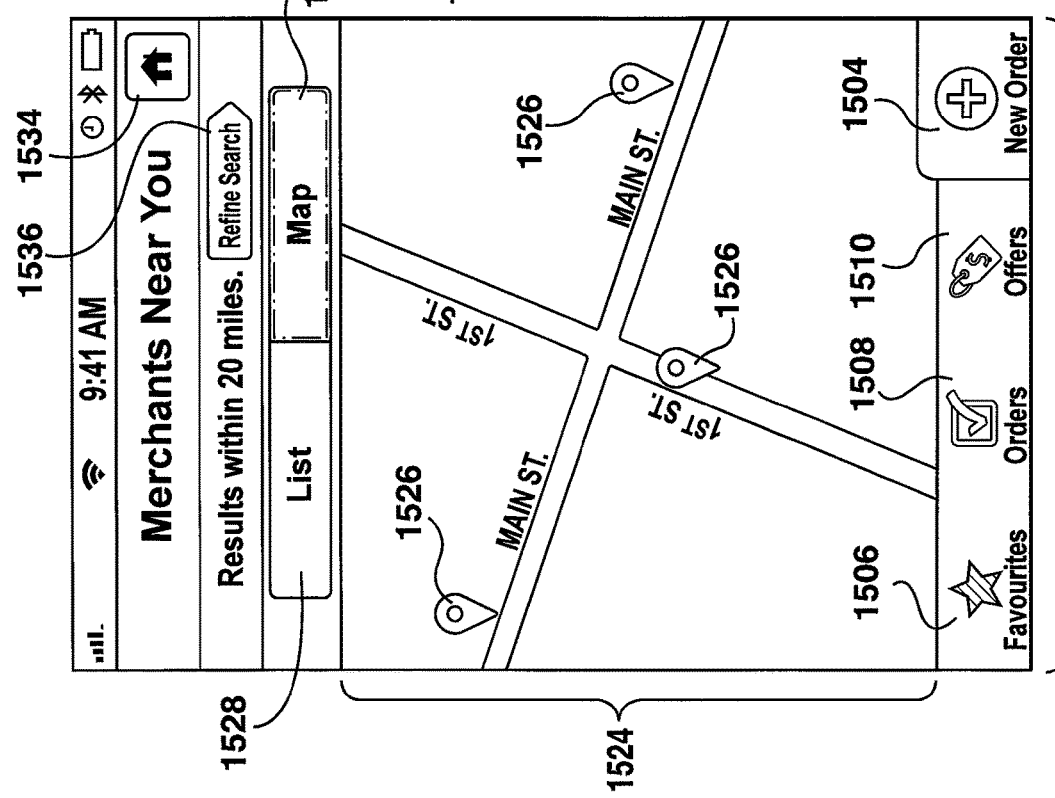
FIG. 15C shows an exemplary search results page of the remote ordering application of FIG. 15A, returning search results for local providers in map form.

Selecting the "Favorites" icon 1506, either on the main landing page in FIG. 15A or in the navigation region 1538, will generate a page, as shown in FIG. 15D, displaying orders that a user or the remote ordering application has designated as "favorites", typically because the order frequently recurs. For example, an order for a coffee and donut that is placed every weekday morning, or an order for a family pizza night, might be designated as a "favorite". The "favorite" orders are displayed as a list 1540 displaying entries 1542 showing an identification 1544 of the relevant provider as well as a summary 1546 of the order. Selecting one of the entries 1542 would generate a page showing more detail about the order, as described further below. Optionally, a user can also designate certain providers as "favorite" providers, and an "Orders" button 1548 and a "Merchants" button 1550 are provided for switching between a list of favourite orders and a list of favourite providers.

Figure 15F:
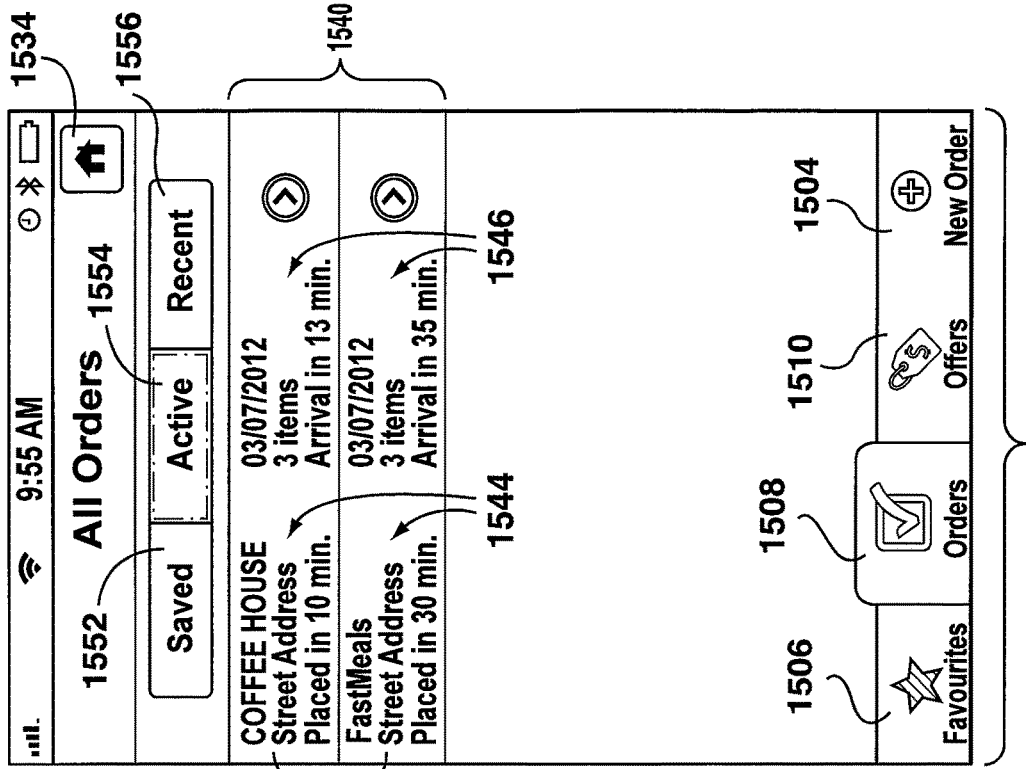
FIG. 15F shows an exemplary orders page of the remote ordering application of FIG. 15A, listing active orders.
Figure 15E:
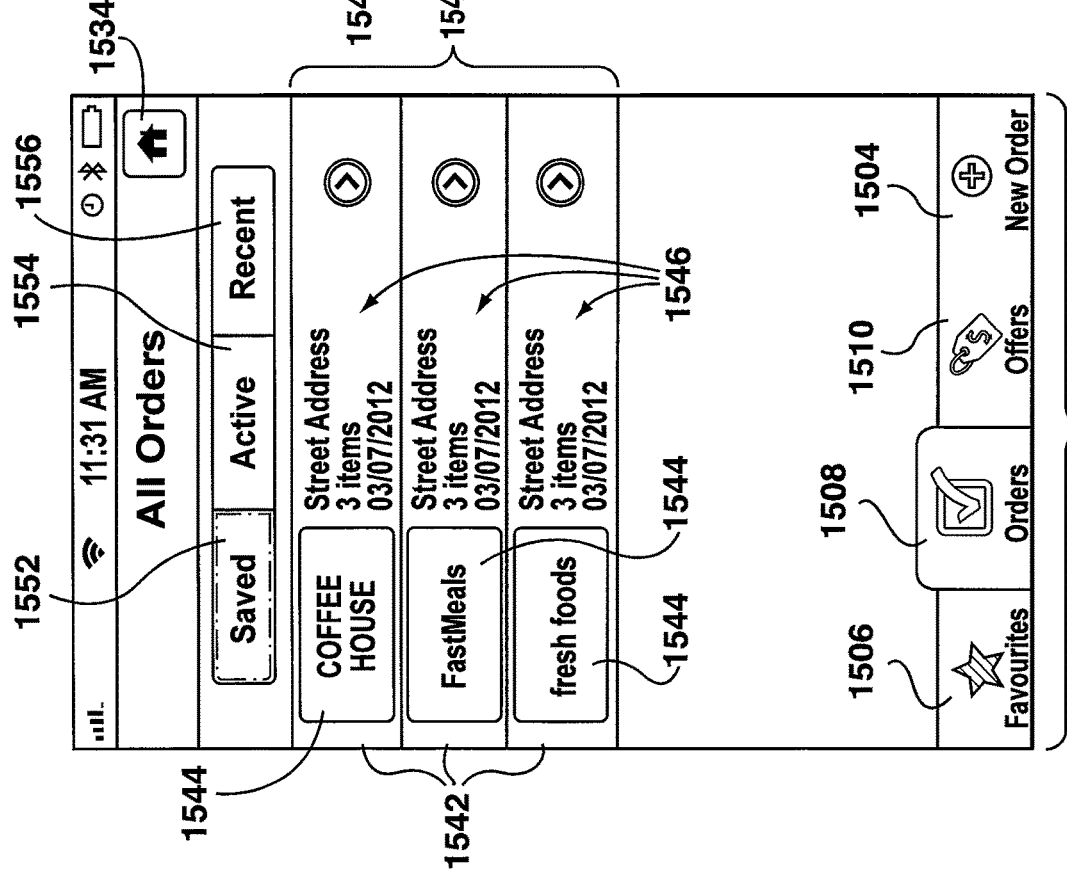
FIG. 15E shows an exemplary orders page of the remote ordering application of FIG. 15A, listing saved orders.

Selecting the "All Orders" icon 1508, either on the main landing page in FIG. 15A or in the navigation region 1538, will generate a page displaying orders in a manner similar to the "Favourites" page, that is, as a list 1540 displaying entries 1542 showing an identification 1544 of the relevant provider as well as a summary 1546 of the order. Respective buttons 1552, 1554 and 1556 are provided for allowing a user to selectively display "saved" or "favourite" orders, as shown in FIG. 15E, "active" orders that have been placed and are awaiting fulfillment, as shown in FIG. 15F and "recent" orders (not shown). The recent orders may be orders placed within a previous predefined period, such as one week or one month, or may be the X most recent orders, where X is a positive integer. Optionally (not shown) a button may be provided for displaying "favourite", "active" and "recent" orders simultaneously (possibly with vertical scrolling). As can be seen in FIG. 15F, for the "active" orders, the summary 1546 shows both the arrival estimate as well as the time remaining until a signal (e.g. signal 373) to commence processing is sent.

FIG. 15G shows a menu page for placing an order after a provider is selected, for example from the page shown in FIG. 15B. A "Breakfast" button 1558, "Lunch" button 1560 and "Dinner" button 1562 are provided for selecting among various menu categories. In one embodiment, the remote ordering application will permit a user to place an order containing items within a menu category that is not presently available; for example a user could, during breakfast hours, generate a dinner order that could be saved, although the remote ordering application (or order processing system) would not permit the user to activate that order, for example by pressing the "I'm on my way" button 1583 (FIG. 15I), until dinner service at the relevant provider is available. For example, the "I'm on my way" button 1583 could be grayed out on the "check out" page shown in FIG. 15I if the order is not yet able to be acted upon. In one embodiment, the system (either the remote ordering application or the order processing system, or both in combination) will compare the arrival estimate, the order completion estimate and the availability time of the menu category to determine whether an order can be placed (as opposed to being saved for later action). For example, suppose a user wishes to place a lunch order at 10:45 a.m., the user is thirty minutes away from the provider location, lunch starts at 11:00 a.m. and the order will take ten minutes to prepare. In this scenario, since there is enough time between availability of the "lunch" menu category (11:00 a.m.) and the user's expected arrival (11:15 a.m.) to prepare the order (which takes ten minutes), the system would allow the user to initiate that order using the "I'm on my way" button 1583. Similarly, the system could also compare the arrival estimate to the hours of operation of the provider location, for example preventing a user from initiating an order if the user will not arrive at the provider location until after it is closed.

In FIG. 15G, a lunch menu has been selected and various menu items are presented in the form of a list 1564 of menu item entries 1566. A horizontal menu navigation region 1568 allows the user to navigate among various types of menu items, and in the embodiment shown in FIG. 15G, allows for selection among "Salads", "Value Meals", "Sandwiches", "Side Orders", "Drinks" and "Deserts". The icon for "Side Orders" is partially obscured and the icons for "Drinks" and "Deserts" are not visible, these can be accessed by scrolling the menu navigation region 1568. A "Back" button 1570 allows a user to return to the previous page, and a "Check Out" button 1572 allows a user to access a "check out" page (described further below).

By selecting one of the menu item entries 1566, a user can access a menu item detail page for that menu item, as shown in FIG. 15H. The menu item detail page shown in FIG. 15I includes a quantity specifier 1574 and one or more detail specifiers 1576 for specifying required details of the menu item, such as the size and type of an accompanying drink and/or side order. A note specifier 1578 can be used for making unusual requests, such as removing a condiment or adding an unexpected condiment. The menu item detail page also includes the "Back" button 1570 and "Check Out" button 1572.

Figure 15I:
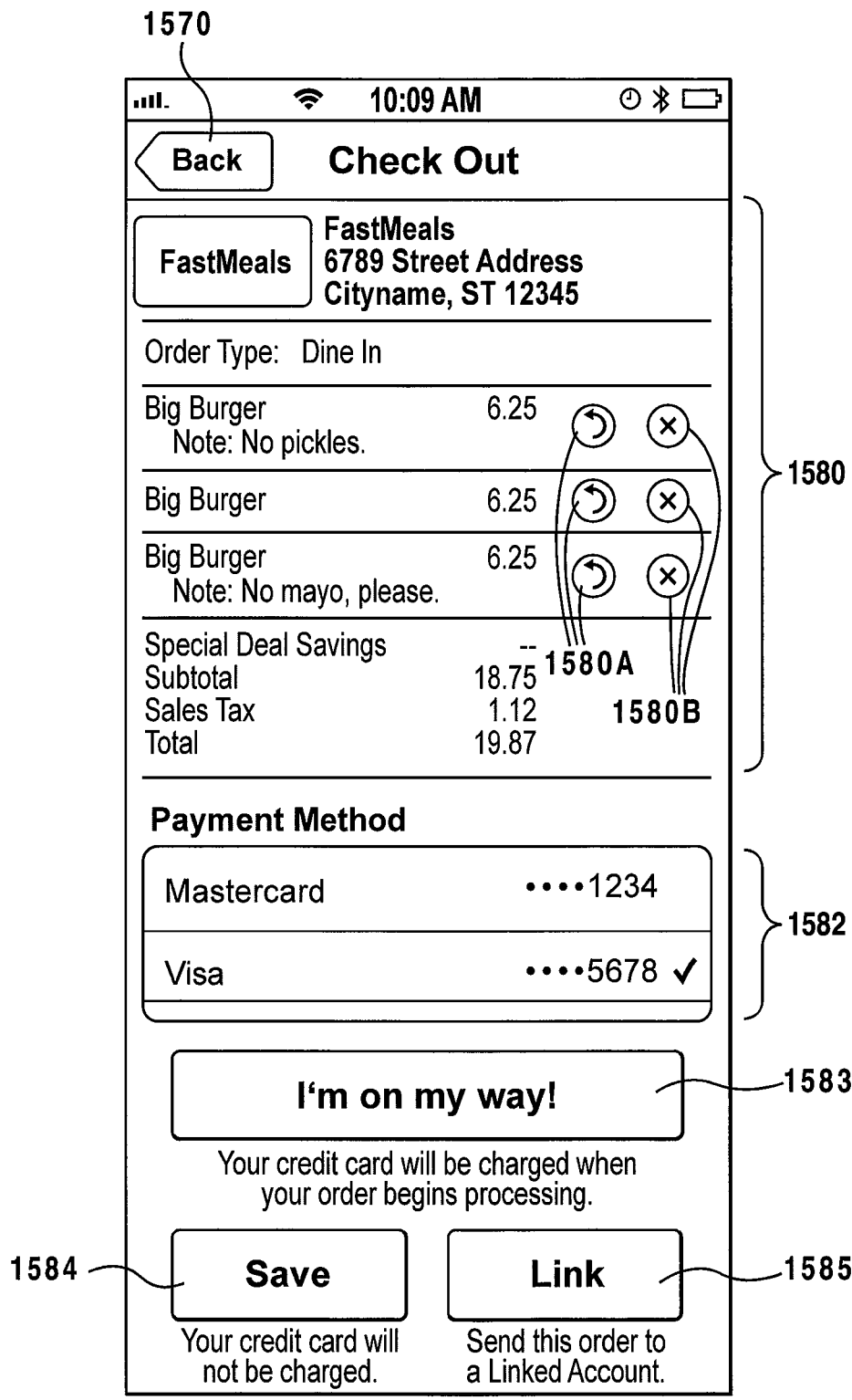
FIG. 15I shows a check-out menu page of the remote ordering application of FIG. 15A.

FIG. 15I shows an exemplary "check out" page reached by selecting the "Check Out" button 1572. It will be appreciated that the content of the page shown in FIG. 15I may be larger than the available screen real estate on a typical smartphone; all of the content can be accessed by vertical scrolling and the entire page is shown in a single view for simplicity of illustration. The "check out" page includes an order summary 1580, which in turn includes item correction icons 1580A for returning to the menu item detail page for that menu item, and item deletion icons 1580B for deleting an item. The "check out" page also includes a payment specification 1582, for example for entering credit card information or for accessing a third party payment provider. Payment information may, for example, be stored locally, stored by an order processing system, provided by a third party payment processor, or may be entered each time and discarded after each use. In addition, the "check out" page includes an "I'm on my way" button 1583, a "Save" button 1584, and a "Link" button 1585.

The "I'm on my way" button 1583 is used when the user who placed the order will be picking it up and will, depending on the configuration, cause the remote ordering application to perform one of a number of sets of actions. In one embodiment, selecting the "I'm on my way" button 1583 may cause the remote ordering application to store the order and begin monitoring the location of the networked mobile wireless telecommunication computing device so that the order can be transmitted to an associated order processing system at the appropriate time. In another embodiment, selecting the "I'm on my way" button 1583 may cause the remote ordering application to transmit the order to an associated order processing system and begin monitoring the location of the networked mobile wireless telecommunication computing device so that a signal to commence processing can, when appropriate, be transmitted to the order processing system. In a further embodiment, selecting the "I'm on my way" button 1583 may cause the remote ordering application to transmit the order to an associated order processing system and begin monitoring the location of the networked mobile wireless telecommunication computing device for the purpose of transmitting the location information to the order processing system. Typically, selecting the "I'm on my way" button 1583 will trigger at least a payment pre-authorization process.

Selecting the "Save" button 1584 will store the order, either locally on the networked mobile wireless telecommunication computing device or on an order processing system for later use, for example as "Favourite". Selecting the "Link" button 1585 will associate the order with a different networked mobile wireless telecommunication computing device to facilitate pickup by a user different from the user who placed the order.

FIG. 15J shows a page generated responsive to selection of the "Link" button 1585. This page displays a list 1586 of available users with whose networked mobile wireless telecommunication computing device the order may be associated. Selecting the button 1587 for one of those users would, in one embodiment, transmit the order to the relevant order processing system and associate it with the networked mobile wireless telecommunication computing device of the selected user. For example, a signal may be sent, either from the networked mobile wireless telecommunication computing device on which the order was placed or from the order processing system, to the remote ordering application on the networked mobile wireless telecommunication computing device of the selected user. This signal could, for example, cause the remote ordering application on the networked mobile wireless telecommunication computing device of the selected user to display an alert, provide access to details of the order, and provide an "I'm on my way" button 1583 on that networked mobile wireless telecommunication computing device.

Establishing the list 1586 of available users with whose networked mobile wireless telecommunication computing device the order may be associated may be done in a number of ways. In one embodiment, a first user may identify the networked mobile wireless telecommunication computing device of a second user by entering a unique identifier, such as a telephone number, for that device. The remote ordering application may then send an invitation to the networked mobile wireless telecommunication computing device of a second user, and the second user would only be added to the list 1586 of available users if the second user indicated his or her assent. The invitation could be handled by a remote ordering application on the networked mobile wireless telecommunication computing device of the second user or, where a corresponding remote ordering application has not been installed, on that device, may include instructions for such installation. For example, an invitation may comprise a text message with a link for installation.

Once the user has selected the "I'm on my way" button 1583, the remote ordering application may present navigation information for travelling from the present location of the user's networked mobile wireless telecommunication computing device to the provider location. The navigation information may be presented either as a map 1588, as shown in FIG. 15K, or as a list 1589 of written directions, as shown in FIG. 15L. A "Map" button 1590A and a "Directions" button 1590B for switching between the map and direction views. In each of the map view (FIG. 15K) and the directions view (FIG. 15L), a "Confirmation" button 1592 allows the user to display order confirmation information, such as a bar code or QR code, on the display of the networked mobile wireless telecommunication computing device to facilitate order pickup. The map view (FIG. 15K) and the directions view (FIG. 15L) also each include an arrival estimate display 1591A showing the arrival estimate and an order processing commencement display 1591B showing when order processing is expected to commence. The order processing commencement display 1591B may indicate how much time a user has before he or she is no longer able to pause, change or cancel an order.

Figure 15M:
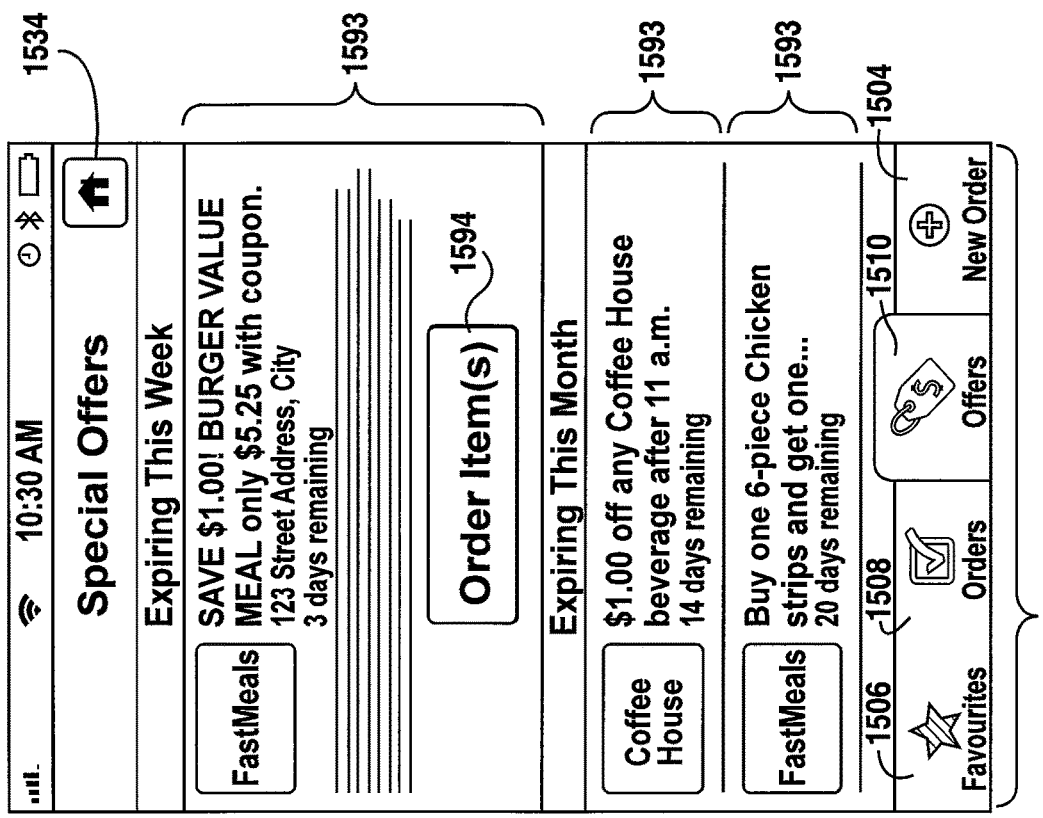
FIG. 15M shows an exemplary "offers" page of an exemplary remote ordering application.
Figure 15L:
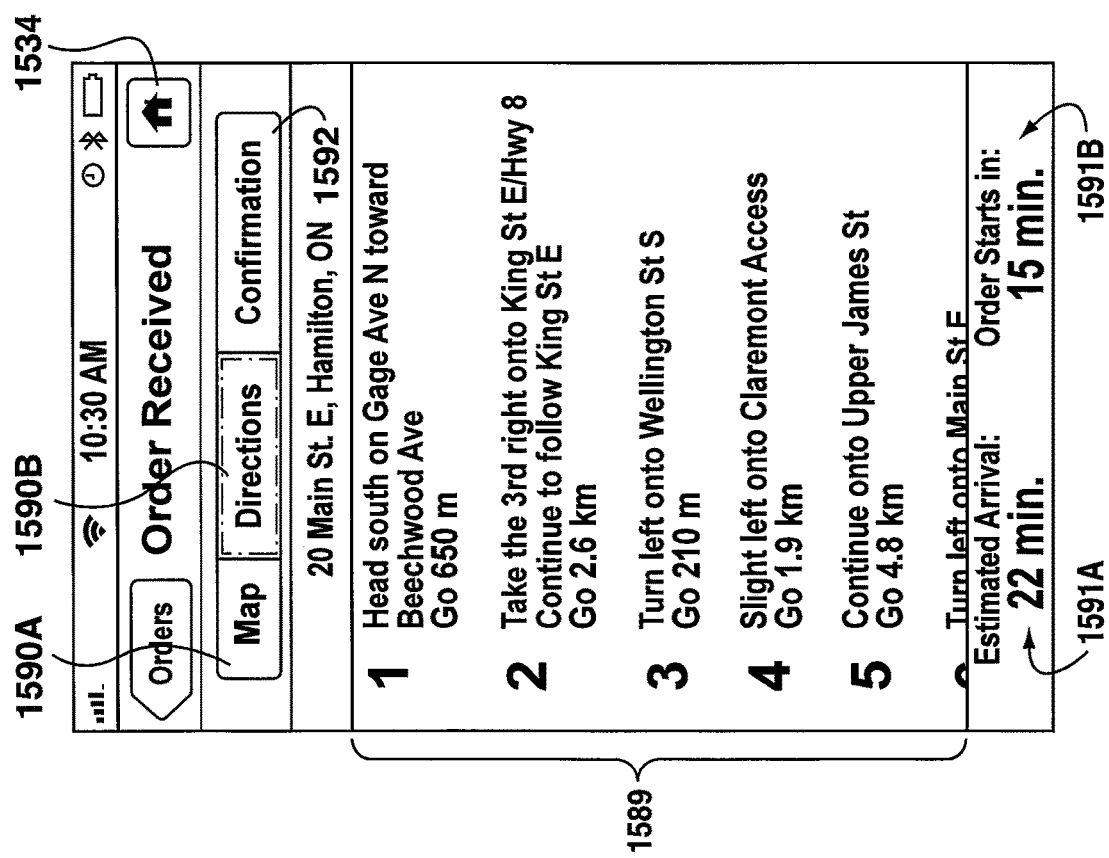
FIG. 15L shows an exemplary navigation information page of the remote ordering application of FIG. 15A, with navigation information presented as a list of written directions.

Selecting the "Offers" icon 1510 causes the remote ordering application to present an "Offers" page, as shown in FIG. 15M, showing various offers 1593 from participating providers. The offers may include an "Order Item(s)" button 1594 allowing a user to generate an order directly from the "Offers" page.

Regardless of whether orders are transmitted to the order processing system 362 of a provider 360 or the order processing system 392 of a provider aggregator 390, in a preferred embodiment a point-of-sale (POS) system integrated with the relevant order processing system is used at the provider location(s). In one preferred embodiment, the POS system is provided as software which can be installed on a computer system at the provider location. The computer system may comprise a single computer or a plurality of computers. Any type of computer system may be used, although preferably a computer system having a location module enabling geolocation of the computer system is used. Tablet computers having geolocation modules, such as those offered under the trademark iPad by Apple, having an address at 1 Infinite Loop, Cupertino, Calif. 95014, are well-suited to this function, although other tablet computers may also be used. One particular advantage of using a computer that includes a location module is that the position of the computer, as determined using its location module, may be used as the target 1204 (FIGS. 12A and 12B) for generating the arrival sequence estimate. For example in a restaurant setting, a tablet computer having a location module enabling geolocation can be positioned at an order fulfillment station, such as a pick-up counter or drive-through window, and can communicate its location to the order processing system 362, 392. The physical placement of the tablet computer at the order fulfillment station effectively designates the position of the order fulfillment station to use as the target 1204 for generating the arrival sequence estimate.

FIGS. 16A to 16F show exemplary screen shots each representing a display of a touchscreen networked mobile telecommunication computing device executing an exemplary provider order fulfillment support application in communication with, or forming part of, an order processing system, such as the order processing systems 362 or 392 described above. Preferably the device communicates wirelessly although wired communication is also contemplated. Individual screen displays are referred to as "pages".

The exemplary provider order fulfillment support application is intended for use in an embodiment in which the order 372 is transmitted separately from, and in advance of, the signal 373 to commence processing, and has five primary functions, each of which is described below.

Figure 16A:
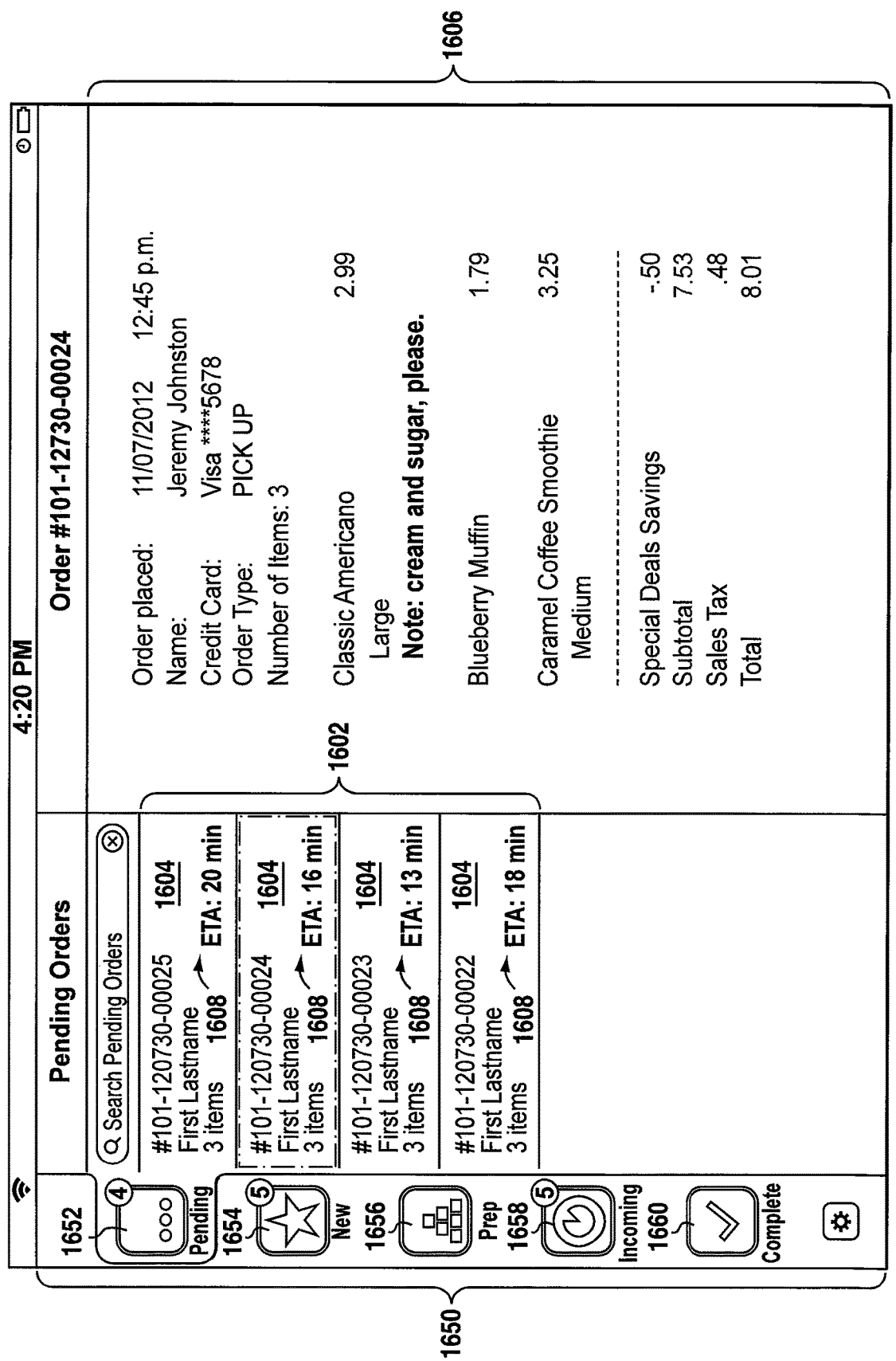
FIG. 16A shows an exemplary page for a "Pending Orders" function of an exemplary provider order fulfillment support application.

FIG. 16A shows an exemplary page for a "Pending Orders" function, which displays a list 1602 having pending order entries 1604 for each of a plurality of orders. The orders displayed on the page for the "Pending Orders" function are those orders that have been confirmed but where the signal 373 to commence processing has not yet been received. For example, an order may be added to page shown in FIG. 16A responsive to a user selecting the "I'm on my way" button 1583 in FIG. 15I. By selecting one of the pending order entries 1604, order details 1606 can be displayed. The pending order entries 1604 each include an indicator 1608 of the arrival estimate for the associated user, in this case the estimated time until arrival at the provider location. The "Pending Orders" function permits a provider location to forecast demand. In many cases, a provider could be more efficient in using their existing order processing capacity if they knew the orders they would have to fulfill in the near future, and the "Pending Orders" function provides this information.

FIG. 16B shows an exemplary page for a "New Orders" function, which displays a list 1610 having new order entries 1612 for each of a plurality of orders. The orders displayed on the page for the "New Orders" function are those orders for which the signal 373 to commence processing has been received and therefore processing should commence. When the signal 373 to commence processing has been received and an order transitions from the page for a "Pending Orders" (FIG. 16A) to the page for "New Orders" (FIG. 16B), an audible alert is preferably generated, and the corresponding new order entry 1612 appears at the top of the list 1610 and is presented in bold, as shown for the two uppermost order entries 1612 in FIG. 16B. The new order entries 1612 each include an indicator 1616 of the arrival estimate for the associated user. Selecting one of the new order entries 1612 will display order details 1614, which are similar to the order details 1606 for the "Pending Orders" function except that the order details 1614 for the "New Orders" function include completion indicators 1619 denoting whether a particular component of the order has been completed. Preferably, in a case where a predetermined period of time elapses without a newly added new order entry 1612 having been selected and its order details 1614 viewed, the provider order fulfillment support application can transmit an alert to the order processing system 362, 392.

In many cases, orders can be separated into components. For example, in a sandwich-type quick service restaurant, components may be beef sandwiches (hamburgers), chicken and fish items, side orders, and drinks, each of which is prepared at a separate station. In a grocery store context, components may be, for example, non-perishable items, bakery items, deli items, seafood items, butcher items and produce items. In a toy store context, components may be, for example, toys for boys, toys for girls, baby toys, and electronics. One aspect of the exemplary provider order fulfillment support application facilitates separate, simultaneous processing of various components of an order.

Preferably, a provider order fulfillment support application will enable different pages to be displayed for different components of an order. In one embodiment, touchscreen displays may be provided at each preparation station for a given component, with each display coupled to a central computer system. In another embodiment, a networked mobile telecommunication computing device executing a provider order fulfillment support application may be provided at each preparation station. Such arrangements allow staff at each preparation station to view a page showing only those items that are to be processed at that preparation station. For example, in a sandwich-type quick service restaurant, a page displaying only beef sandwiches may be displayed at the beef sandwich station, a page displaying only chicken and fish items may be displayed at the chicken and fish station, and so on. Presenting different pages for different component types may be achieved in a number of ways. In one presently preferred embodiment suitable for multi-station restaurant applications, each menu item is assigned a number designating the type of component that the menu item is. For example, "1" may designate a menu item as a "drink" component, "2" may designate a menu item as a "side order" component, "3" may designate a menu item as a "beef sandwich" component, "4" may designate a menu item as a "chicken/fish" component, and so on. Then, by selecting a number, menu items designated by that number, and hence corresponding to a particular component, may be isolated and displayed.

Figure 16C:
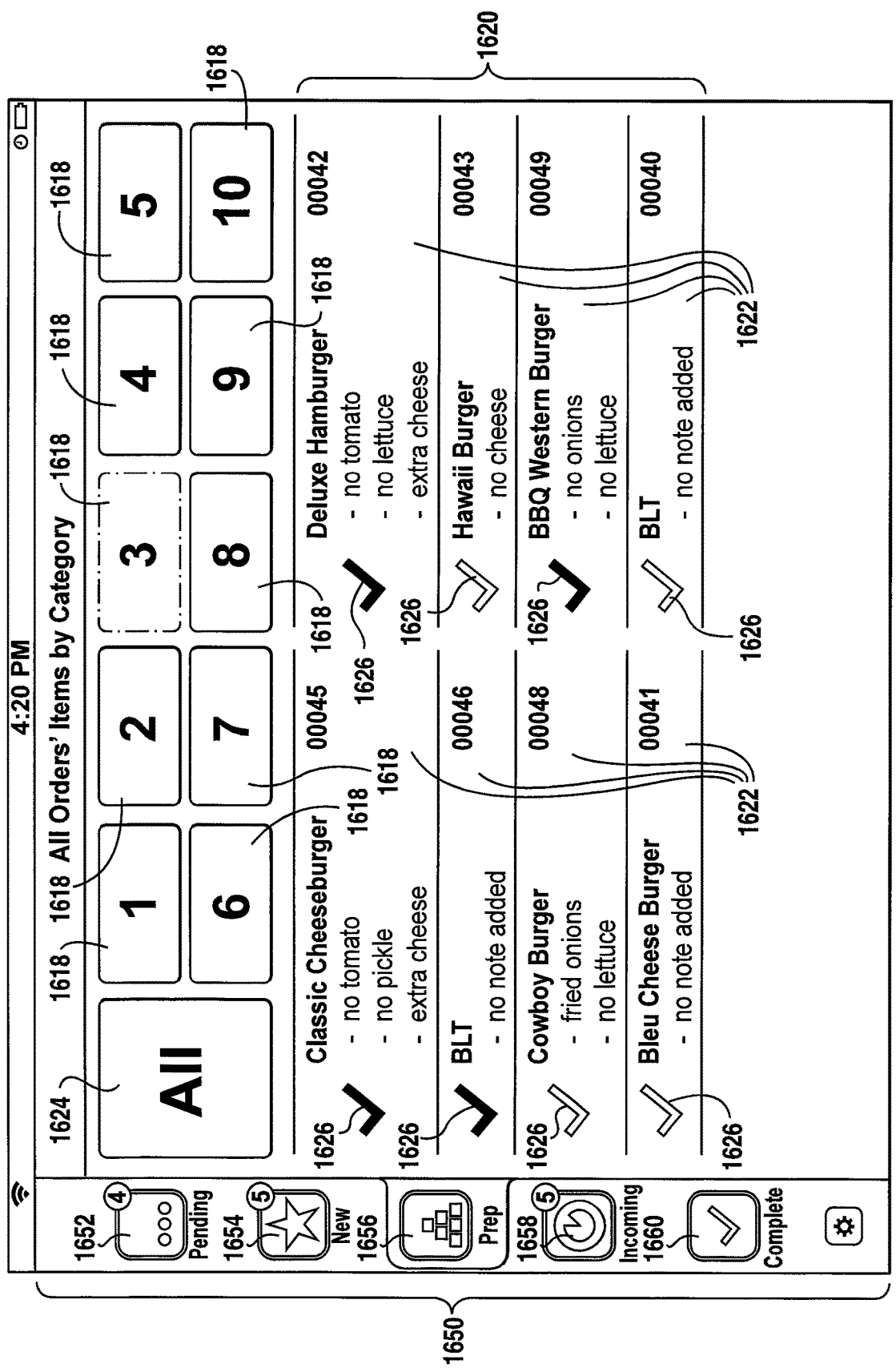
FIG. 16C shows an exemplary page for a "Preparation" function of the provider order fulfillment support application of FIG. 16A.

FIG. 16C shows an exemplary page for a "Preparation" function of a provider order fulfillment support application for use in a quick service restaurant. The page shown in FIG. 16C includes several numbered component designation buttons 1618. The component designation button 1618 numbered "3" has been selected, and a list 1620 of menu item entries 1622 is displayed; the menu item entries 1622 correspond to menu items in orders for which the signal 373 to commence processing has been received. The number "3" designates "beef sandwich" components, and as a result the list 1620 of menu item entries 1622 only shows those menu item entries 1622 for which the menu item is designated with a "3", that is, as a "beef sandwich" component. By selecting a different component designation button 1618, menu items corresponding to a different component type could be displayed, and by selecting an "All" component designation button 1624, menu item entries 1622 for all menu items could be displayed, for example for a manager. Each of the menu item entries 1622 includes a completion indicator 1626, which can be selected by a staff member to indicate that the corresponding menu item is complete. Responsive to a menu item entry 1622 being marked as complete, after a brief delay the provider order fulfillment support application would remove that menu item entry 1622 from the page shown in FIG. 16C and update the corresponding completion indicator 1619 in the page shown in FIG. 16B. This process can also serve as a signal that an order is being addressed. The "Preparation" function whose page is shown in FIG. 16C can also support component-based order processing, so that processing of the various components of an order can be triggered separately based on the processing time required for each component. In alternate embodiments, the "Preparation" function may have other types of visual display, for example a graphical display showing how many of each component type should be prepared (e.g. how many small, medium and large fries, how many Cowboy Burgers, etc.).

Figure 16D:
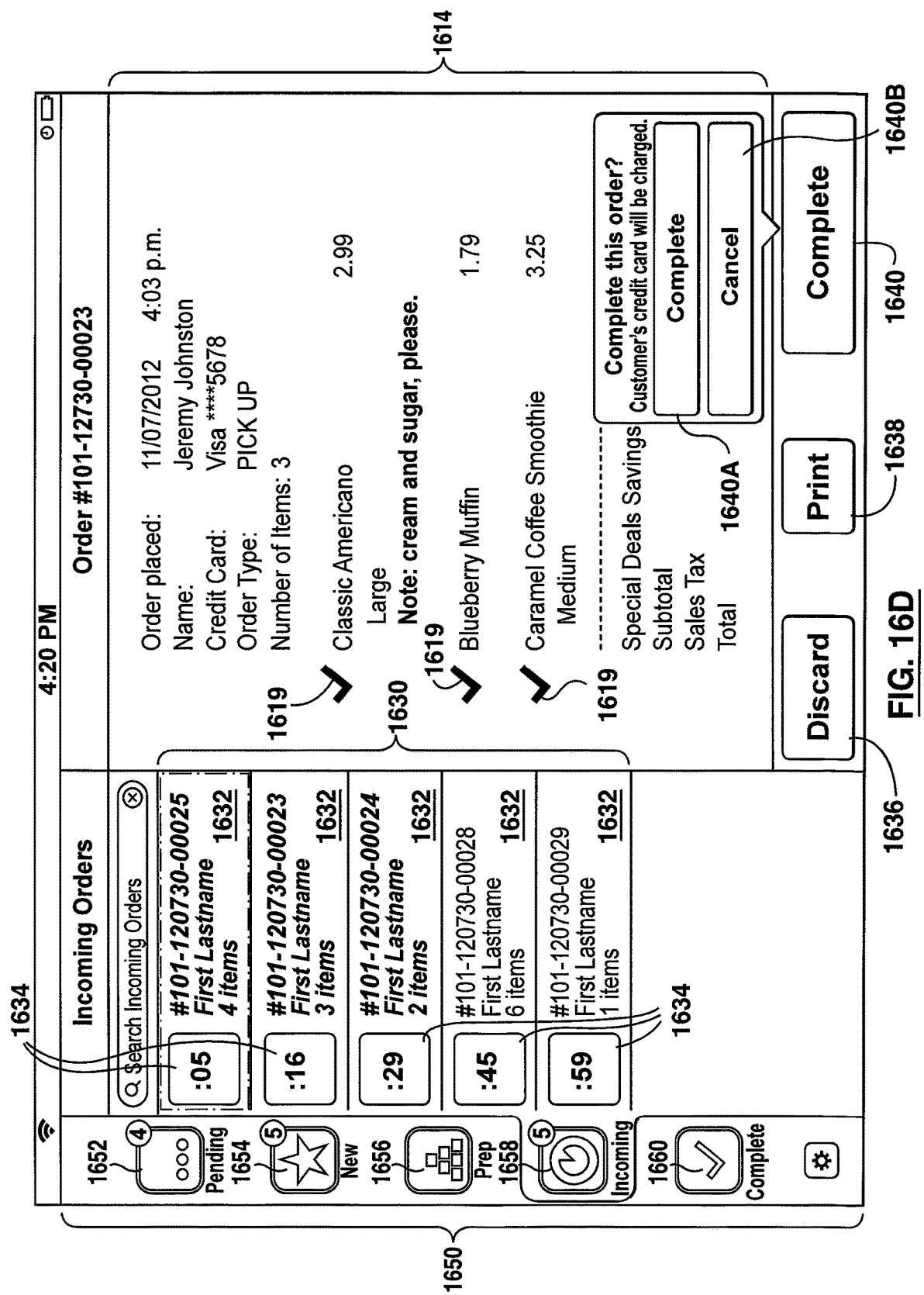
FIG. 16D shows an exemplary page for an "Incoming Orders" function of the provider order fulfillment support application of FIG. 16A.

FIG. 16D shows an exemplary page for an "Incoming Orders" function of an exemplary provider order fulfillment support application, which displays an arrival sequence estimate as a list 1630 having incoming order entries 1632 for each of a plurality of orders, ranked in order of expected arrival, with the uppermost incoming order entry 1632 being for the order whose associated user is expected to arrive next. The incoming order entries 1632 each also include an indicator 1634 of the arrival estimate for the associated user, in this case the estimated time until arrival at the provider location, and by selecting one of the incoming order entries 1632, order details 1614, including completion indicators 1619, can be displayed. The list 1630 allows a staff member to easily determine the order associated with the next user expected to arrive, so that the order can be prepared for presentation to the user substantially immediately upon their arrival. Depending on the configuration, the list 1630 may include incoming order entries 1632 for all orders in the system, or only for a subset of orders. For example, the list 1630 may include incoming order entries 1632 only for those orders for which the signal 373 to commence processing has been received, or only for orders for which the arrival estimate falls below a predetermined threshold, such as one minute. Optionally, a sub-threshold for the arrival estimate, such as thirty seconds, may be provided, and incoming order entries 1632 for orders whose arrival estimate is below the sub-threshold may be highlighted, as shown in FIG. 16D. The arrival sequence estimate may be continuously updated for all orders, or, for orders for which the arrival estimate is below a threshold, the position of those orders in the arrival sequence estimate may be fixed. In the embodiment shown in FIG. 16D, this would lead to the uppermost incoming order entries 1632 in the list 1630 having a fixed position while incoming order entries 1632 below that uppermost group were reshuffled. The list 1630 shown in FIG. 16D is merely one exemplary embodiment of a visual representation of an arrival sequence estimate, and other embodiments may also be used. For example, and without limitation, the arrival sequence estimate may be presented as a "radar-type" map, similar to that shown in FIGS. 12A and 12B, showing radial distance of the users from the target 1204, or may be a list ordered in some manner other than sequence of expected arrival, but with entries that include a number or symbol indicating expected order of arrival.

The exemplary page for the "Incoming Orders" function of the exemplary provider order fulfillment support application shown in FIG. 16D also includes a "Discard" button 1636, a "Print" button 1638 and a "Complete" button 1640. Selecting the "Discard" button 1636 will cause the exemplary provider order fulfillment support application to delete the order associated with the highlighted order entry 1632 whose order details 1614 are shown, for example if the associated user never arrives. The "Print" button 1638 can be used to print a copy of the order details 1619 (the "Print" button 1638 also appears on the page for the "New Orders" function shown in FIG. 16B). The "Complete" button 1640 is used when a user has collected their order, and causes the exemplary provider order fulfillment support application to mark the order as complete and trigger the appropriate payment processing steps, such as charging a credit card. Selecting the "Complete" button 1640 may also send a signal that will cause the remote ordering application 350 to cease monitoring location or transmitting location information so to conserve battery life and data usage on the networked mobile wireless telecommunication computing device. Alternatively this may be achieved by scanning a bar code or QR code on the networked mobile wireless telecommunication computing device, through manual deactivation, location services, or otherwise. In the illustrated embodiment, selecting the "Complete" button 1640 generates a confirmation button 1640A to confirm the order is to be completed, and a cancellation button 1640B for use if the "Complete" button 1640 was selected by mistake. A similar approach would be used for the "Discard" button 1636 to reduce the likelihood of accidentally discarding an order.

Reference is now made to FIG. 16E, which shows an exemplary page for a "Complete Orders" function of an exemplary provider order fulfillment support application. This page includes a list 1642 containing order entries 1644 for orders that have been marked as complete, and selecting one of the order entries 1644 will display order details 1646 for that order. A "Refund" button 1648 is provided, selection of which will cause the exemplary provider order fulfillment support application to initiate a refund process where required.

Each of the pages shown in FIGS. 16A to 16E includes a vertical navigation region 1650 containing icons for navigating among the various pages, namely a "Pending" icon 1652 for navigating to the "Pending Orders" page in FIG. 16A, a "New" icon 1654 for navigating to the "New Orders" page in FIG. 16B, a "Prep" icon 1656 for navigating to the "Preparation" page in FIG. 16C, an "Incoming" icon 1658 for navigating to the "Incoming Orders" page in FIG. 16D and a "Complete" icon 1660 for navigating to the "Complete Orders" page in FIG. 16E.

It is contemplated that a provider order fulfillment support application of the type described and illustrated in respect of FIGS. 16A to 16E could, in conjunction with a remote ordering application executing on one or more networked mobile wireless telecommunication computing devices, supplement or replace existing POS systems. In one embodiment, users would use their networked mobile wireless telecommunication computing devices to place their orders instead of placing a verbal order. To facilitate this approach, a specialized remote ordering application without location-based features may be implemented as a browser-executed web application. Alternatively, cashiers or wait staff could use a networked mobile wireless telecommunication computing device executing the remote ordering application to enter orders and receive payment.

It is also contemplated that, where services are provided by a provider aggregator, pick-up of goods orders from multiple locations may be supported. A user could enter multiple orders for multiple providers, and the order processing system can recommend a sequence for pick-up based on the user's location as well as other factors (e.g. perishable food last). Alternatively, a user could manually set the sequence.

Optionally, the remote ordering application 350 may permit an order, generated by that user or linked by another user, to create an appointment to serve as a reminder, for example by synchronizing with a calendar application on the networked mobile wireless telecommunication computing device. In one exemplary application, one spouse could send a dinner order to the other and also generate a reminder appointment in the latter spouse's calendar so the latter spouse does not forget to pick up dinner.

It is further contemplated that a remote ordering application may include suitable recognition software and be integrated with a camera on the networked mobile wireless telecommunication computing device to generate orders by scanning bar codes or QR codes, or by capturing an image of the item. For example, a user could build a grocery order from a paper grocery store flyer, or by scanning the bar code on empty containers.

In addition, a remote ordering application may incorporate a "sharing" or social media functions. For example, one user may use the remote ordering application to recommend a product or provider to another user, who could then generate an order from the recommendation. A first user may also grant selected other users access to his or her prior orders to see what he or she has purchased, without necessarily allowing the other users to place orders and link them to that first user.

A user may allow himself or herself to be openly solicited based on location information or based on a category of interest, or both. For example, a user may be hungry but not sure where he or she would like to eat, or may be in an unfamiliar area and unsure of what restaurant options are available. The user could open an application, such as the remote ordering application 350, on his or her networked mobile wireless telecommunication computing device, such as the smartphone 310, and choose to be solicited. Individual restaurants associated with a provider aggregator 390 may have submitted commercial data to the provider aggregator 390 in advance, such as daily specials, or may determine that a user is requesting such a commercial solicitation, for example by way of a request from an order processing system 392 of the provider aggregator 390, and submit the relevant commercial data in response. The provider aggregator 390 then generates the commercial solicitations based on the location information and/or the area of interest, and transmits them to the remote ordering application 350 on the user's networked mobile wireless telecommunication computing device. The commercial solicitations may be displayed, for example, on an "Offers" page like that shown in FIG. 15M. The user can then choose the most appealing commercial solicitation, and place an order using the remote ordering application 350 as described above. The provider aggregator 390 can also provide directions to the selected provider, or interface with a navigation system on the user's networked mobile wireless telecommunication computing device to provide such directions.

In certain embodiments, a general search for commercial solicitations can be provided, without reference to the user's current or planned location, for cases where a user may wish to be made aware of the various commercial solicitations, such as daily specials, within a wider geographic area. For example, a user may be at home and be hungry but not sure where to eat, and can determine what daily specials are available from restaurants associated with the provider aggregator 390, or may be interested in acquiring a particular product such as a television, and can specify "electronics" as an area of interest to see if there are any relevant special offers among the providers 360A, 360B . . . 360n associated with the provider aggregator 390. In such cases, the user may not wish to set geographical limitations in advance, because he or she may be willing to travel further depending on how enticing the offer is.

Figure 8:
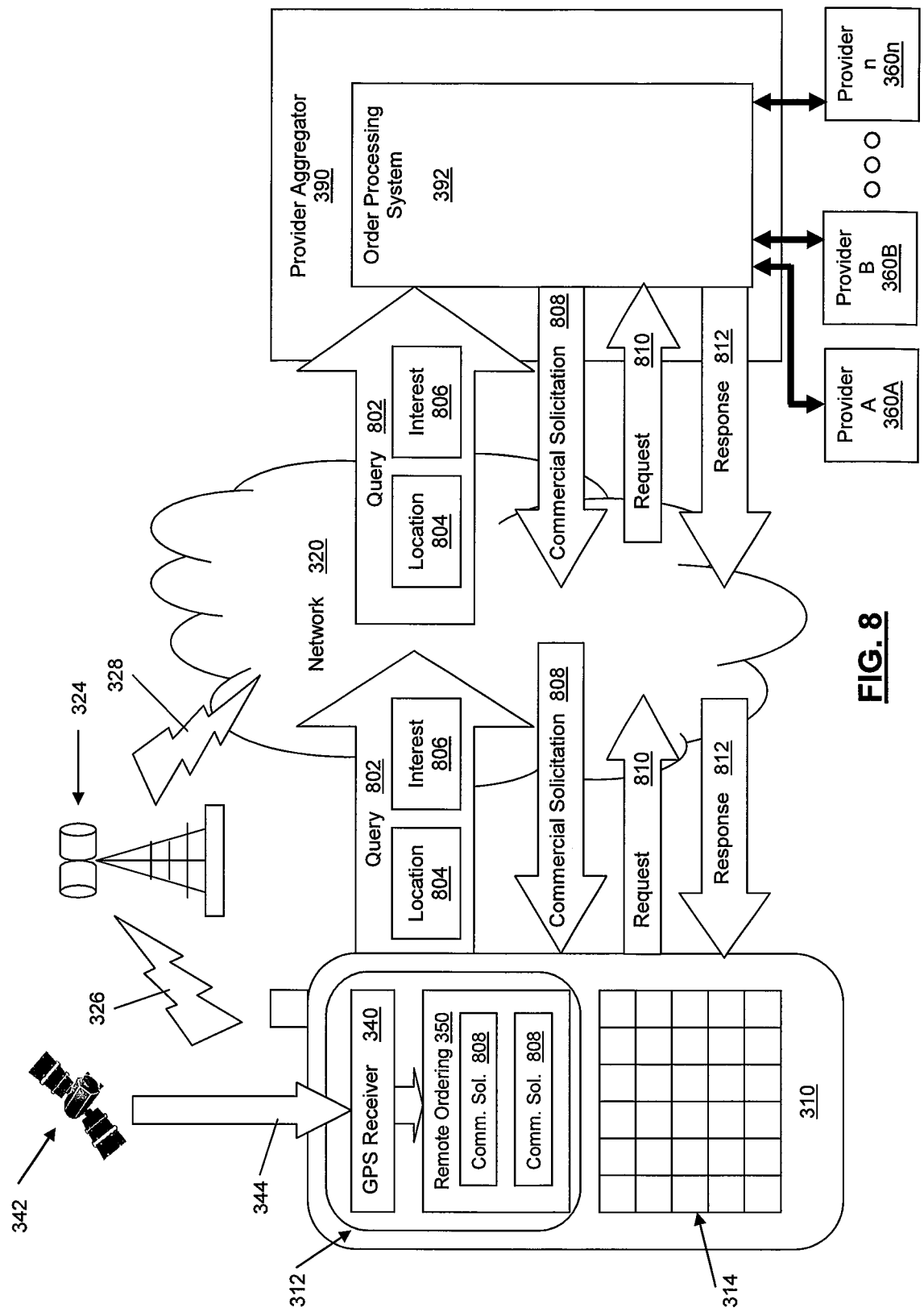
FIG. 8 illustrates schematically an arrangement and method for communicating at least one commercial solicitation.

Reference is now made to FIG. 8, which illustrates schematically an arrangement and method for communicating at least one commercial solicitation. The physical components of the arrangement are identical to those shown in FIGS. 5A to 5C, and hence corresponding reference numerals are used to refer to corresponding features.

A user of the smartphone 310 generates a query 802 using the remote ordering application 350, and the smartphone 310 then transmits the query 802 through the network 320 to the order processing system 392 of a provider aggregator 390. The query 802 includes location information 804 and a specification 806 indicating an area of interest to the user. The location information 804 may be the current location of the smartphone 310 (and hence the user) derived from the GPS receiver 340, or may be manually entered by the user. For example, if the user is travelling, the user may wish to specify his or her destination rather than his or her present location. In another embodiment, the query may be sent from a user's desktop computer instead of from a networked mobile wireless telecommunication device, in which case the location information may be manually entered or obtained from an ISP. Optionally, the location information 804 may comprise a planned travel route, so that providers 360A, 360B . . . 360n along the planned travel route can be identified. This would enable, for example, a user who is about to head home from work and wants to pick up food to receive commercial solicitations from providers located along his or her planned route, and then place an order in accordance with the methods described above.

The specification 806 indicating an area of interest to the user is optional, and is used in cases where the provider aggregator 390 coordinates the offerings of providers 360A, 360B . . . 360n in different areas of interest. For example, if the provider aggregator 390 aggregates restaurants, the specification 806 could specify different types of restaurant, and if the provider aggregator 390 is the management of a shopping mall, it may coordinate providers 360A, 360B . . . 360n in such diverse areas of interest as restaurants, electronics, furniture, jewellery, hairstyling, general merchandise, clothing (including both men's and women's clothing and various subcategories of clothing such as formal wear, casual wear, urban wear, swim wear and the like), pet stores, and so on. By providing for the specification 806 indicating an area of interest to the user, the provider aggregator 390 can provide a more useful response to the query 802.

The order processing system 392 of the provider aggregator 390 receives the query 802, including the location information 804 and specification 806 of an area of interest, if any, and in response, determines at least one local provider 360A, 360B . . . 360n having a provider location within a predetermined proximity to the location specified by the location information 804. The order processing system 392 selects only local providers 360A, 360B . . . 360n whose offerings correspond with the area of interest indicated by the specification 806. The determination and selection can be made in any order. For example, the providers 360A, 360B . . . 360n corresponding to the area of interest can be selected first, and then those providers having a provider location within a predetermined proximity to the location specified by the location information 804 can be determined from that subset. Alternatively, the order processing system 392 may first determine those providers having a provider location within a predetermined proximity to the location specified by the location information 804, and then select the providers 360A, 360B . . . 360n corresponding to the area of interest. Once the order processing system 392 has identified the local providers 360A, 360B . . . 360n having a provider location within a predetermined proximity to the location specified by the location information 804, and also corresponding to the area of interest, if applicable, the order processing system 392 will transmit at least one commercial solicitation 808 associated with a respective one of the at least one local provider 360A, 360B . . . 360n to the smartphone 310 via the network 320.

In one alternative embodiment, such as where the provider aggregator 390 coordinates the offerings of providers 360A, 360B . . . 360n in only a single area of interest, the specification 806 indicating an area of interest, and the provision therefor, may be omitted and determination of providers may be based on the location information 804, without reference to area of interest. In another alternative embodiment, the location information 804 may be omitted and the providers may be selected based on area of interest, without reference to location. This latter embodiment would be suitable for cases where the provider aggregator 390 is the management of a shopping mall. Thus, a user who is planning to head to the mall to purchase jeans, for example, could select "jeans", either from a list or by entering "jeans" as a key word, and receive commercial solicitations from jean stores within the shopping mall. The user may also be provided with directions for navigation within the mall to a selected one of the jean stores.

The query 802 may also include additional criteria for identifying providers, such as hours of operation, price ranges, and other suitable factors.

The commercial solicitations 808 may be in the form of advertisements, special offers, and the like, and may be stored by the order processing system 392 and updated periodically, or alternatively, may be dynamically generated by the order processing system 392 by requesting commercial data from the local providers 360A, 360B . . . 360n identified in response to the query, and then using that commercial data to generate the commercial solicitation(s) 808.

The commercial solicitations 808 may be presented to the user via the remote ordering application 350 which, as noted above, may be a separate application program installed on the smartphone 310 or may be a page or pages within a web browser application on the smartphone 310 or on a desktop computer. The user can then select one of the commercial solicitations 808, and send a request 810 to the order processing system 392 indicating the selection, and the order processing system 392 will then send a response 812 to the request. In one embodiment, the response 812 may comprise directions to the relevant provider location corresponding to the selection indicated by the request 810. In another embodiment, the response 812 may comprise an item list for the relevant provider (or provider location), such as item list 354, comprising a list of available items and corresponding processing times for each item in the list, so that the ordering methods described above may be implemented.

In some embodiments, the remote ordering application 350 may, alone or in combination with systems and software hosted by a provider aggregator 390, include functionality which allows it to "learn" certain user preferences and automatically check for commercial solicitations 808 corresponding to those user preferences. For example, the remote ordering application 350 and/or provider aggregator system may detect that a user frequently searches for a particular brand of shoes, and may automatically begin to check periodically (e.g. daily) with the relevant providers 360A, 360B . . . 360n for commercial solicitations 808 relating to that brand of shoes. When a suitable commercial solicitation 808 is detected, the remote ordering application 350 can notify the user. Users can also be provided with an option to set such periodic checks manually.

Aspects of the arrangement and method described in respect of FIG. 8 can be suitably adapted for use with a single provider, rather than provider aggregator 390.

Any suitable networked mobile wireless telecommunication computing device, such as a smartphone, tablet computer, laptop computer or the like may be used in accordance with the systems, methods and computer program products disclosed herein. The locating system for the networked mobile wireless telecommunication computing device may be a GPS-based locating system, or where appropriate may be a Wi-Fi locating system or other suitable locating system.

Figure 9:
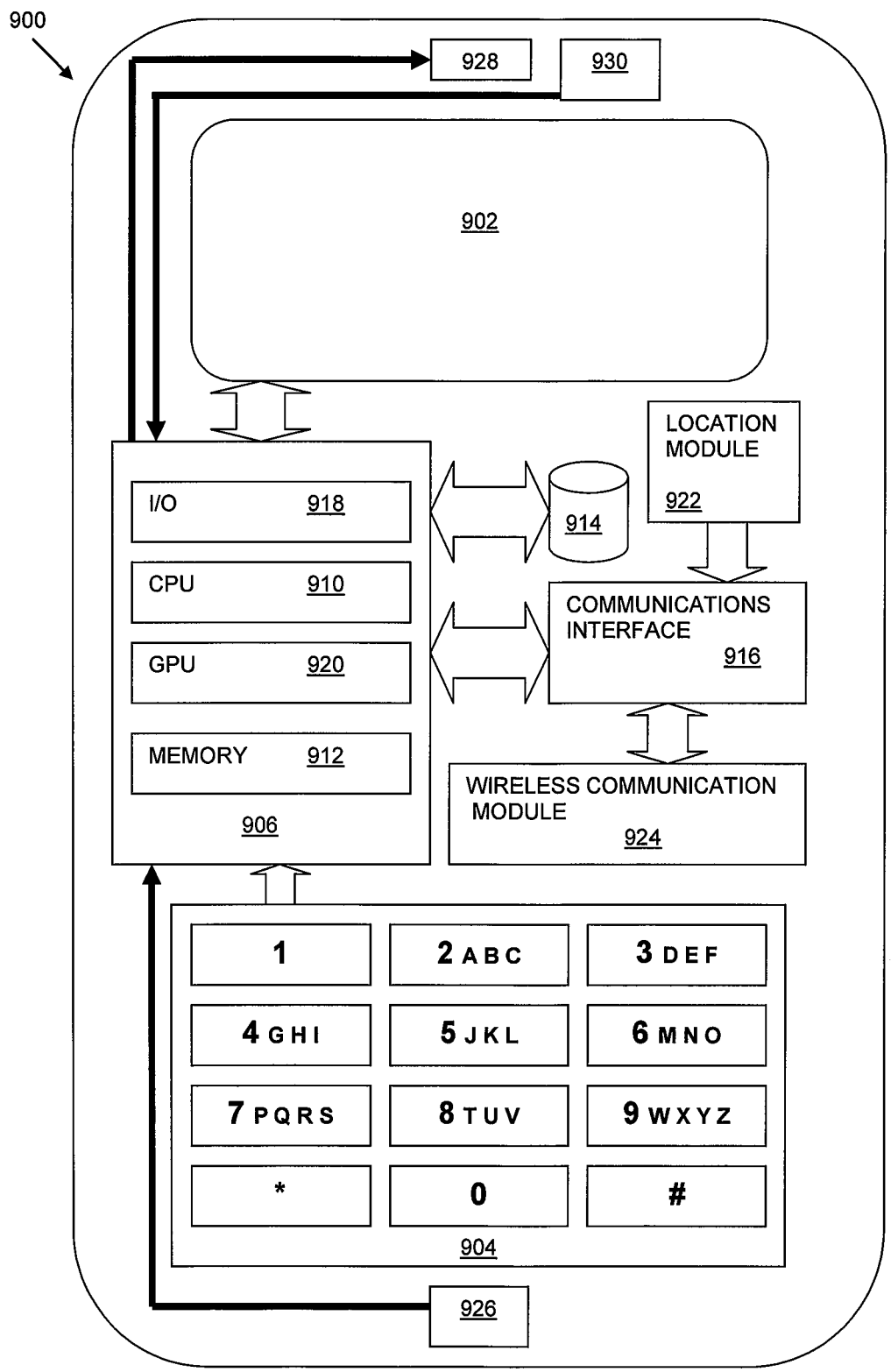
FIG. 9 is a schematic representation of an exemplary smartphone, which may be used in implementing various methods described herein.

FIG. 9 shows an exemplary networked mobile wireless telecommunication computing device in the form of a smartphone 900. The smartphone 900 includes a display 902, an input device in the form of keyboard 904 and an onboard computer system 906. The display 902 may be a touchscreen display and thereby serve as an additional input device, or as an alternative to the keyboard 904. The onboard computer system 906 comprises a central processing unit (CPU) 910 having one or more processors or microprocessors for performing arithmetic calculations and control functions to execute software stored in an internal memory 912, preferably random access memory (RAM) and/or read only memory (ROM) is coupled to additional memory 914 which will typically comprise flash memory, which may be integrated into the smartphone 900 or may comprise a removable flash card, or both. The smartphone 900 also includes a communications interface 916 which allows software and data to be transferred between the smartphone 900 and external systems and networks. The communications interface 916 is coupled to one or more wireless communication modules 924, which will typically comprise a wireless radio for connecting to one or more of a cellular network, a wireless digital network or a Wi-Fi network. The communications interface 916 will also typically enable a wired connection of the smartphone 900 to an external computer system. A microphone 926 and speaker 928 are coupled to the onboard computer system 906 to support the telephone functions managed by the onboard computer system 906, and a location module 922 including GPS receiver hardware is also coupled to the communications interface 916 to support navigation operations by the onboard computer system 906. An imaging device 930 such as a camera is also coupled to the onboard computer system 906. Input and output to and from the onboard computer system 906 is administered by the input/output (I/O) interface 918, which administers control of the display 902, keyboard 904, microphone 926 and speaker 928. The onboard computer system 906 may also include a separate graphical processing unit (GPU) 920. The various components are coupled to one another either directly or by coupling to suitable buses.

The exemplary smartphone 900 is merely one example of a networked mobile wireless telecommunication computing device, and is not intended to be limiting. Other examples of networked mobile wireless telecommunication computing devices include tablet computers, in-vehicle networked computing devices, among others. The term "networked mobile wireless telecommunication computing device" is intended to include technology developed subsequent to the filing hereof.

References to "buttons" herein, including in respect of FIGS. 15A to 15M and 16A to 16E, refer to touchscreen interface elements which resemble physical buttons, rather than to physical buttons.

Figure 10:
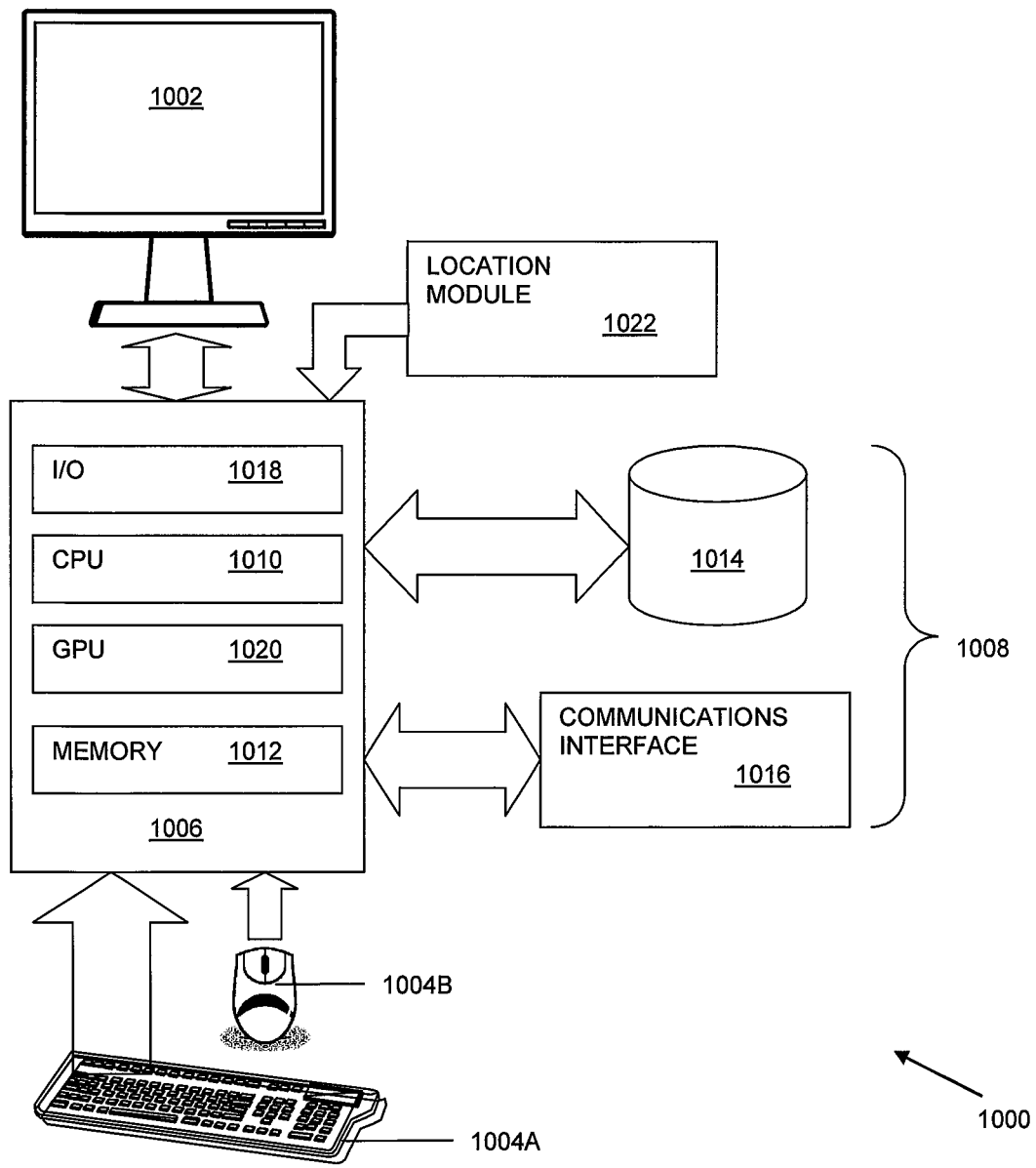
FIG. 10 is a schematic representation of an exemplary computer system, which may be used in implementing various methods described herein.

The methods described herein may be implemented on any suitable computer or microprocessor-based system. An illustrative computer system in respect of which the methods herein described may be implemented is presented as a block diagram in FIG. 10. The illustrative computer system is denoted generally by reference numeral 1000 and includes a display 1002, input devices in the form of keyboard 1004A and pointing device 1004B, computer 1006 and external devices 1008. While pointing device 1004B is depicted as a mouse, it will be appreciated that other types of pointing device may also be used.

The computer 1006 may contain one or more processors or microprocessors, such as a central processing unit (CPU) 1010. The CPU 1010 performs arithmetic calculations and control functions to execute software stored in an internal memory 1012, preferably random access memory (RAM) and/or read only memory (ROM), and possibly additional memory 1014. The additional memory 1014 may include, for example, mass memory storage, hard disk drives, optical disk drives (including CD and DVD drives), magnetic disk drives, magnetic tape drives (including LTO, DLT, DAT and DCC), flash drives, program cartridges and cartridge interfaces such as those found in video game devices, removable memory chips such as EPROM or PROM, emerging storage media, such as holographic storage, or similar storage media as known in the art. This additional memory 1014 may be physically internal to the computer 1006, or external as shown in FIG. 20.

The computer system 1000 may also include other similar means for allowing computer programs or other instructions to be loaded. Such means can include, for example, a communications interface 1016 which allows software and data to be transferred between the computer system 1000 and external systems and networks. Examples of communications interface 1016 can include a modem, a network interface such as an Ethernet card, a wireless communication interface, or a serial or parallel communications port. Software and data transferred via communications interface 1016 are in the form of signals which can be electronic, acoustic, electromagnetic, optical or other signals capable of being received by communications interface 1016. Multiple interfaces, of course, can be provided on a single computer system 1000. The computer system 1000 may further include a location module 1022 including GPS receiver hardware that is also coupled to the computer 1006.

Input and output to and from the computer 1006 is administered by the input/output (I/O) interface 1018. This I/O interface 1018 administers control of the display 1002, keyboard 1004A, external devices 1008 and other such components of the computer system 1000. The computer 1006 also includes a graphical processing unit (GPU) 1020. The latter may also be used for computational purposes as an adjunct to, or instead of, the (CPU) 1010, for mathematical calculations.

The various components of the computer system 1000 are coupled to one another either directly or by coupling to suitable buses.

The methods described herein may be provided as a computer program products comprising a tangible computer readable storage medium, such as non-volatile memory of the mobile wireless telecommunication computing device or of the order processing system of either a provider or a provider aggregator, having computer readable program code embodied therewith for executing the method. Thus, the non-volatile memory of the mobile wireless telecommunication computing device or order processing system would contain instructions which, when executed by the processor of the mobile wireless telecommunication computing device or order processing system, cause the mobile wireless telecommunication computing device or order processing system to execute the relevant method.

The above systems and methods may be implemented entirely in hardware, entirely in software, or by way of a combination of hardware and software. In a preferred embodiment, implementation is by way of software, which includes but is not limited to firmware, resident software, microcode, and the like. Furthermore, the above systems and methods may be implemented in the form of a computer program product accessible from a computer usable or computer readable medium providing program code for use by or in connection with a computer or any instruction execution system. In such embodiments, the computer program product may reside on a computer usable or computer readable medium in a computer such as the memory 912 of the onboard computer system 906 of the smartphone 900 or the memory 1012 of the computer 1006, or on a computer usable or computer readable medium external to the onboard computer system 906 of the smartphone 900 or the computer 1006, or on any combination thereof.

One or more currently preferred embodiments have been described by way of example. It will be apparent to persons skilled in the art that a number of variations and modifications can be made without departing from the scope of the claims.

The invention claimed is:

1. A method for processing a plurality of orders for goods at a provider location, comprising:
  (i) obtaining, by a data processing system, arrival estimates for when each of a plurality of users is expected to arrive, each user associated with a respective order, wherein:
    the arrival estimates are calculated by networked mobile wireless telecommunication computing devices associated with the respective orders, based on respective locations of the networked mobile wireless telecommunication computing devices; and
    whereby the data processing system does not have to calculate the arrival estimates to thereby distribute processing load away from the data processing system to the networked mobile wireless telecommunication computing devices;
  (ii) the data processing system using the arrival estimates to schedule processing of the orders;
  (iii) the data processing system obtaining an arrival sequence estimate for the users indicating a sequence in which the users are expected to arrive at a target within the provider location, wherein:
    the arrival sequence estimate is different from the arrival estimates for the users, and is also obtained other than from the arrival estimates for the users because:
      the arrival estimates are based on at least predicting paths of the networked mobile wireless telecommunication computing devices through a constrained travel path network; whereas
      obtaining the arrival sequence estimate comprises the data processing system ordering a plurality of the users who are located inside the provider location according to their respective radial distances from another networked mobile wireless telecommunication computing device located at a target within the provider location, wherein the target is a specific position within the provider location, wherein the radial distances are calculated independent of the constrained travel path network; and
    whereby the arrival sequence estimate is determined disregarding the arrival estimates:
    the radial distances being obtained by the data processing system using location information received from the networked mobile wireless telecommunication computing devices and obtained using at least one of global positioning system coordinates, cellular repeater triangulation coordinates and Wi-Fi triangulation coordinates;

(iv) processing the orders to produce completed orders; and (v) organizing the completed orders for presentation to the users according to the arrival sequence estimate, wherein organization of the completed orders according to the arrival sequence estimate is independent of the arrival estimate;

wherein the sequence in which the users are expected to arrive at the target within the provider location, as represented by the arrival sequence estimate, is different from the sequence in which order processing is triggered according to the arrival estimates.

2. The method of claim 1, wherein the arrival sequence estimate is continuously updated and step (v) is repeated responsive to a change in the arrival sequence estimate.

3. The method of claim 1, wherein processing the orders to produce completed orders comprises assembly of components of the orders into the completed orders.

4. The method of claim 1, wherein the networked mobile wireless telecommunication computing devices are carried by the users.

5. The method of claim 4, wherein the location information comprises global positioning system coordinates.

6. The method of claim 4, wherein the location information comprises cellular repeater triangulation coordinates.

7. The method of claim 1, wherein the provider location is a restaurant and the target is one of (a) a pick-up counter or window inside the restaurant and (b) the entrance to a drive-through lane.

8. The method of claim 7, wherein the another networked mobile wireless telecommunication computing device is disposed at a pick-up position within the provider location.

* * * * *